United States Patent
Wahadaniah et al.

(10) Patent No.: US 10,841,573 B2
(45) Date of Patent: Nov. 17, 2020

(54) METHODS AND APPARATUSES FOR ENCODING AND DECODING VIDEO USING MULTIPLE REFERENCE PICTURES

(75) Inventors: Viktor Wahadaniah, Singapore (SG); Chong Soon Lim, Singapore (SG); Sue Mon Thet Naing, Singapore (SG); Takahiro Nishi, Nara (JP); Youji Shibahara, Osaka (JP); Hisao Sasai, Osaka (JP); Toshiyasu Sugio, Osaka (JP)

(73) Assignee: SUN PATENT TRUST, New York, NY (US)

(*) Notice: Subject to any disclaimer, the term of this patent is extended or adjusted under 35 U.S.C. 154(b) by 175 days.

(21) Appl. No.: 13/983,581

(22) PCT Filed: Feb. 7, 2012

(86) PCT No.: PCT/JP2012/000802
§ 371 (c)(1),
(2), (4) Date: Aug. 5, 2013

(87) PCT Pub. No.: WO2012/108181
PCT Pub. Date: Aug. 16, 2012

(65) Prior Publication Data
US 2014/0023140 A1  Jan. 23, 2014

Related U.S. Application Data

(60) Provisional application No. 61/440,485, filed on Feb. 8, 2011.

(51) Int. Cl.
*H04N 19/105* (2014.01)
*H04N 19/61* (2014.01)
*H04N 19/573* (2014.01)

(52) U.S. Cl.
CPC ......... *H04N 19/105* (2014.11); *H04N 19/573* (2014.11); *H04N 19/61* (2014.11)

(58) Field of Classification Search
CPC ..... H04N 19/573; H04N 19/61; H04N 19/105
See application file for complete search history.

(56) References Cited

U.S. PATENT DOCUMENTS 7,400,681 B2  7/2008  Joch et al.
7,773,675 B2  8/2010  Park et al.
(Continued)

FOREIGN PATENT DOCUMENTS

JP  2005-151167  6/2005
JP  2006-121224  5/2006
(Continued)

OTHER PUBLICATIONS

Ying et al., The Emerging MVC Standard for 3D Video Services, Hindawi Publishing Corporation, EURASIP Journal on Advances in Signal Processing, vol. 2009, Article ID 786015, 13 pages, doi:10.1155/2009/786015.*
(Continued)

*Primary Examiner* — Christopher S Kelley
*Assistant Examiner* — Boubacar Abdou Tchoussou
(74) *Attorney, Agent, or Firm* — Wenderoth, Lind & Ponack, L.L.P.

(57) ABSTRACT

A video encoding method using reference pictures includes: writing a parameter indicating a temporal level of a reference picture or a period of a type of a reference picture into the reference picture for each of the reference pictures, creating a first list of reference pictures comprising the reference pictures sorted based on the parameter; and encoding a current picture of the video using at least the first list of reference pictures. A video decoding method using a reference pictures includes: parsing a parameter indicating a
(Continued)

temporal level of a reference picture or a period of a type of a reference picture from each of the reference pictures; creating a first list of reference pictures comprising the reference pictures sorted based on the parameter; and decoding a current picture of the video using at least the first list of reference pictures. Corresponding video encoding and decoding apparatuses are provided.

8 Claims, 46 Drawing Sheets

(56) References Cited

U.S. PATENT DOCUMENTS

| | | | |
|---|---|---|---|
| 7,835,438 | B2 | 11/2010 | Chono |
| 7,869,501 | B2 | 1/2011 | Park et al. |
| 7,929,605 | B2 | 4/2011 | Kimata et al. |
| 8,275,034 | B2 | 9/2012 | Sakamoto |
| 8,488,891 | B2 | 7/2013 | Choi et al. |
| 8,532,412 | B2 | 9/2013 | Choi et al. |
| 8,548,261 | B2 | 10/2013 | Choi et al. |
| 8,554,002 | B2 | 10/2013 | Choi et al. |
| 8,611,688 | B2 | 12/2013 | Choi et al. |
| 8,644,628 | B2 | 2/2014 | Choi et al. |
| 8,670,626 | B2 | 3/2014 | Choi et al. |
| 8,693,539 | B2 | 4/2014 | Lim et al. |
| 8,711,931 | B2 | 4/2014 | Tanaka et al. |
| 8,879,826 | B2* | 11/2014 | Kwon .............. G06K 9/00765 382/154 |
| 8,948,256 | B2* | 2/2015 | Pandit .............. H04N 19/597 375/240.12 |
| 9,014,276 | B2* | 4/2015 | Chen .............. H04N 19/597 375/240.26 |
| 9,088,779 | B2 | 7/2015 | Choi et al. |
| 9,641,839 | B2 | 5/2017 | Joch et al. |
| 9,774,882 | B2* | 9/2017 | Tourapis .............. H04N 19/597 |
| 2005/0259736 | A1 | 11/2005 | Payson |
| 2006/0013305 | A1* | 1/2006 | Sun .............. H04N 19/172 375/240.12 |
| 2006/0159174 | A1 | 7/2006 | Chono |
| 2007/0086518 | A1 | 4/2007 | Jeon et al. |
| 2007/0098068 | A1 | 5/2007 | Kimata et al. |
| 2007/0147493 | A1 | 6/2007 | Jeon et al. |
| 2007/0147500 | A1 | 6/2007 | Chono |
| 2007/0183494 | A1 | 8/2007 | Hannuksela |
| 2007/0195879 | A1 | 8/2007 | Jeon et al. |
| 2007/0195886 | A1 | 8/2007 | Sakamoto |
| 2007/0230914 | A1 | 10/2007 | Garrido et al. |
| 2007/0237239 | A1 | 10/2007 | Jeon et al. |
| 2007/0253486 | A1 | 11/2007 | Jeon et al. |
| 2008/0232459 | A1 | 9/2008 | Auyeung |
| 2008/0253671 | A1 | 10/2008 | Choi et al. |
| 2009/0003445 | A1* | 1/2009 | Ying .............. H04N 19/105 375/240.15 |
| 2009/0010323 | A1* | 1/2009 | Su .............. H04N 19/00769 375/240.01 |
| 2009/0067496 | A1* | 3/2009 | Ying .............. H04N 19/105 375/240.15 |
| 2009/0129468 | A1 | 5/2009 | Park et al. |
| 2009/0147857 | A1 | 6/2009 | Park et al. |
| 2009/0225866 | A1 | 9/2009 | Park et al. |
| 2009/0262804 | A1* | 10/2009 | Pandit .............. H04N 19/597 375/240.12 |
| 2009/0323801 | A1 | 12/2009 | Imajou |
| 2010/0074323 | A1 | 3/2010 | Fu et al. |
| 2010/0091845 | A1* | 4/2010 | Jeon .............. H04N 19/597 375/240.12 |
| 2010/0118944 | A1 | 5/2010 | Tanaka et al. |
| 2010/0135385 | A1 | 6/2010 | Park et al. |
| 2010/0150236 | A1* | 6/2010 | Koo .............. H04N 19/597 375/240.12 |
| 2010/0158113 | A1 | 6/2010 | Koo et al. |
| 2010/0246674 | A1 | 9/2010 | Park et al. |
| 2011/0090960 | A1* | 4/2011 | Leontaris .............. H04N 19/103 375/240.12 |
| 2011/0096835 | A1 | 4/2011 | Lim et al. |
| 2011/0110434 | A1 | 5/2011 | Park et al. |
| 2011/0134214 | A1* | 6/2011 | Chen .............. H04N 19/597 348/43 |
| 2012/0020407 | A1 | 1/2012 | Liu et al. |
| 2012/0027088 | A1 | 2/2012 | Chien et al. |
| 2012/0027089 | A1 | 2/2012 | Chien et al. |
| 2012/0092452 | A1* | 4/2012 | Tourapis .............. H04N 19/597 348/43 |
| 2012/0147137 | A1 | 6/2012 | Jeon et al. |
| 2012/0148166 | A1 | 6/2012 | Choi et al. |
| 2012/0148167 | A1 | 6/2012 | Choi et al. |
| 2012/0148169 | A1 | 6/2012 | Choi et al. |
| 2012/0148170 | A1 | 6/2012 | Choi et al. |
| 2012/0155782 | A1 | 6/2012 | Choi et al. |
| 2012/0148168 | A1 | 7/2012 | Choi et al. |
| 2012/0269275 | A1* | 10/2012 | Hannuksela .......... H04N 19/597 375/240.25 |
| 2012/0328005 | A1* | 12/2012 | Yu .............. H04N 19/105 375/240.03 |
| 2013/0011047 | A1* | 1/2013 | Kwon .............. G06K 9/00765 382/154 |
| 2013/0208792 | A1* | 8/2013 | He .............. H04N 19/105 375/240.12 |
| 2014/0132719 | A1 | 5/2014 | Choi et al. |

FOREIGN PATENT DOCUMENTS

| | | |
|---|---|---|
| JP | 2007-228077 | 9/2007 |
| JP | 2008-219204 | 9/2008 |
| JP | 2010-010959 | 1/2010 |
| JP | 2010-524381 | 7/2010 |
| WO | 2005/011285 | 2/2005 |
| WO | 2005-062625 | 7/2005 |
| WO | 2005/064947 | 7/2005 |
| WO | 2007/040336 | 4/2007 |
| WO | 2010/109904 | 9/2010 |
| WO | 2012/015649 | 2/2012 |

OTHER PUBLICATIONS

C.S. Lim S.M.T. Naing, V. Wahadaniah, X. Jing, Reference Lists for B Pictures Under Low Delay Constraints, Joint Collaborative Team on Video Coding (JCT-VC) of ITU-T SG16 WP3 and ISO/IEC JTC1/SC29/WG11 4th Meeting:Daegu, KR, Jan. 20-28, 2011, US, JCTVC, Jan. 14, 2011, JCTVC-D093, p. 1-p. 7, URL, http://phenix.it-sudparis.eu/jct/index.php.

Recommendation ITU-T H.264 (Mar. 2005), Series H: Audiovisual and Multimedia Systems Infrastructure of audiovisual services—Coding of moving video Advanced video coding for generic audiovisual services, Telecommunication Standardization Sector of ITU, Mar. 2010, pp. 48, 82-85, 106-112.

Bin Li et al., Redundancy reduction in B-frame coding at temporal level zero, Joint Collaborative Team on Video Coding (JCT-VC) of ITU-T SG16 WP3 and ISO/IEC JTC1/SC29/WG11, 3$^{rd}$ Meeting: Guangzhou, CN, Oct. 2010, JCTVC-C278_r3, pp. 1-9.

Wei-Jung Chien et al., Modified Uni-directional Inter Prediction in Generalized P and B Picture, Joint Collaborative Team on Video Coding (JCT-VC) of ITU-T SG16 WP3 and ISO/IEC JTC1/SC29/WG11, 3rd Meeting: Guangzhou, CN, Oct. 2010, JCTVC-C285, pp. 1-2.

Chong Soon Lim et al., Reference Lists for B Pictures Under Low Delay Constraints, Joint Collaborative Team on Video Coding (JCT-VC) of ITU-T SG16 WP3 and ISO/IEC JTC1/SC29/WG11, 4th Meeting: Daegu, KR, Jan. 2011, JCTVC-D093_r1, pp. 1-9.

Chong Soon Lim et al., Reference Lists for Low Delay Settings, Joint Collaborative Team on Video Coding (JCT-VC) of ITU-T SG16 WP3 and ISO/IEC JTC1/SC29/WG11, 6th Meeting: Torino, IT, Jul. 2011, JCTVC-F433_r1, pp. 1-9.

Office Action dated Feb. 1, 2016 in U.S. Appl. No. 13/978,633.
Office Action dated Jul. 14, 2016 in U.S. Appl. No. 13/978,633.
Office Action dated Feb. 9, 2017 in U.S. Appl. No. 13/978,633.

(56) References Cited

OTHER PUBLICATIONS

Office Action dated Nov. 22, 2017 in U.S. Appl. No. 13/978,633.
Notice of Allowance dated Mar. 20, 2018 in U.S. Appl. No. 13/978,633.
International Search Report dated May 22, 2012 in International (PCT) Application No. PCT/JP2012/000802.
Written Opinion of the International Searching Authority dated May 22, 2012 in International (PCT) Application No. PCT/JP2012/000802.
ISO/IEC 14496-10 (MPEG-4 Part10: Advanced Video Coding), Oct. 1, 2004.
"Advanced video coding for generic audiovisual services", ITU-T Recommendation H.264, Mar. 2009, p. 120-126.
Office Action dated Nov. 5, 2019 in U.S. Appl. No. 16/037,369.
Office Action dated Jul. 8, 2020 in U.S. Appl. No. 16/037,369.

\* cited by examiner

[Fig. 1]
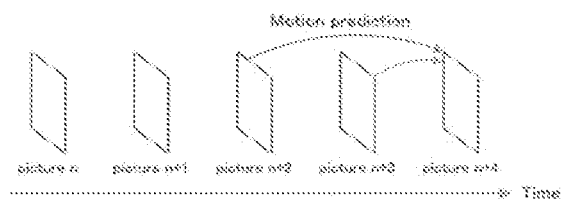
[Fig. 2]
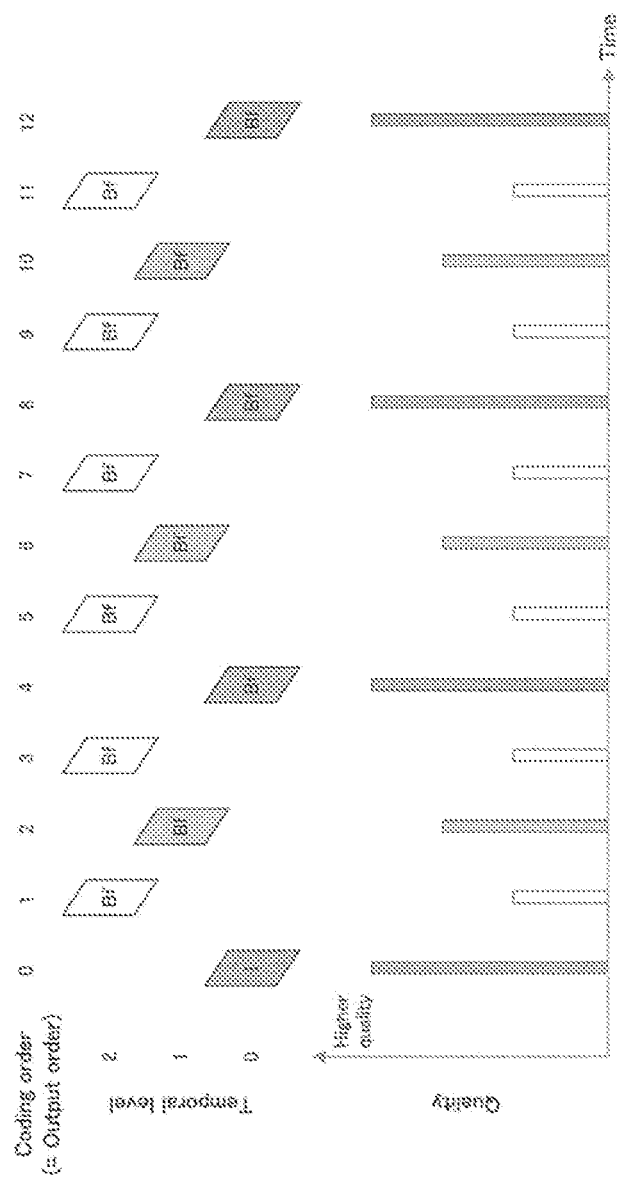

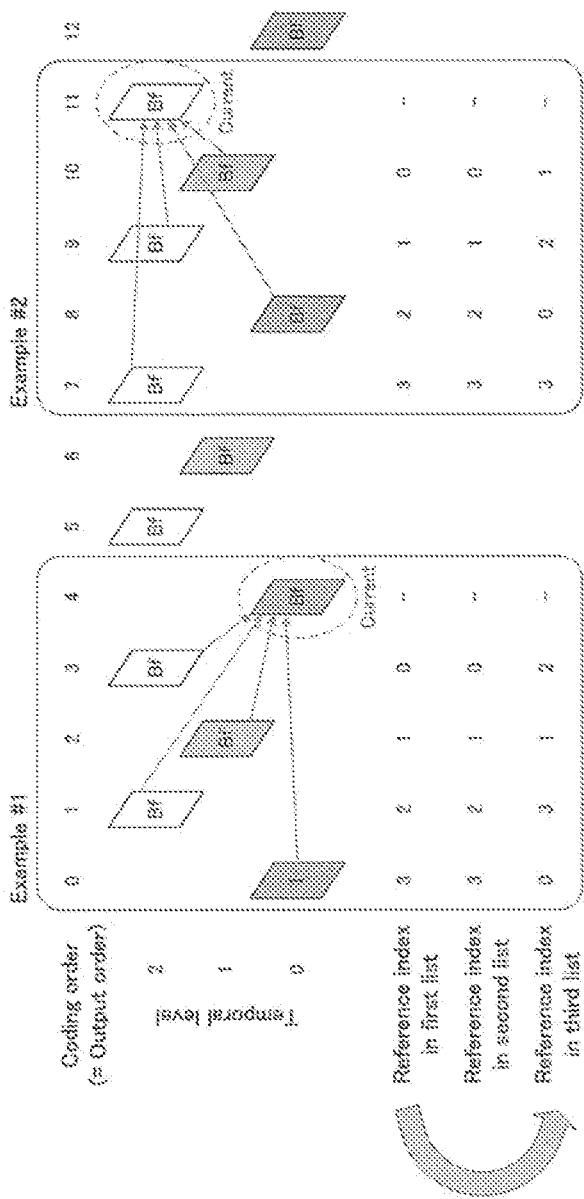
[Fig. 3]

[Fig. 4]
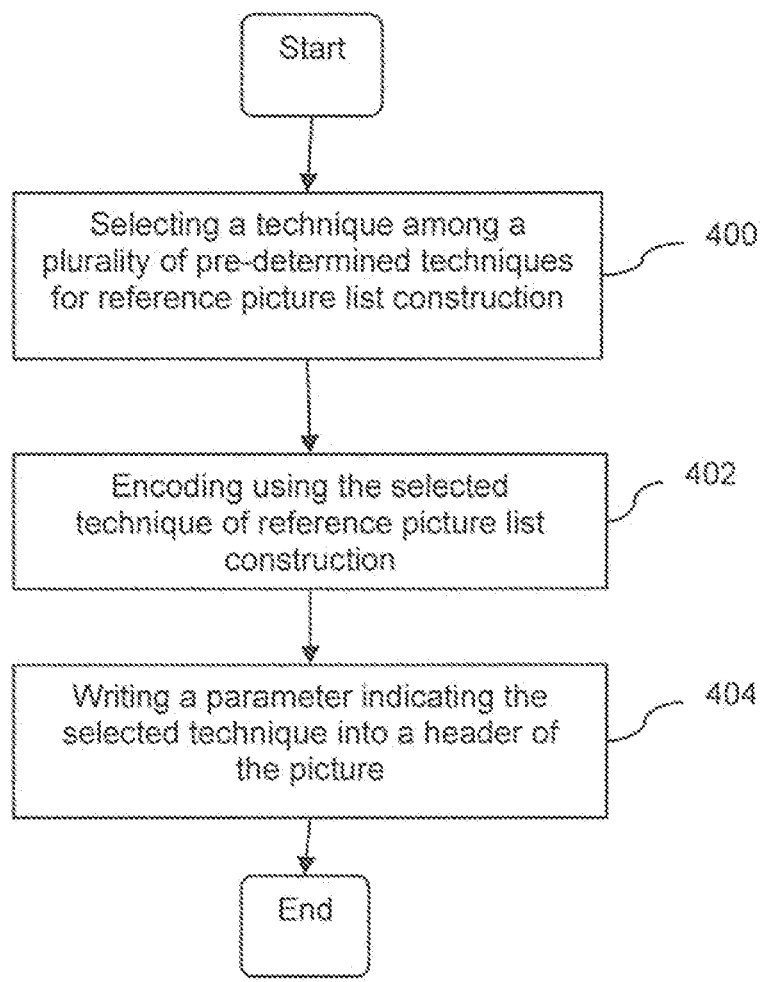

[Fig. 5]
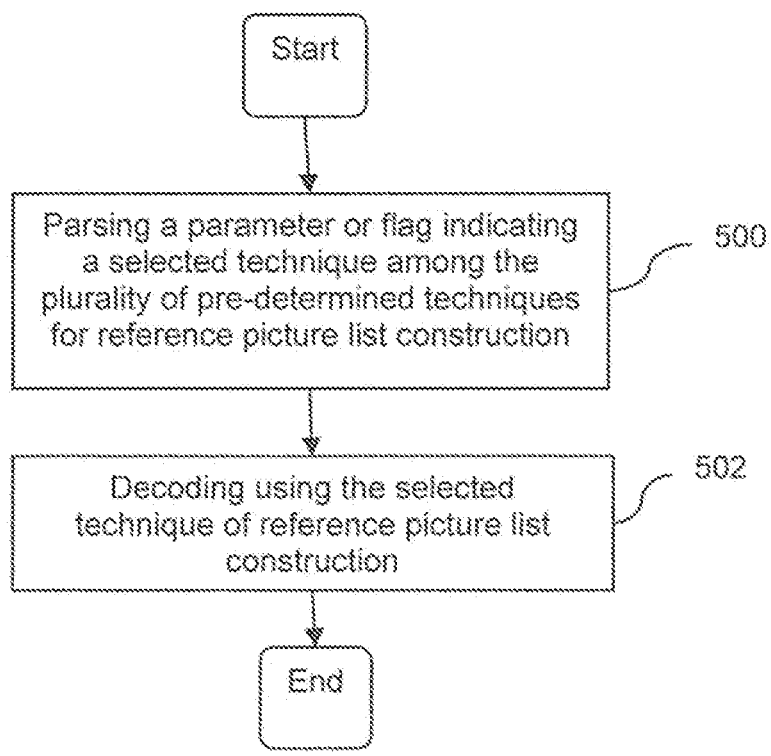
[Fig. 6]
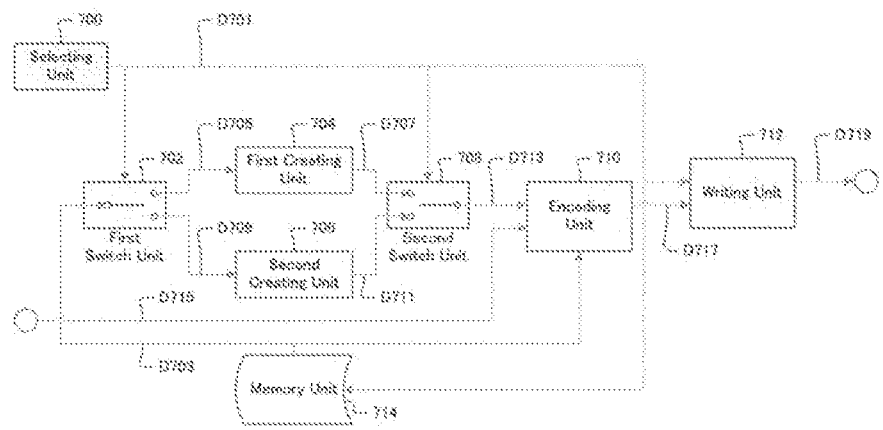

[Fig. 7]
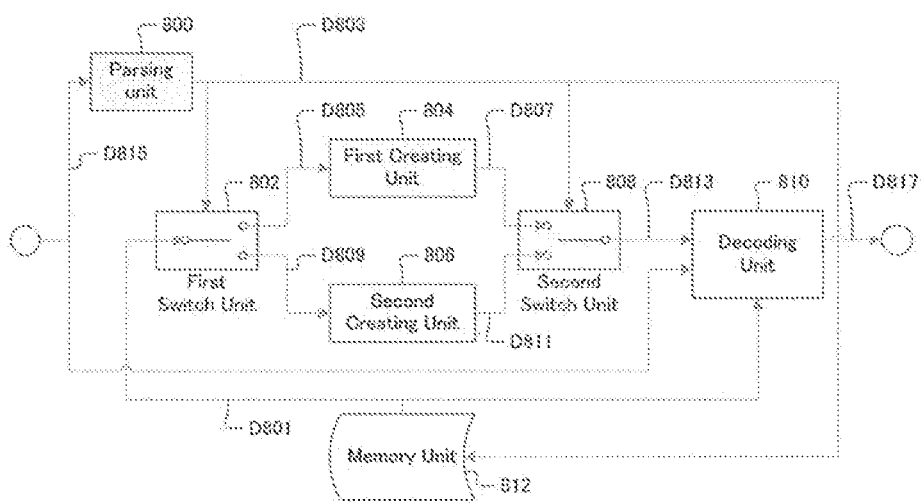

[Fig. 8]
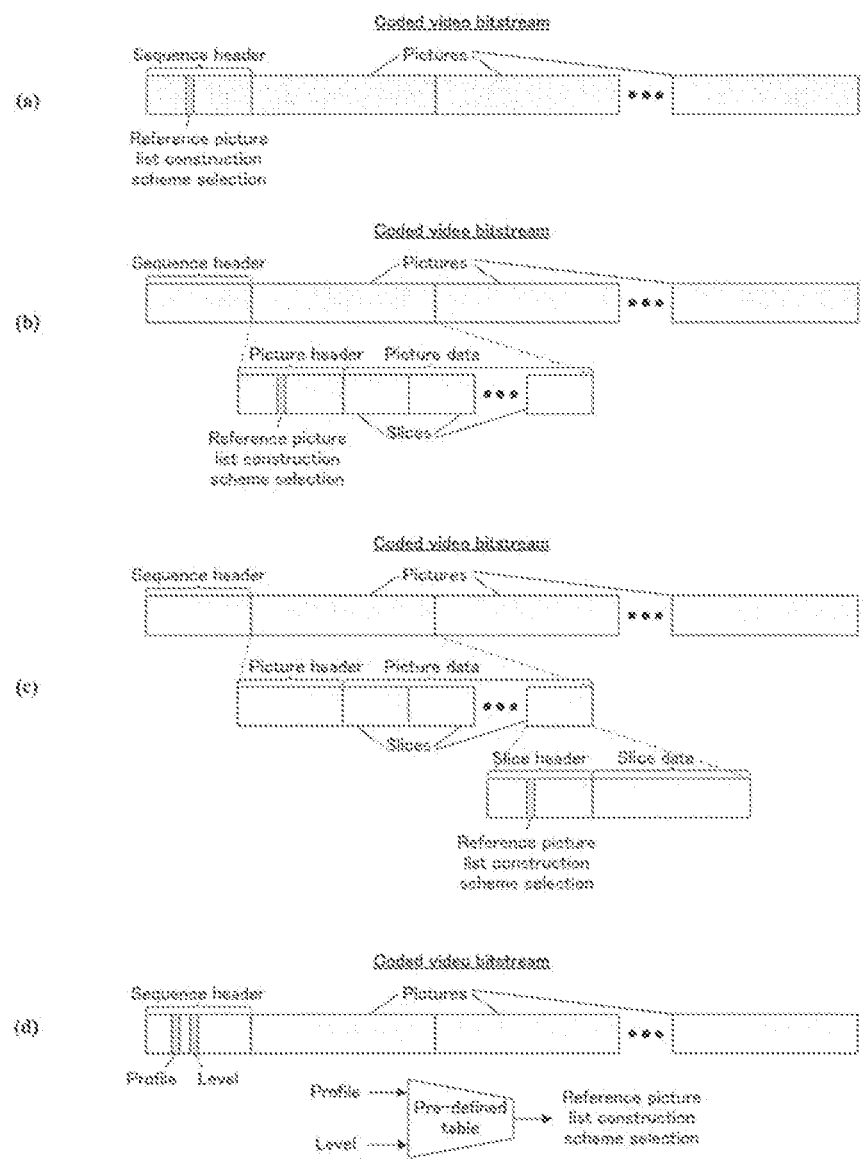

[Fig. 9]
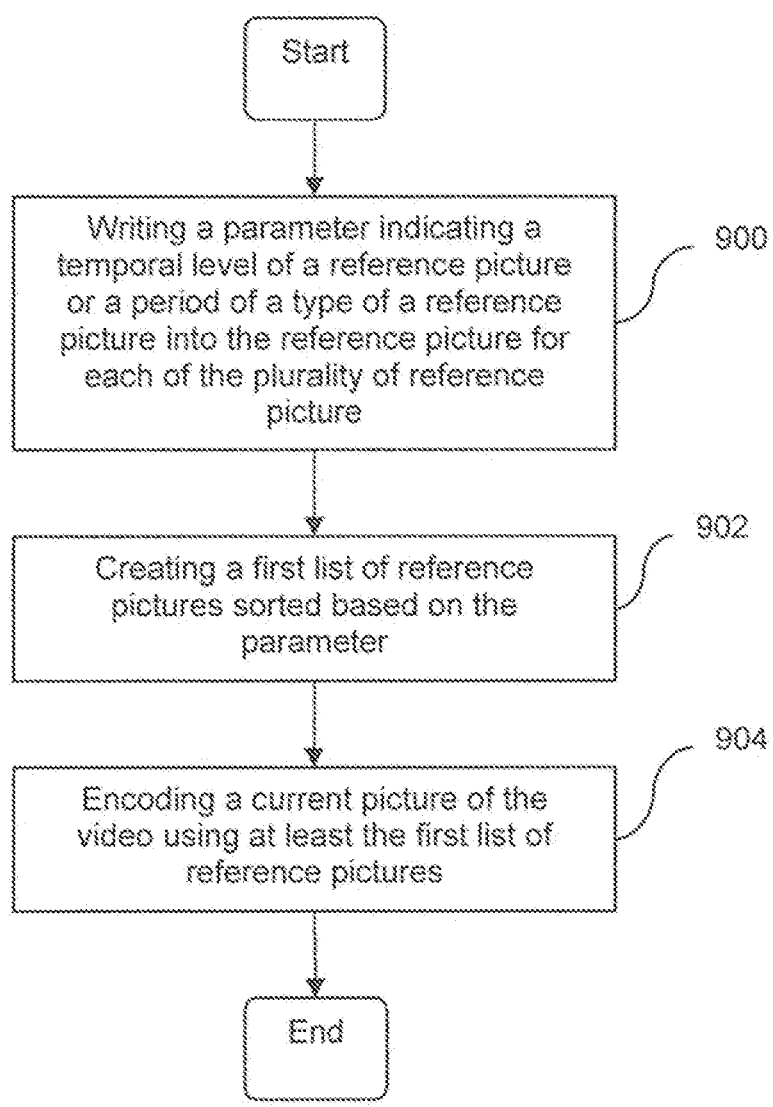

[Fig. 10]
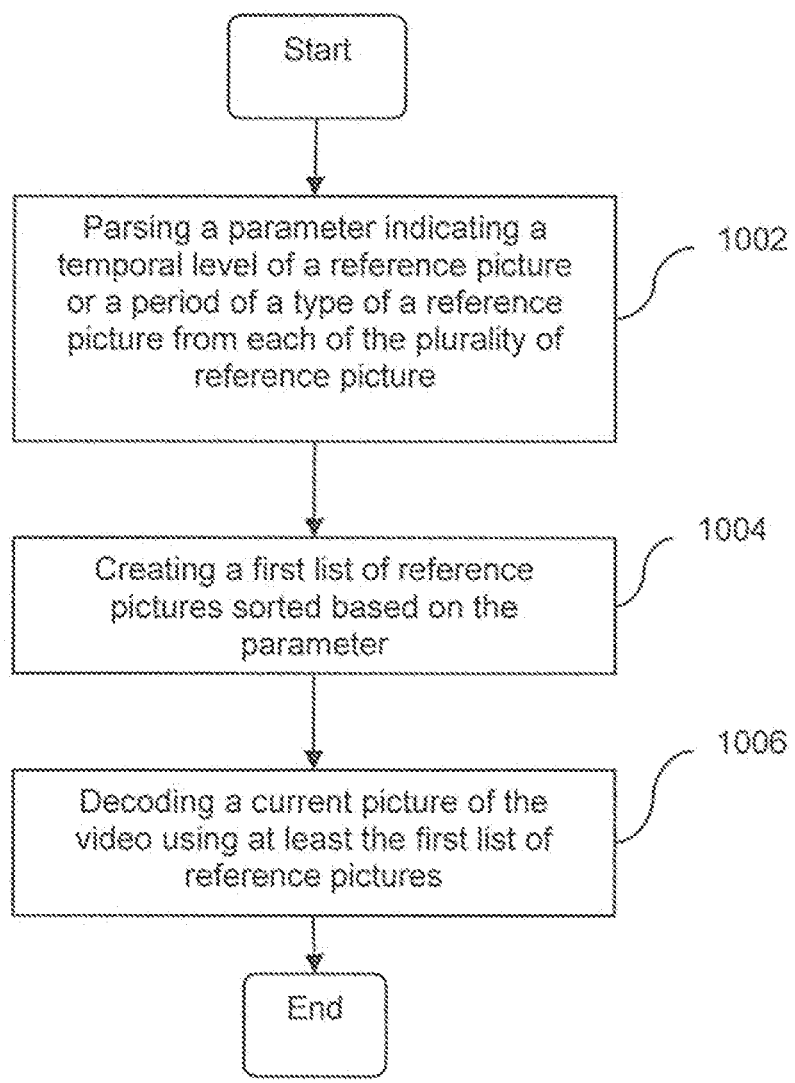

[Fig. 11A]
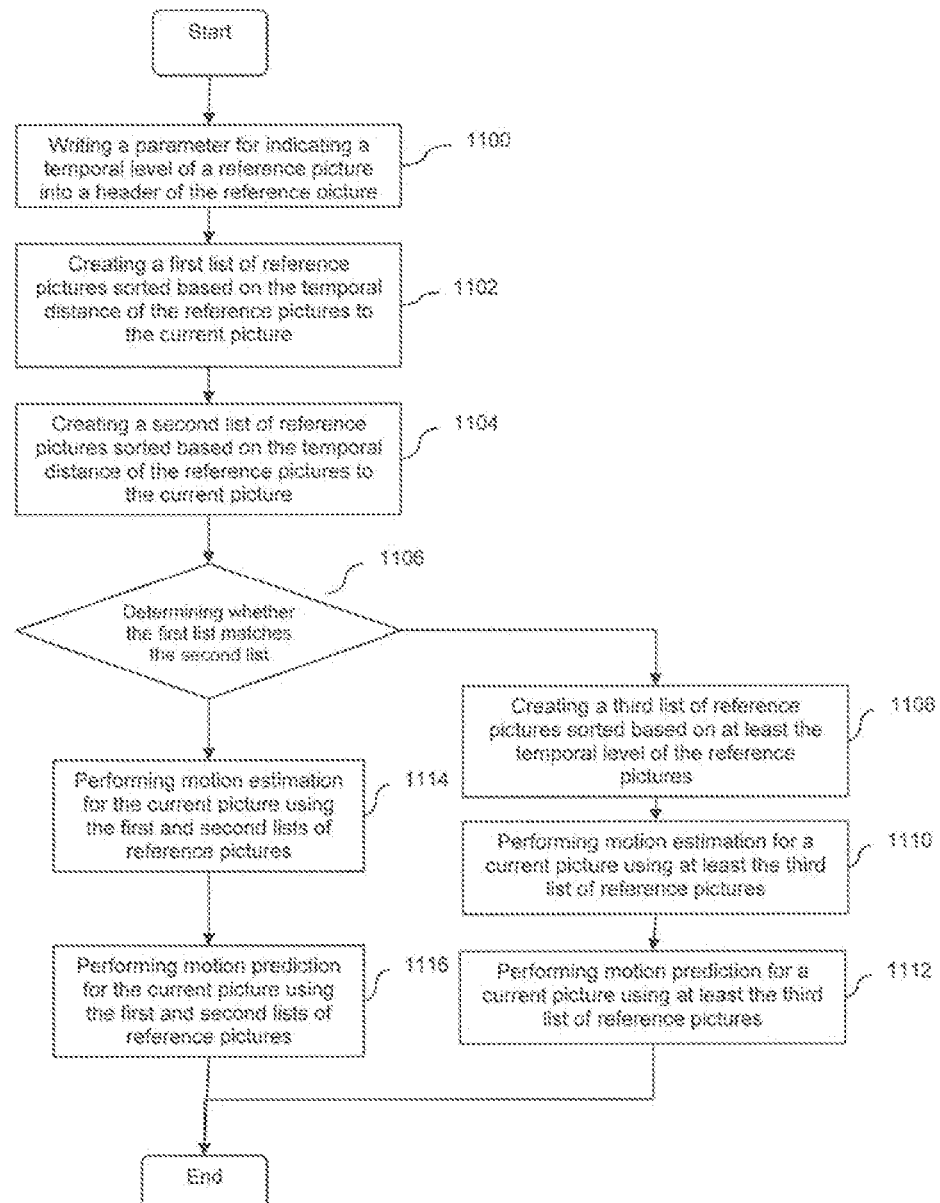

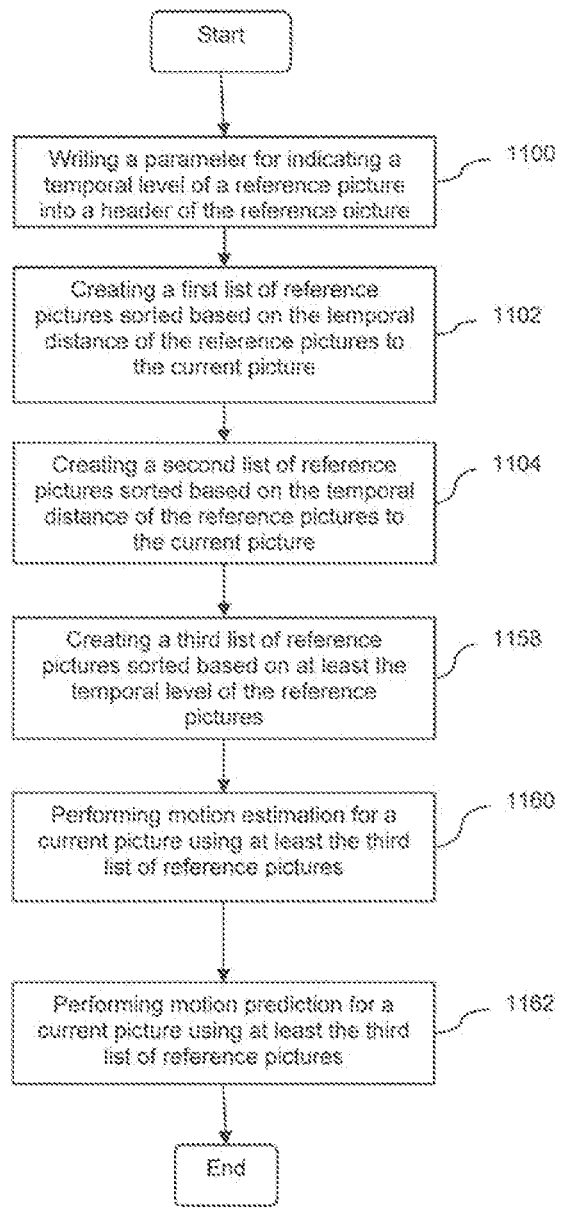
[Fig. 11B]

[Fig. 12A]
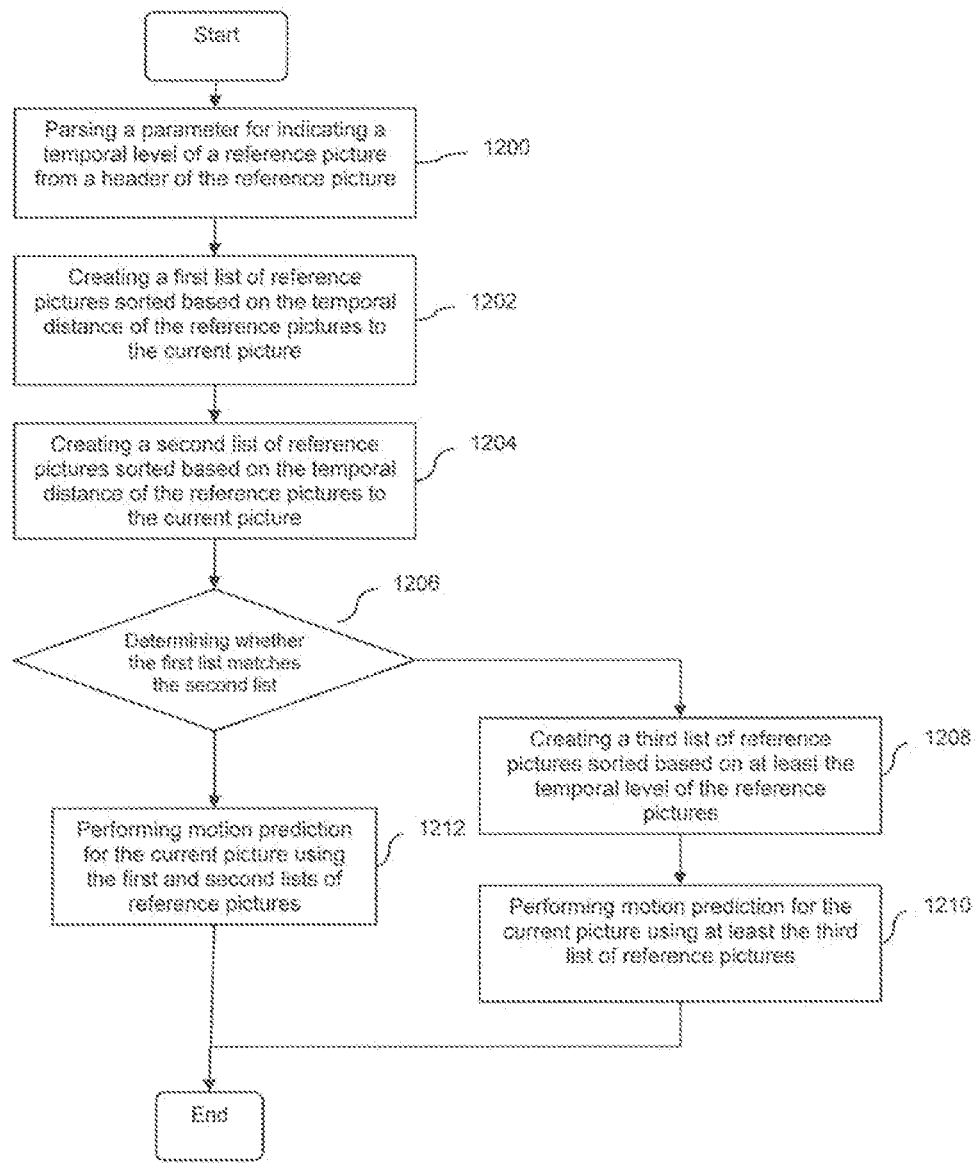

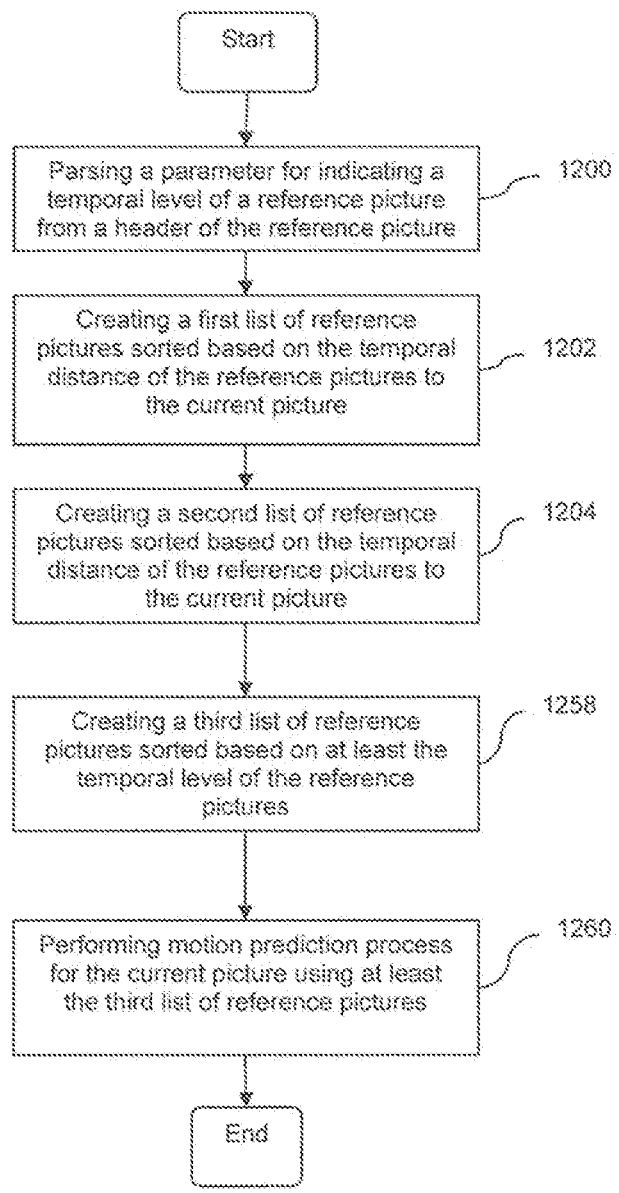
[Fig. 12B]

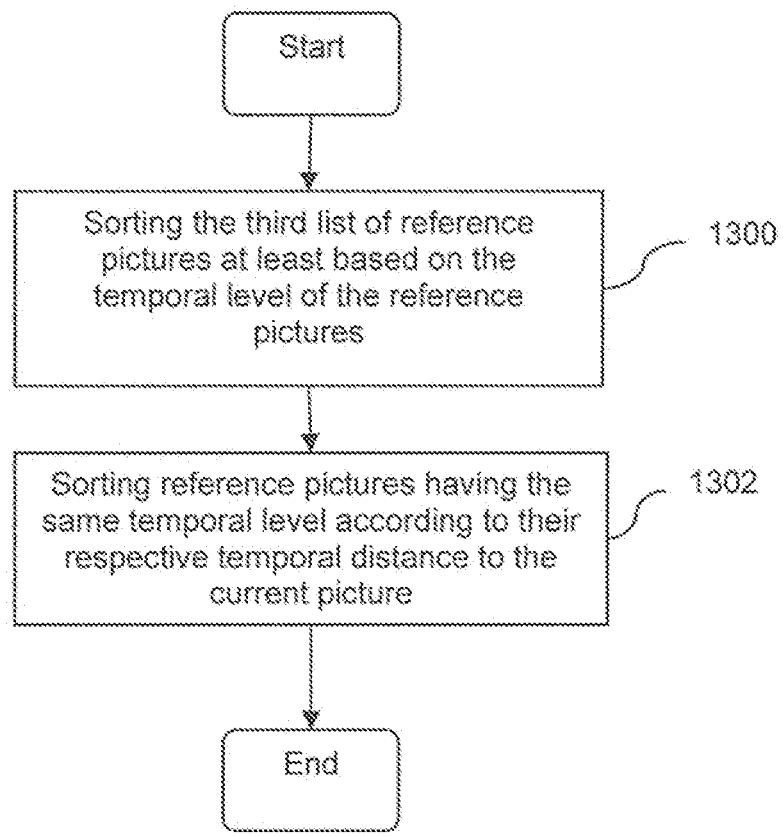
[Fig. 13]

[Fig. 14]
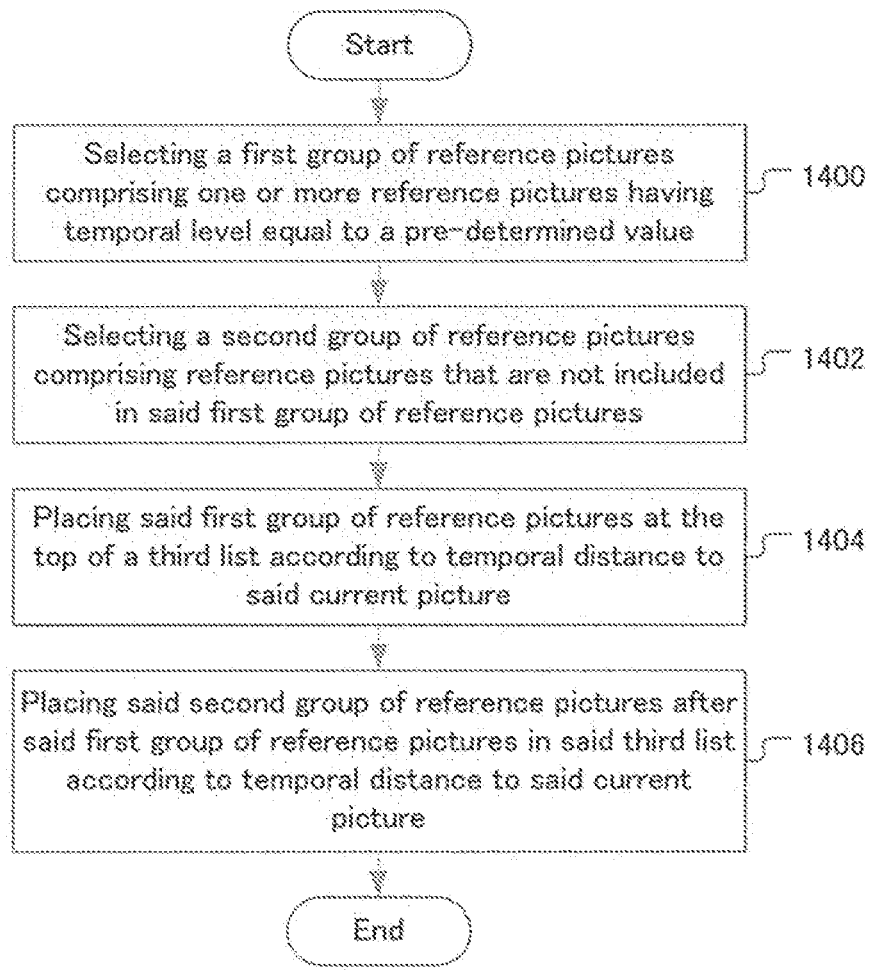

[Fig. 15]
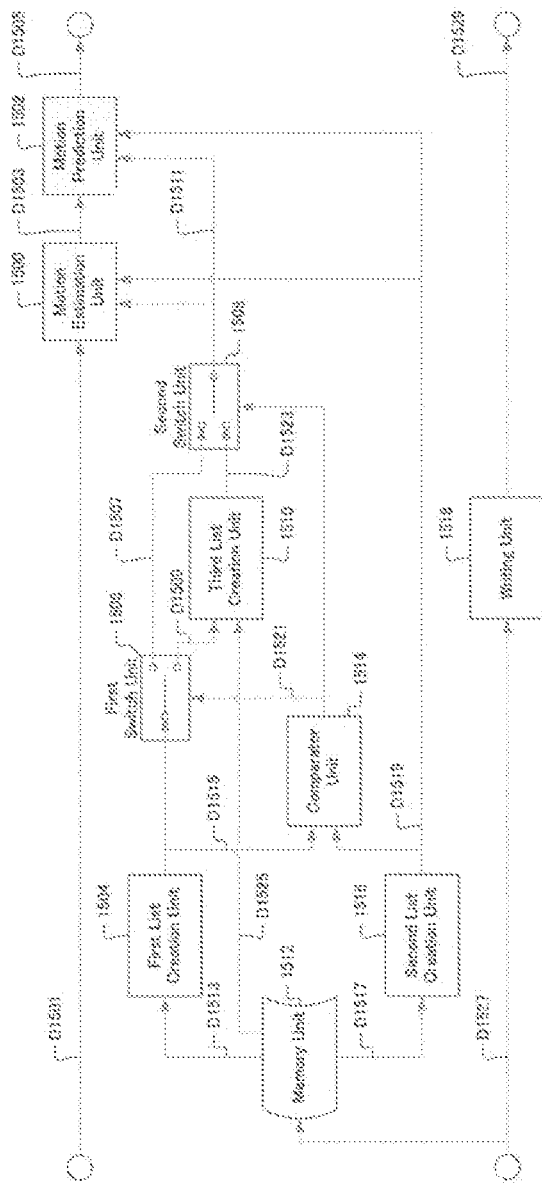

[Fig. 16]
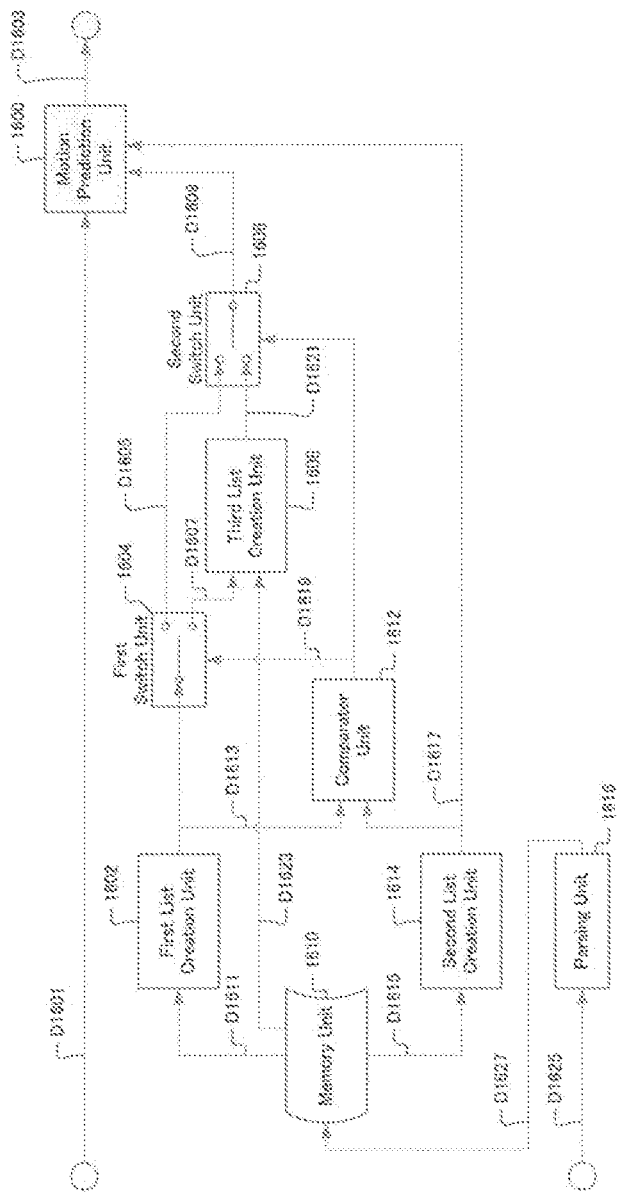
[Fig. 17]
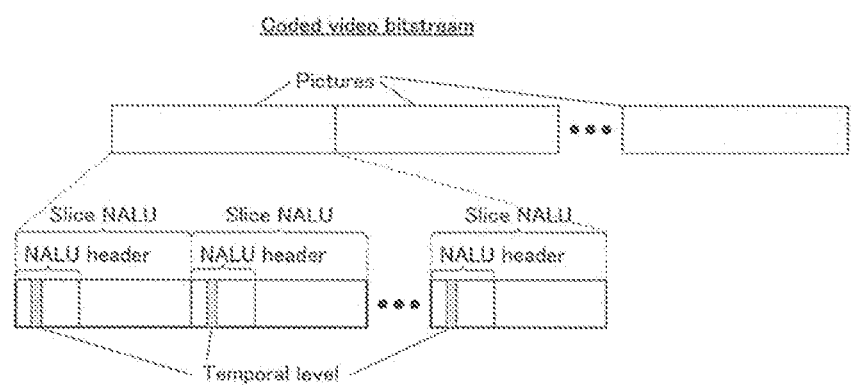

[Fig. 18A]
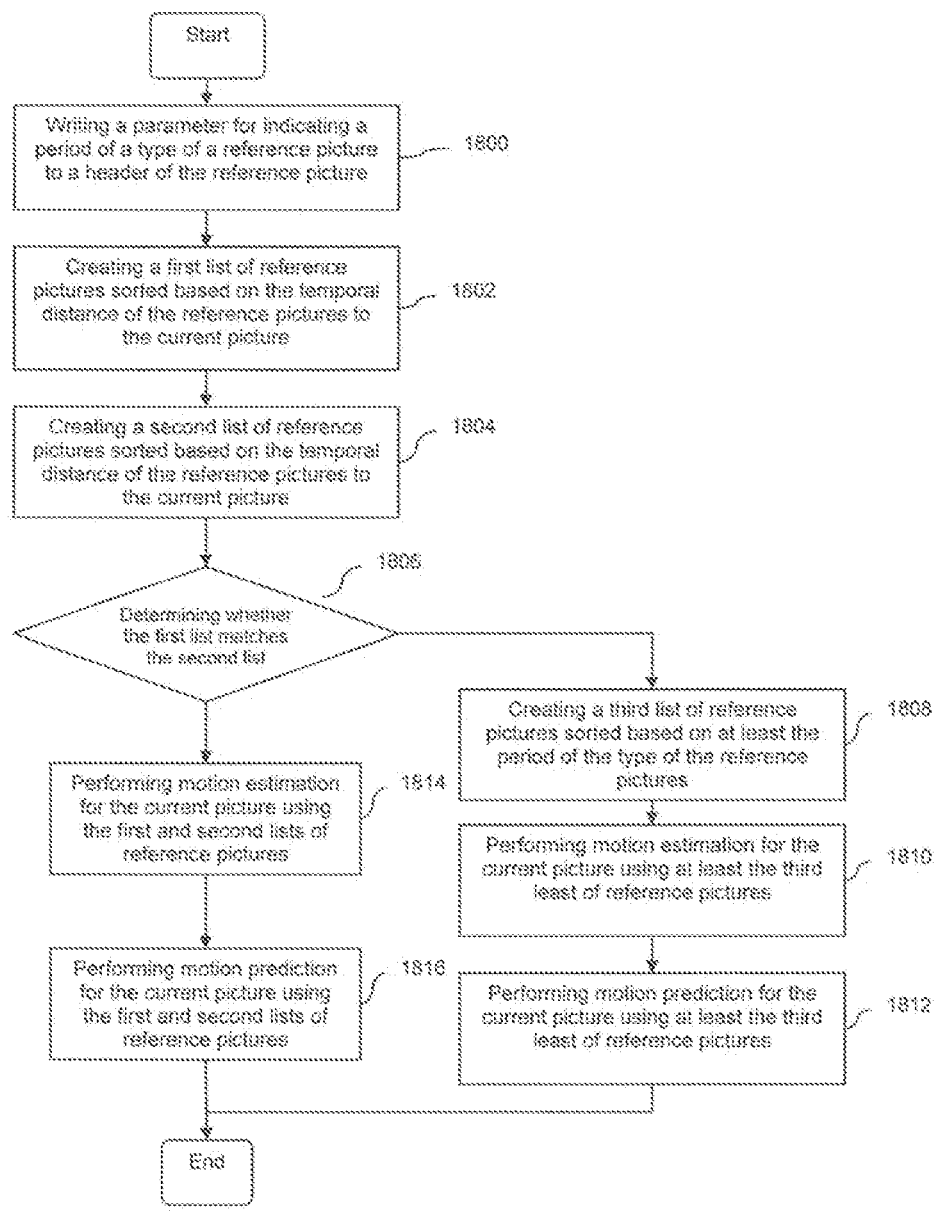

[Fig. 18B]
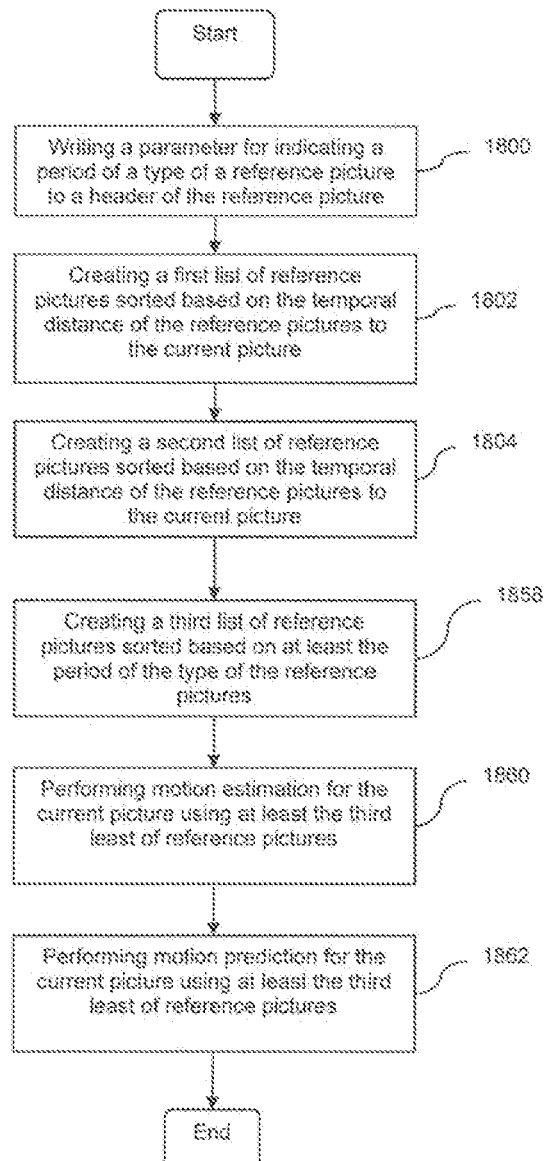

[Fig. 19A]
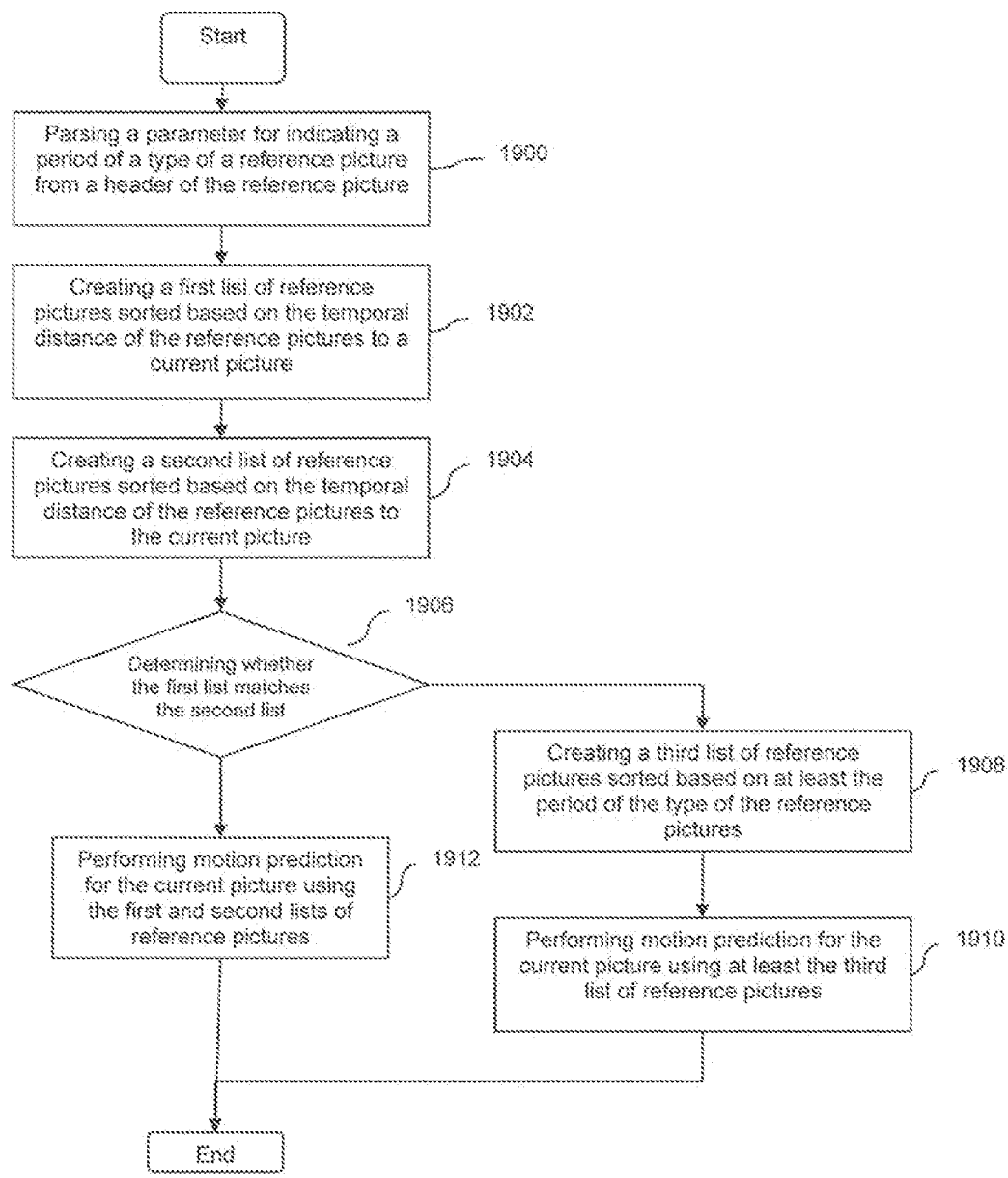

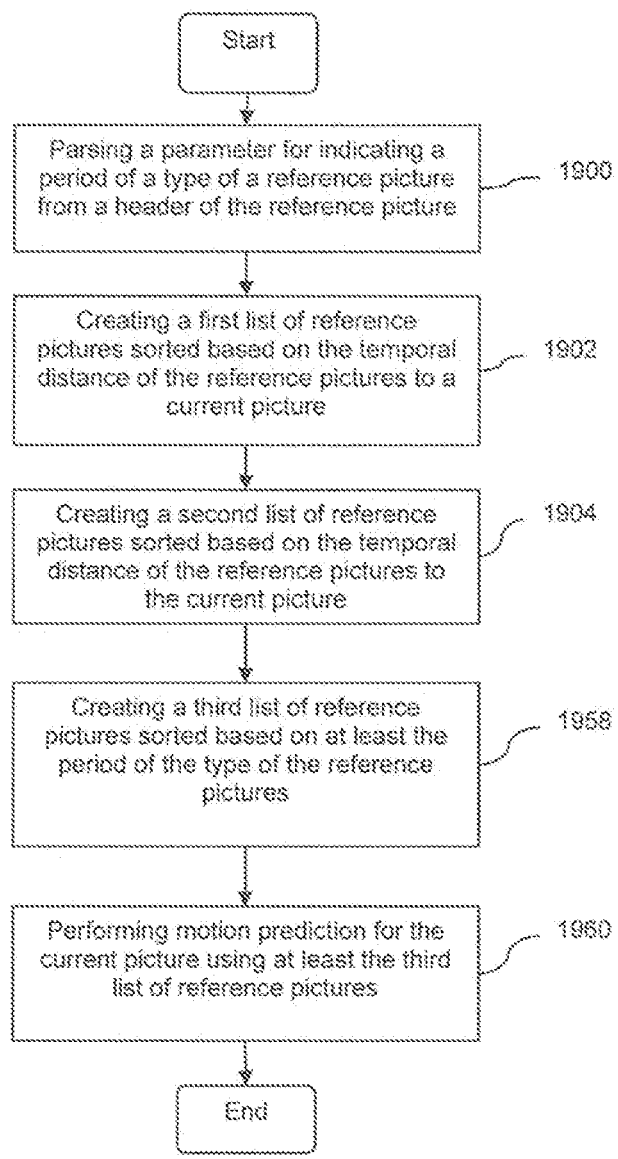
[Fig. 19B]

[Fig. 20]
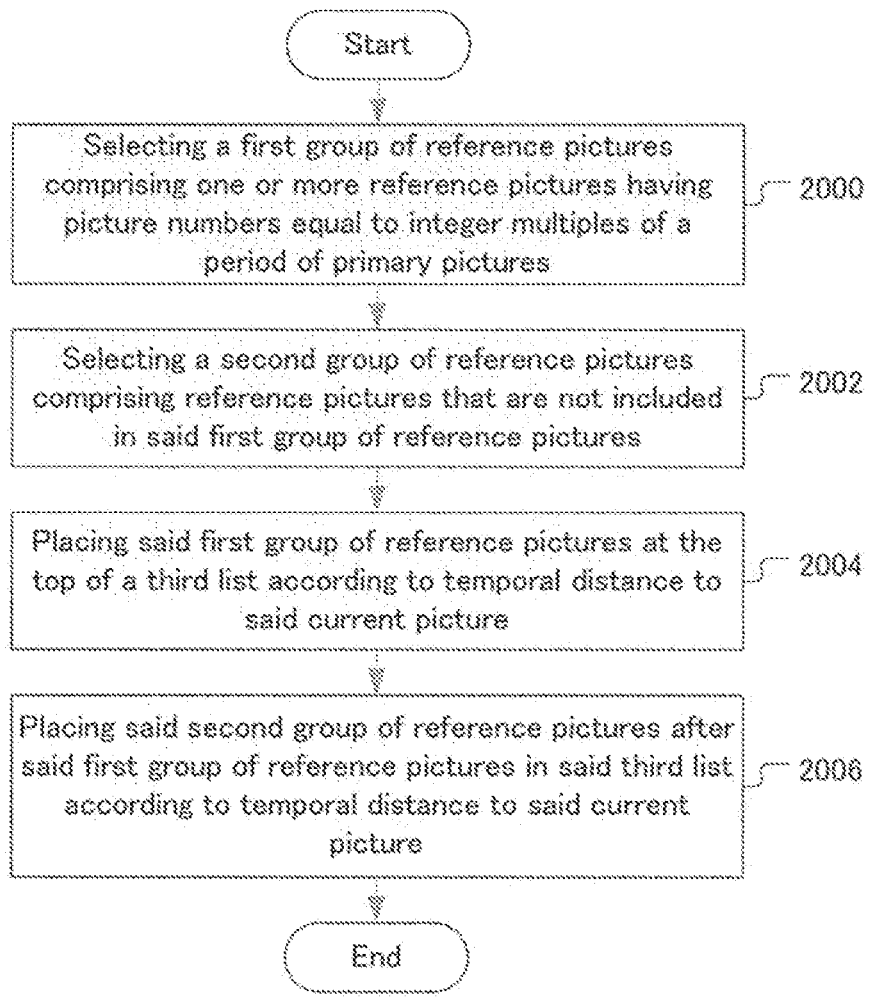

[Fig. 21]
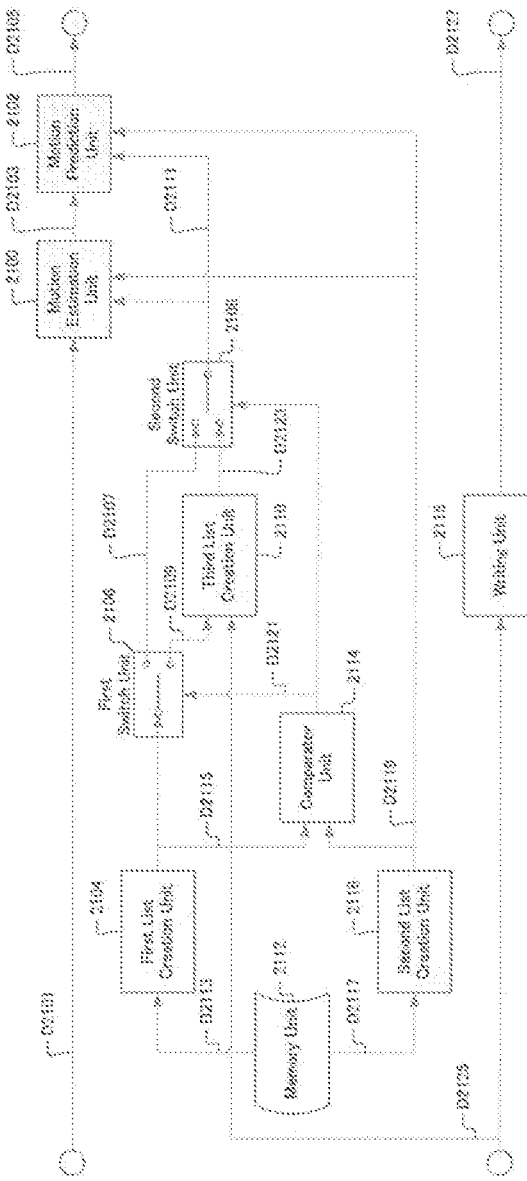

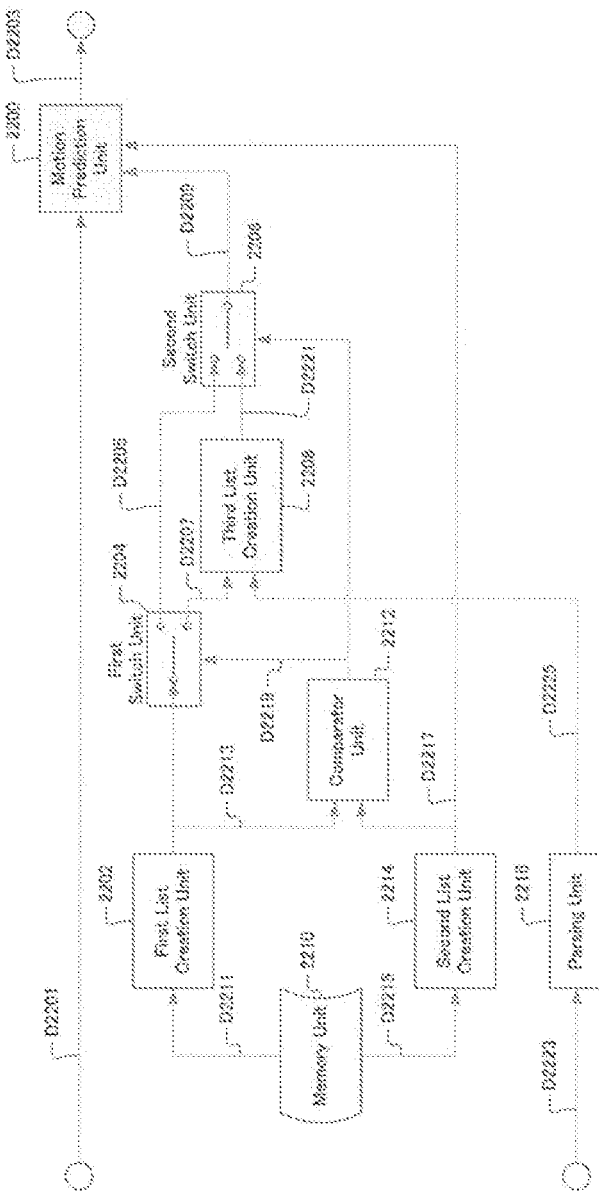
[Fig. 22]

[Fig. 23]
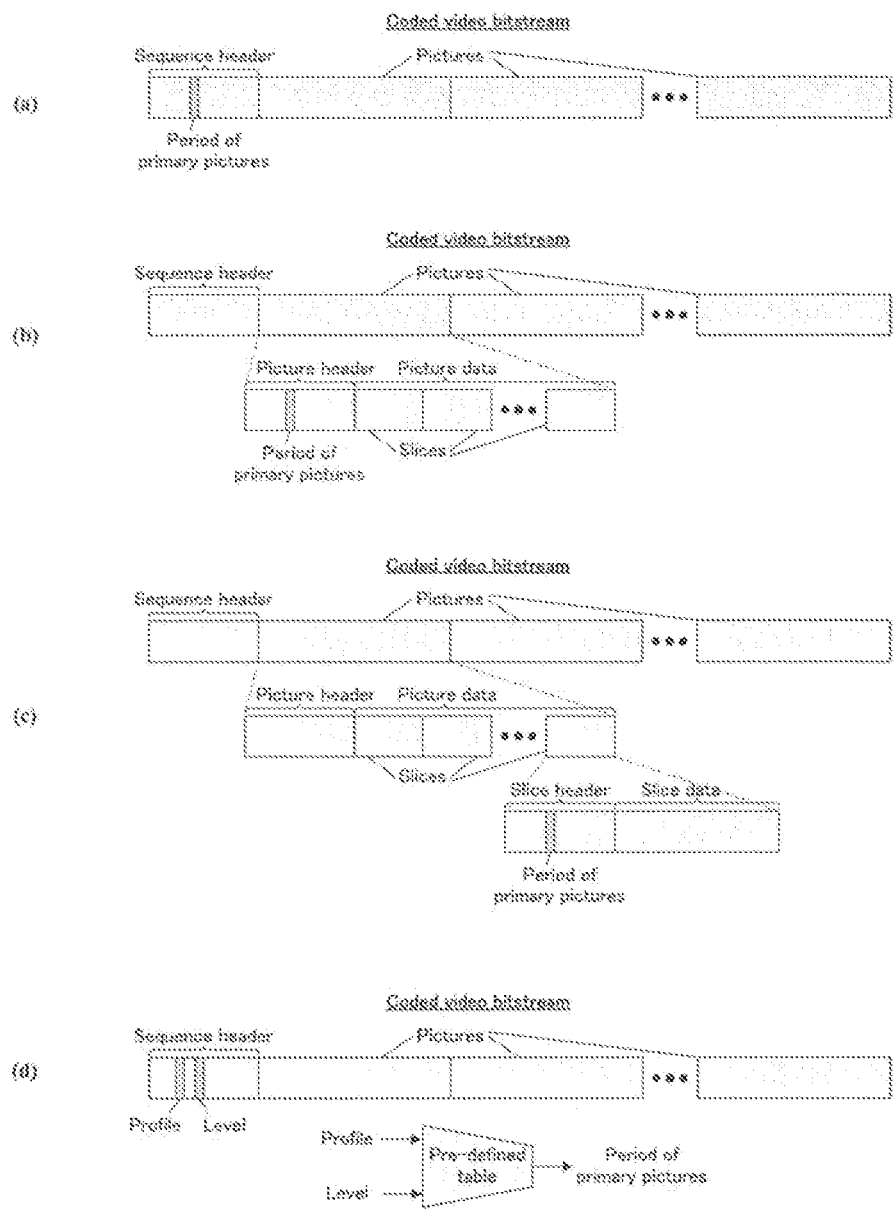

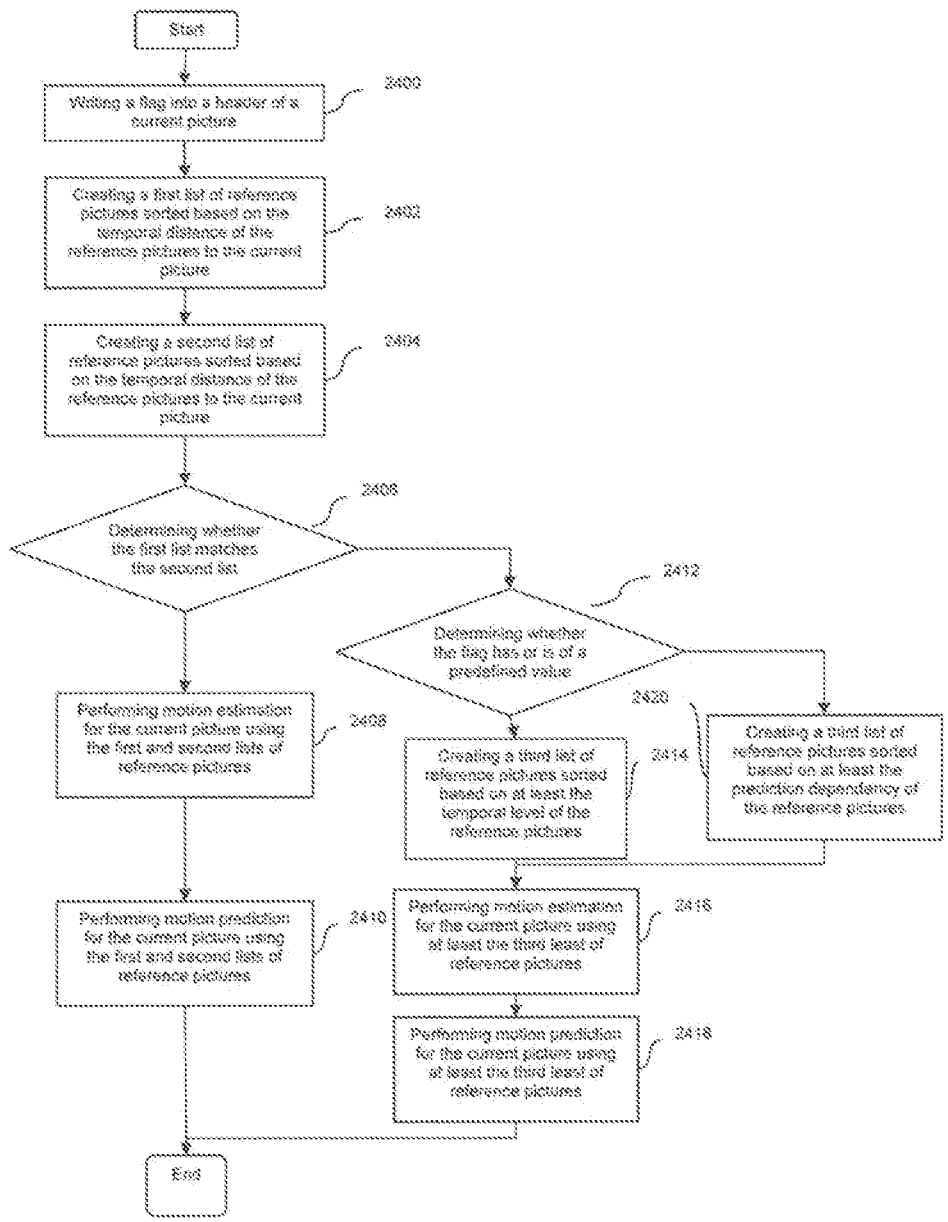

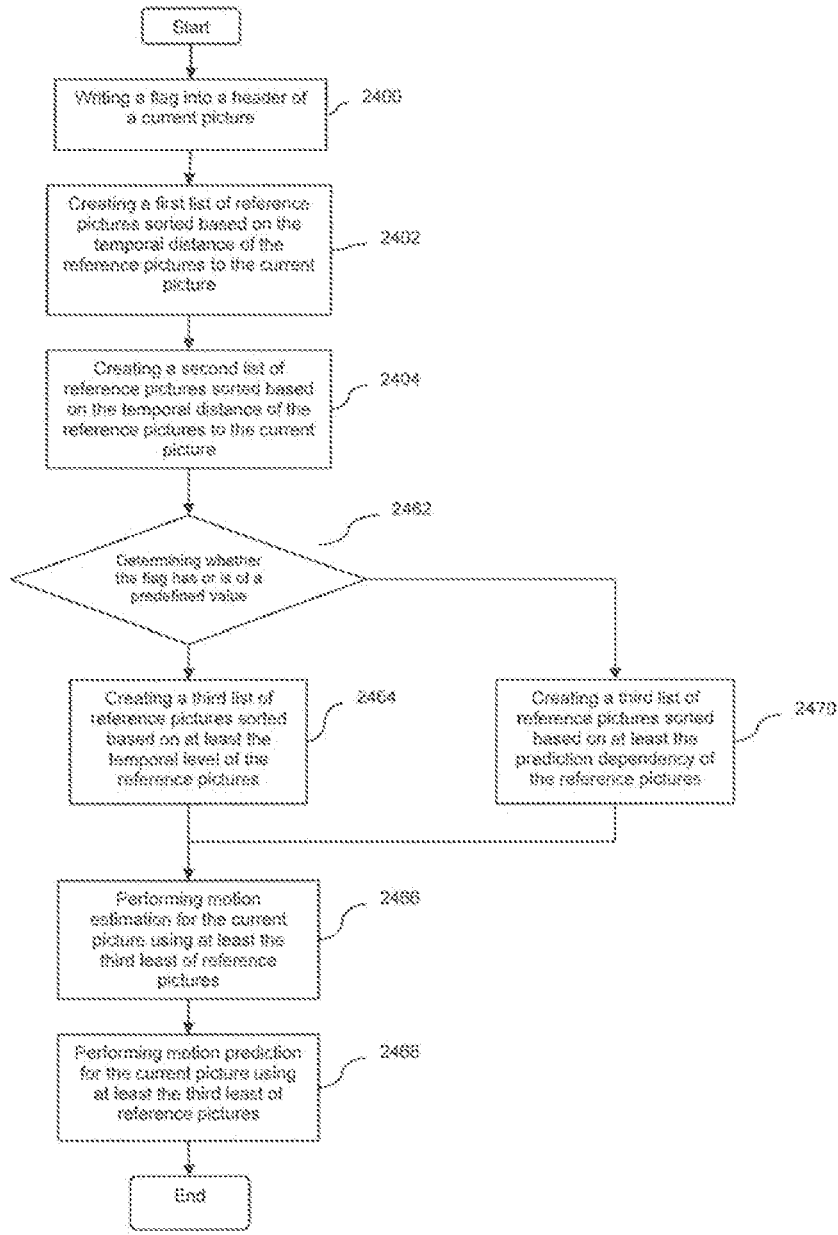
[Fig. 24B]

[Fig. 25A]
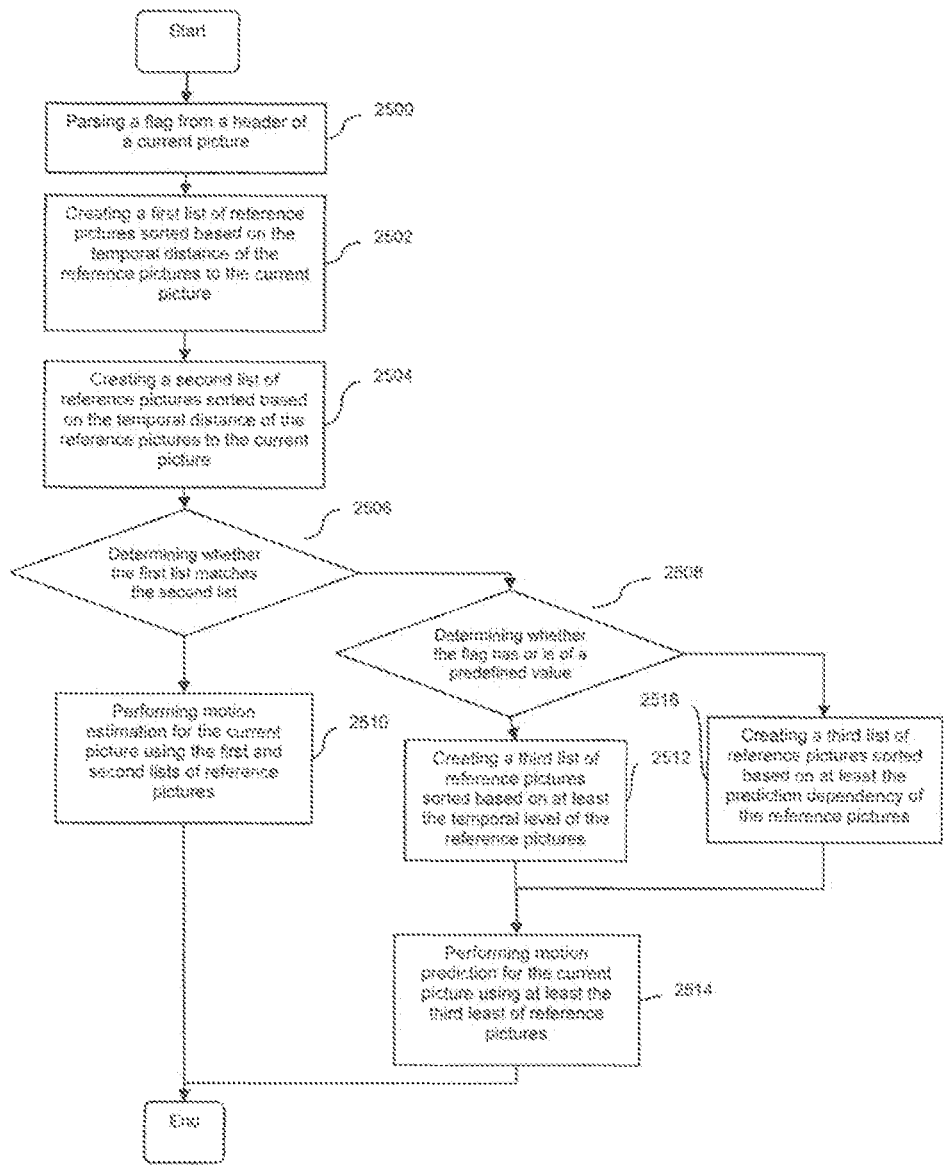

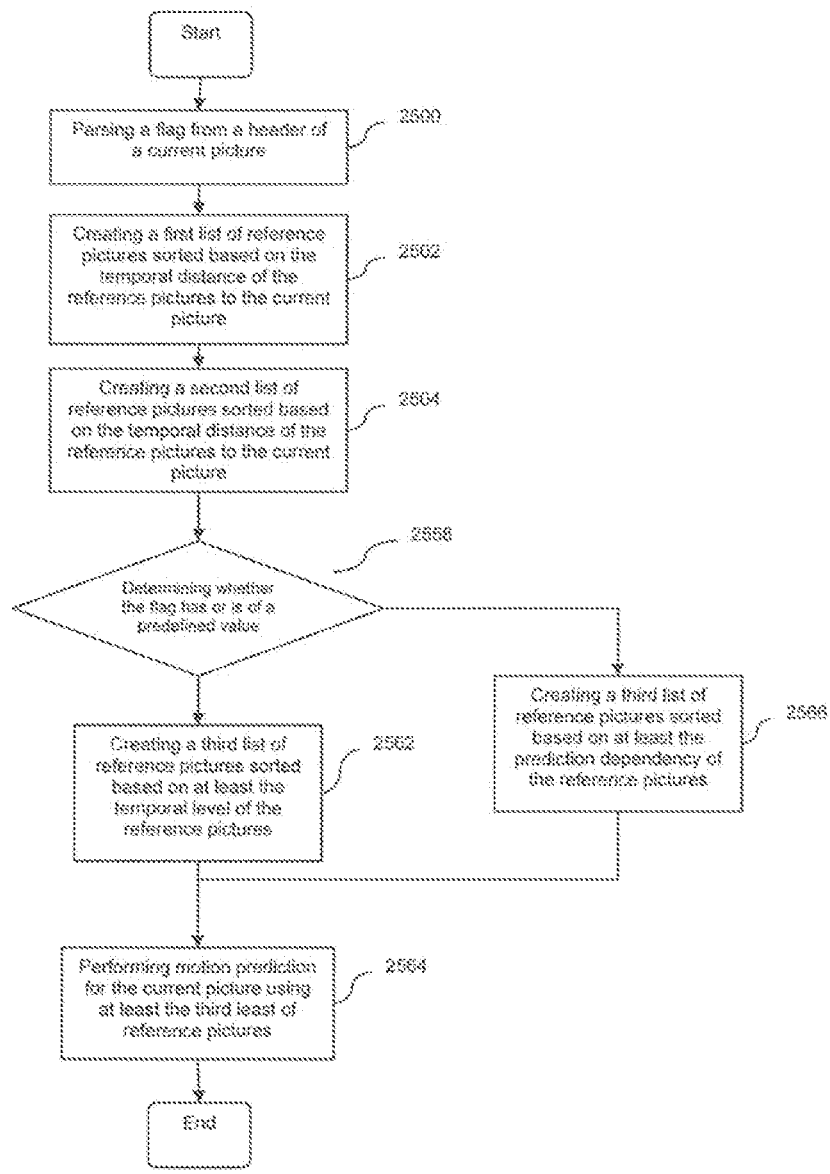
[Fig. 25B]

[Fig. 26]
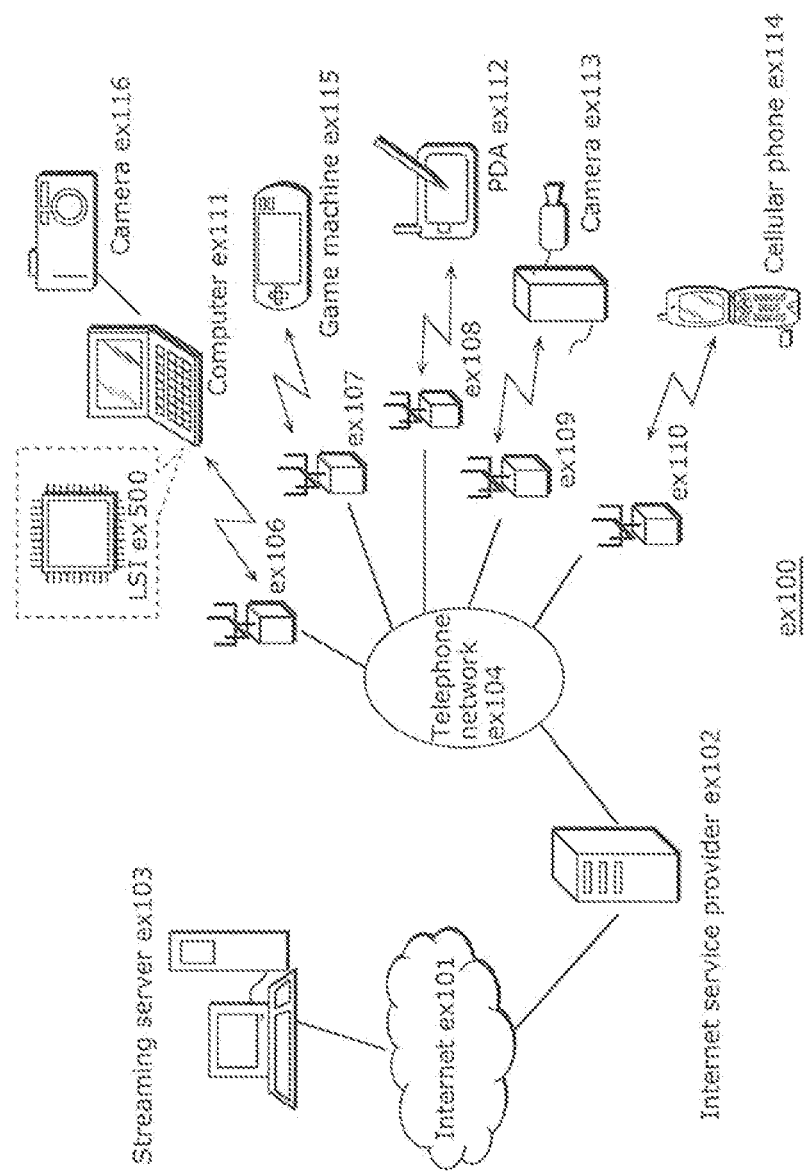

[Fig. 27]
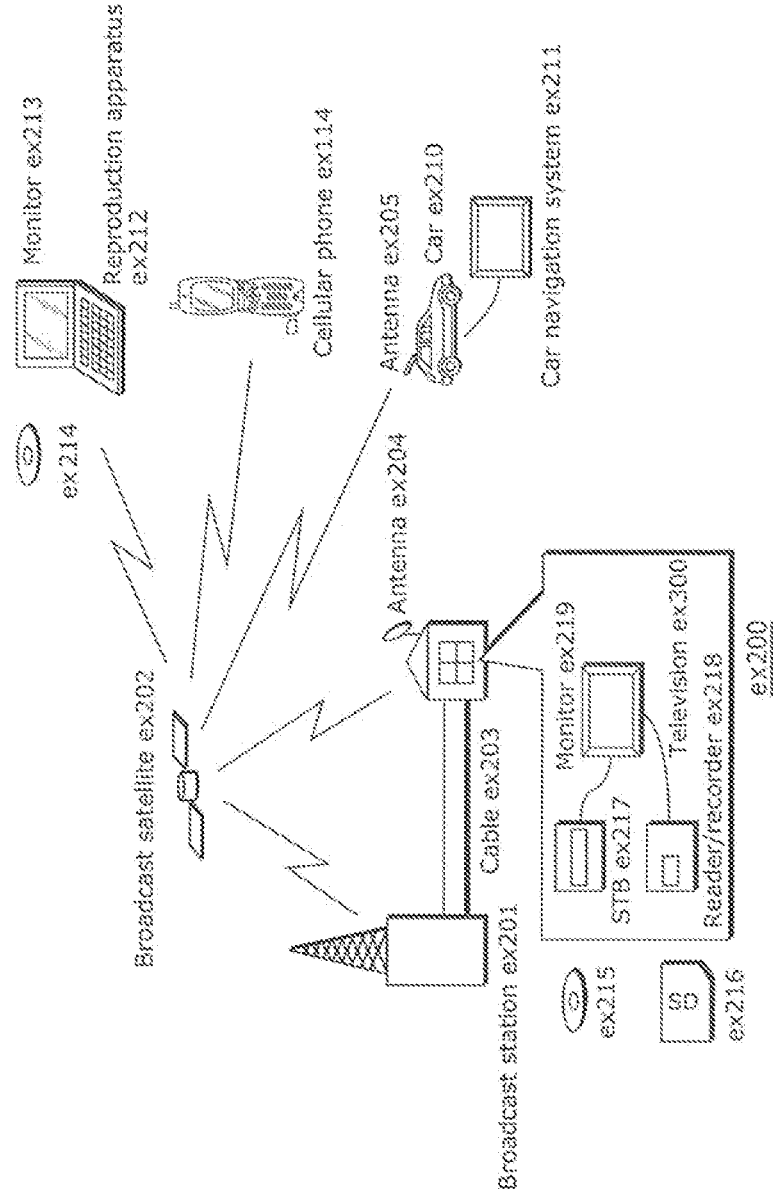

[Fig. 28]
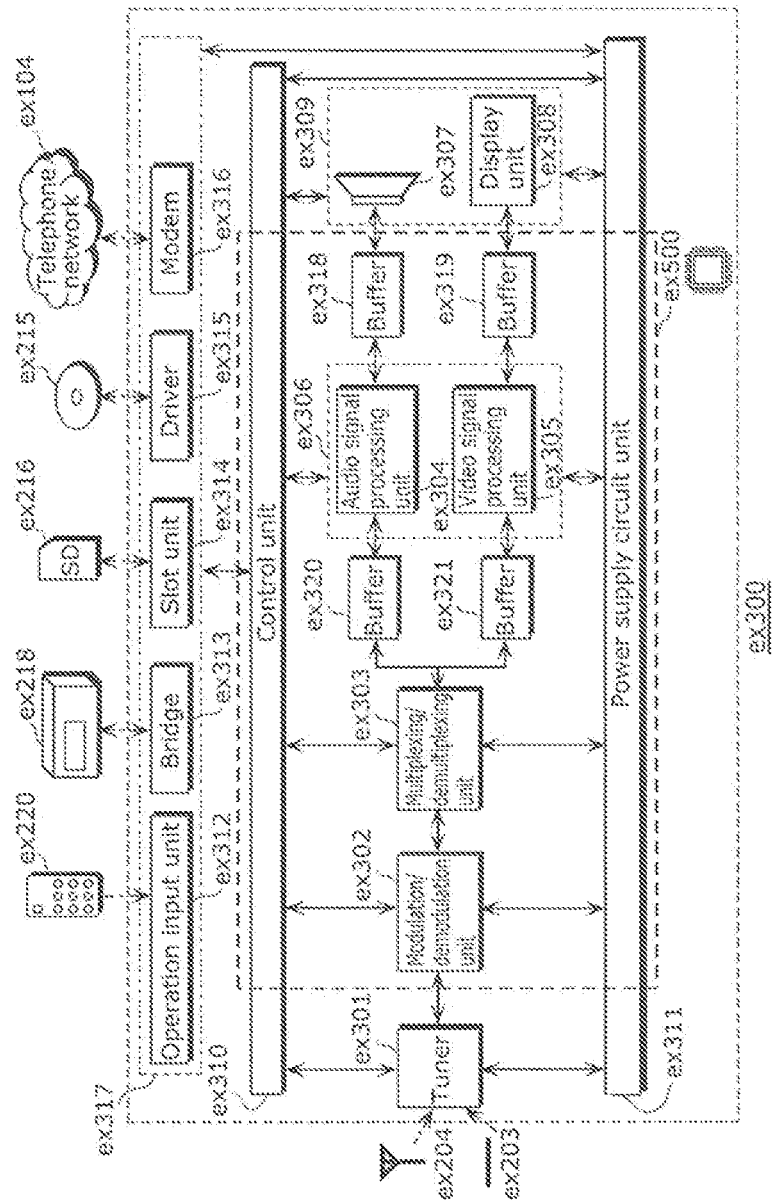

[Fig. 29]
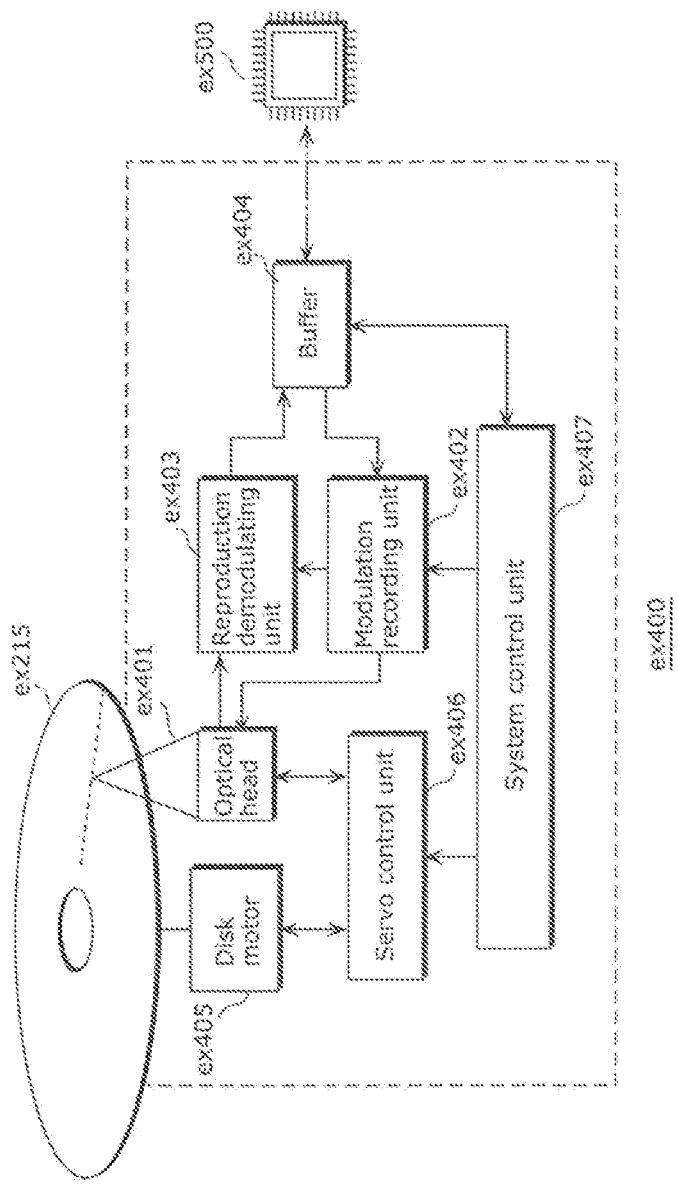

[Fig. 30]
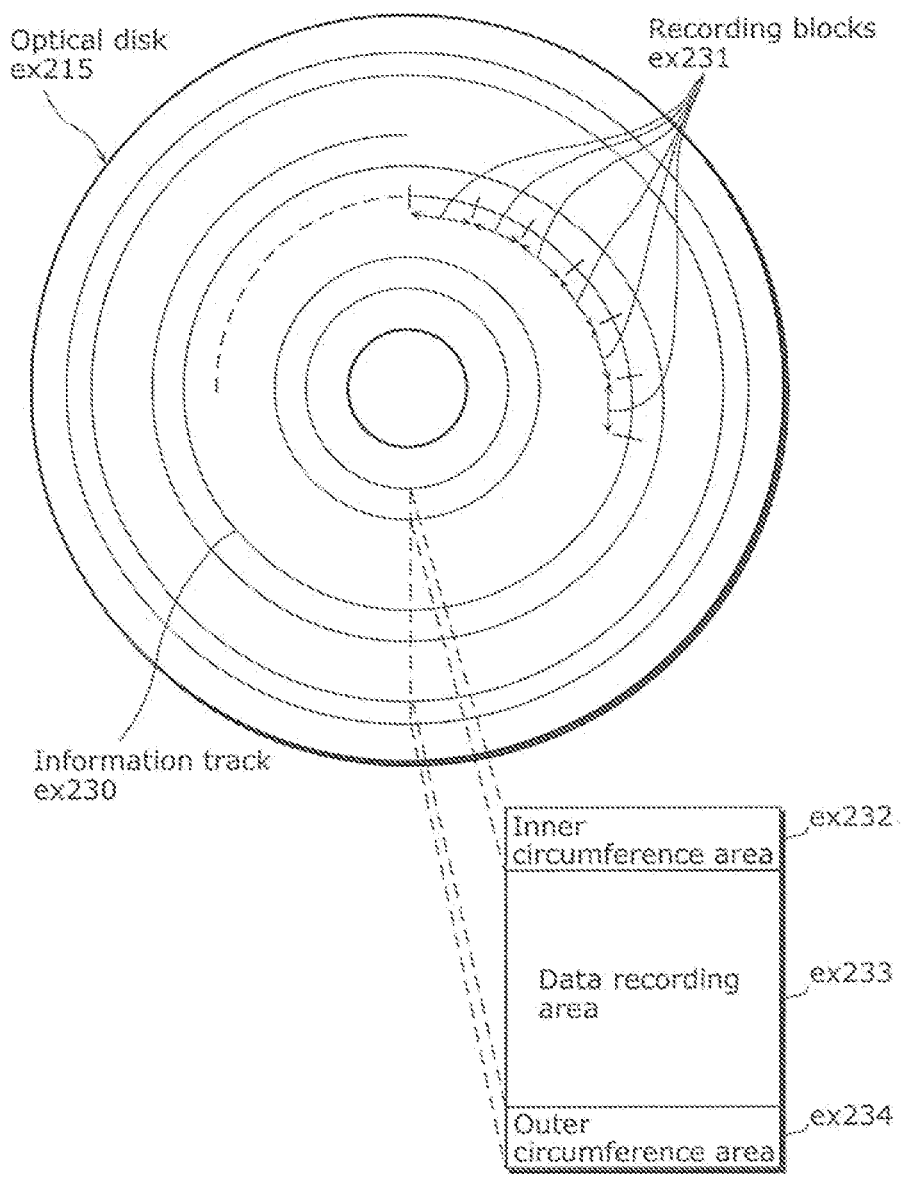

[Fig. 31A]
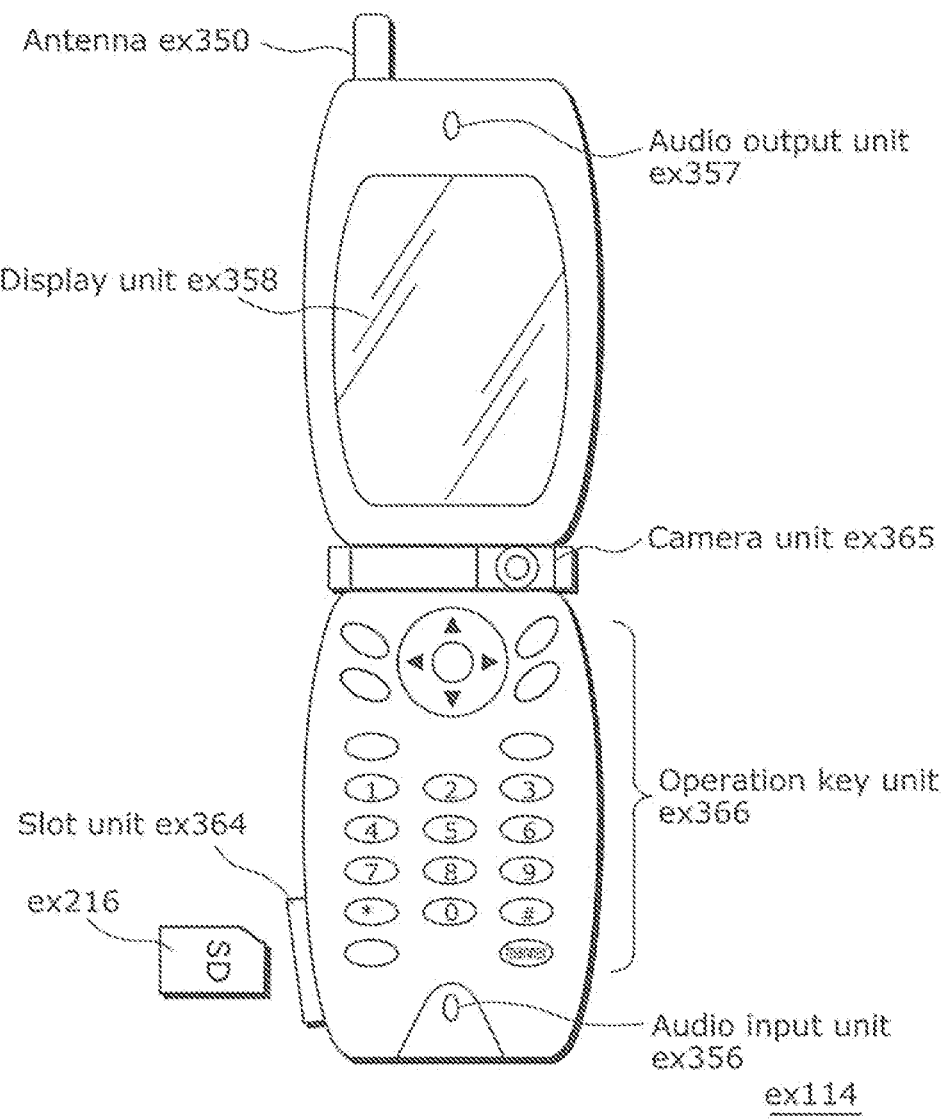

[Fig. 31B]
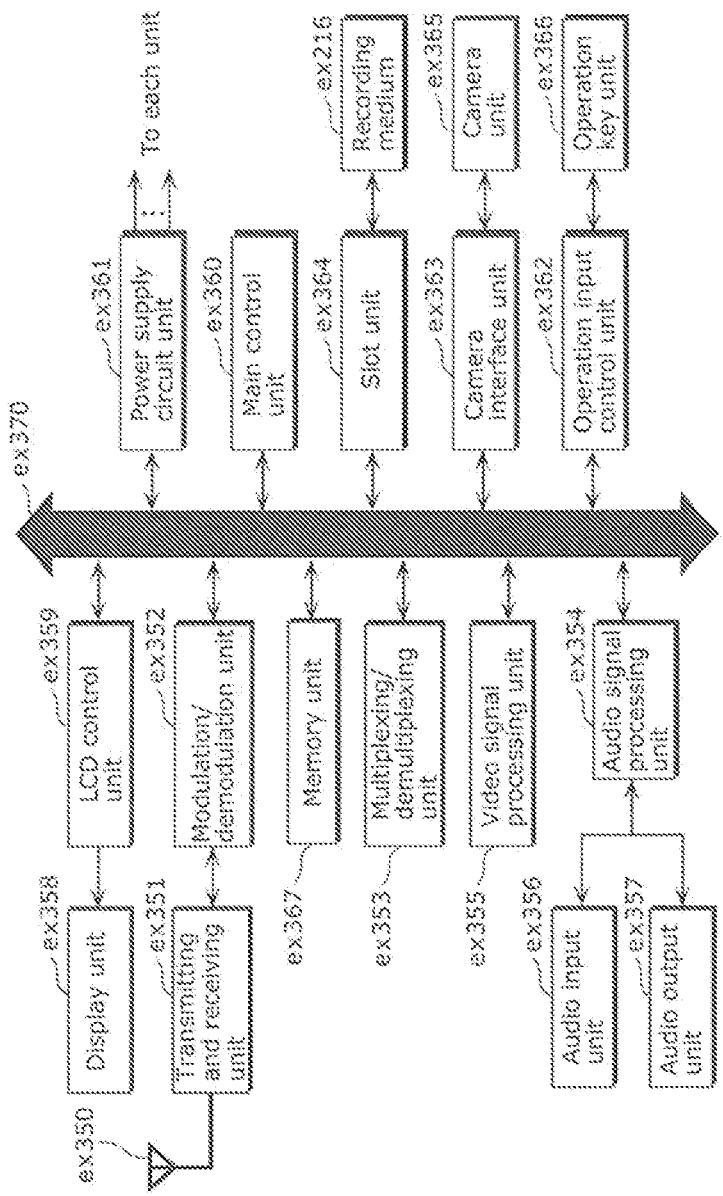

[Fig. 32]

Video stream (PID=0x1011, Primary video)
Audio stream (PID=0x1100)
Audio stream (PID=0x1101)
Presentation graphics stream (PID=0x1200)
Presentation graphics stream (PID=0x1201)
Interactive graphics stream (PID=0x1400)
Video stream (PID=0x1B00, Secondary video)
Video stream (PID=0x1B01, Secondary video)

[Fig. 33]
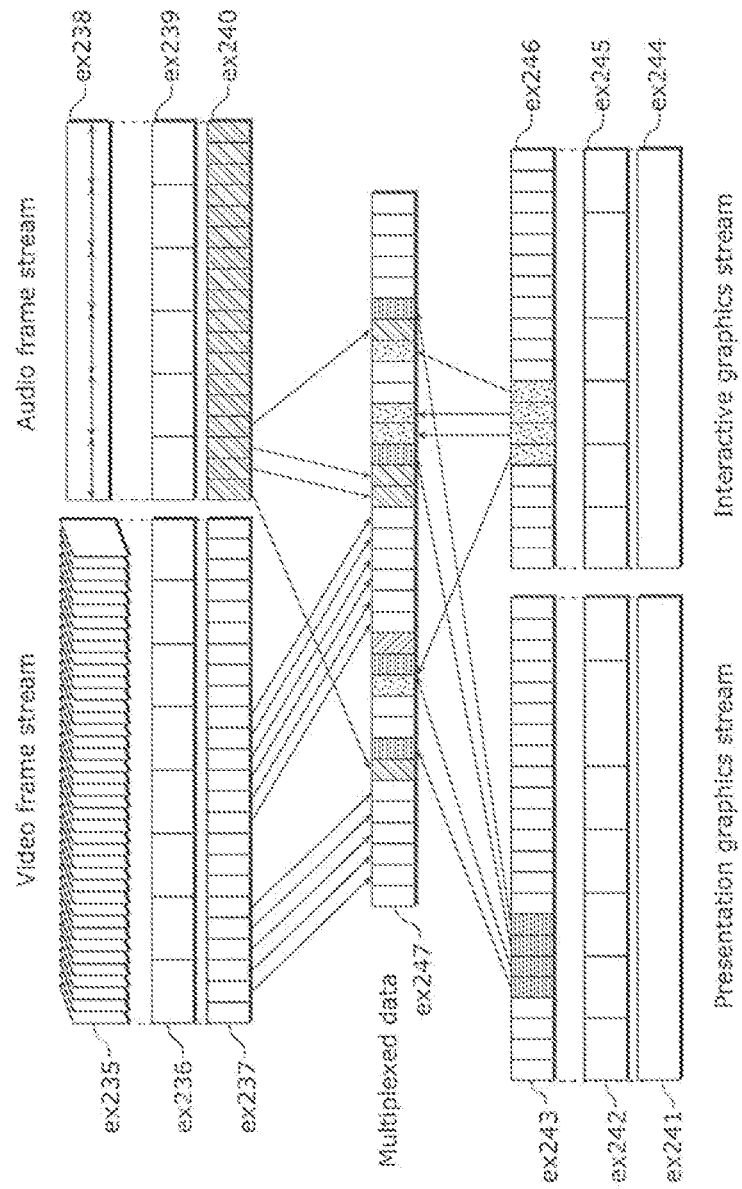

[Fig. 34]
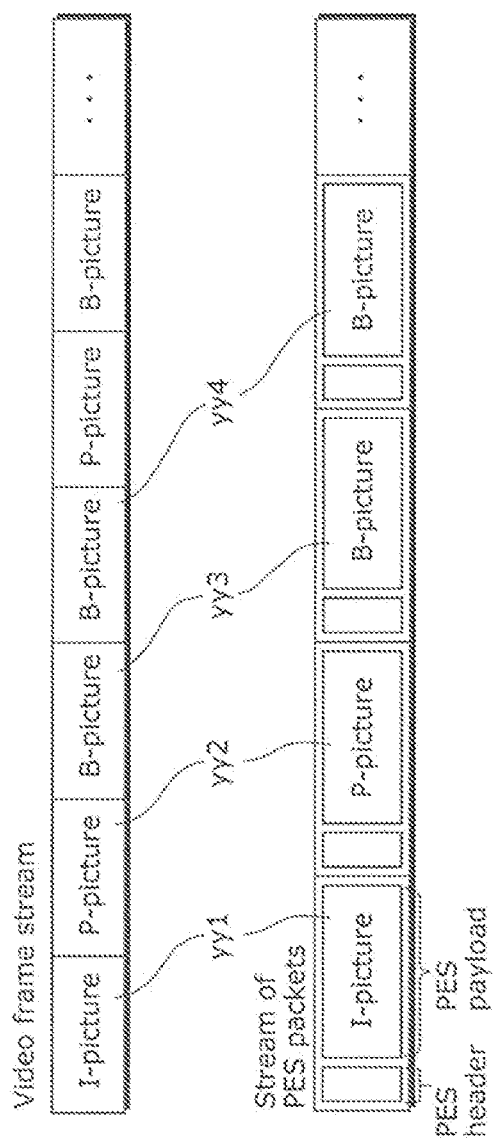

[Fig. 35]
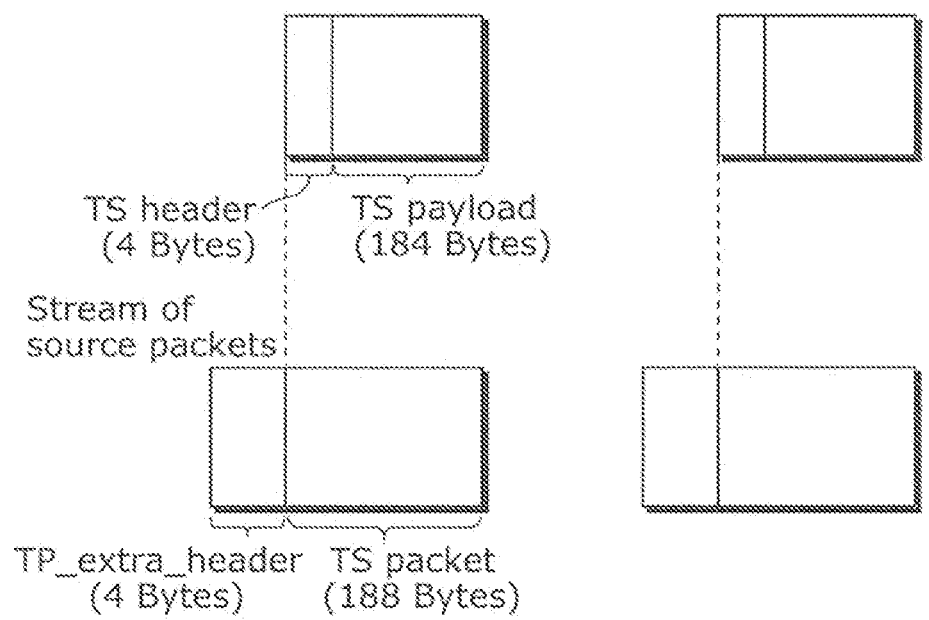
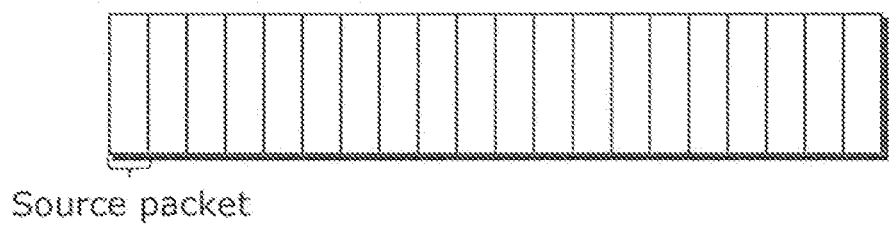

[Fig. 36]
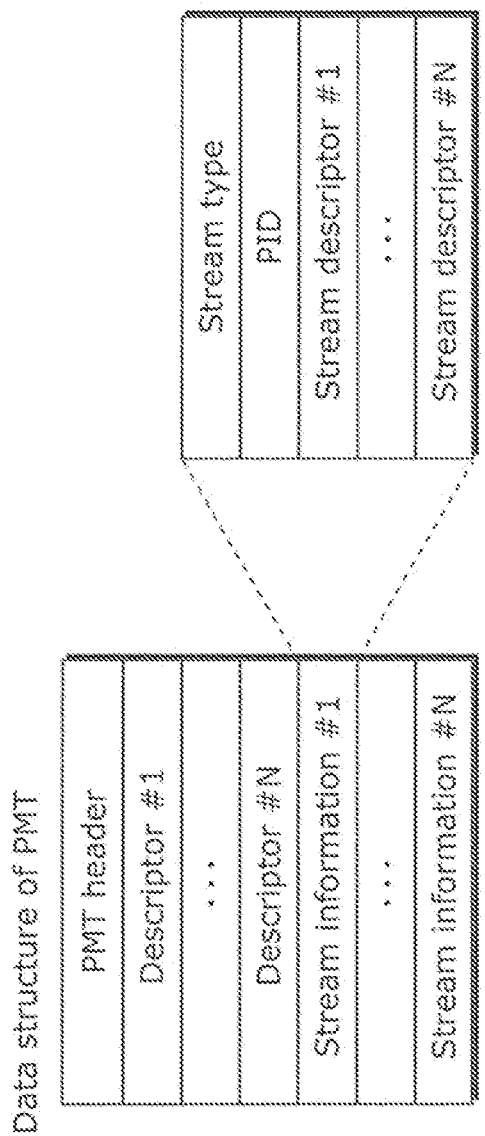

[Fig. 37]
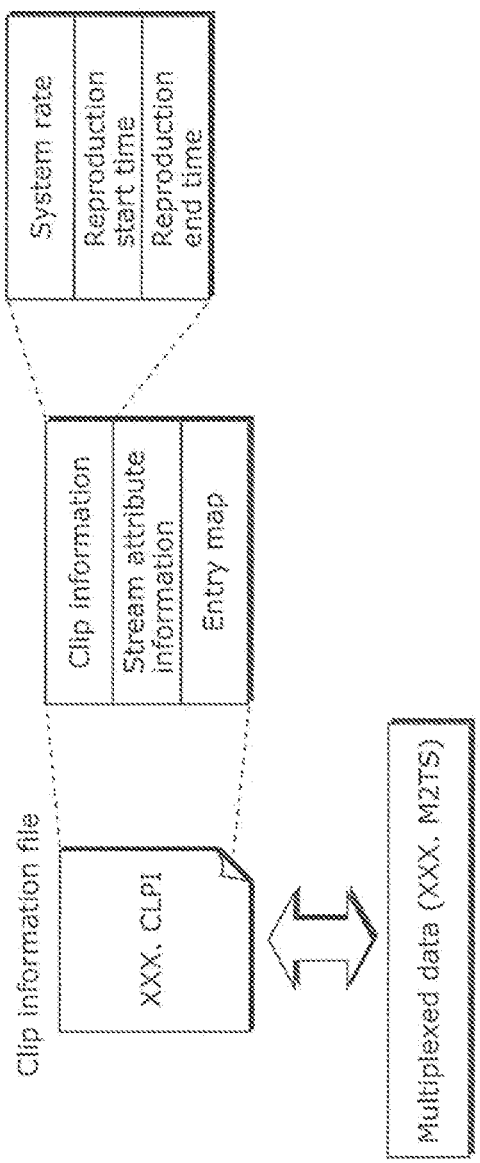

[Fig. 38]
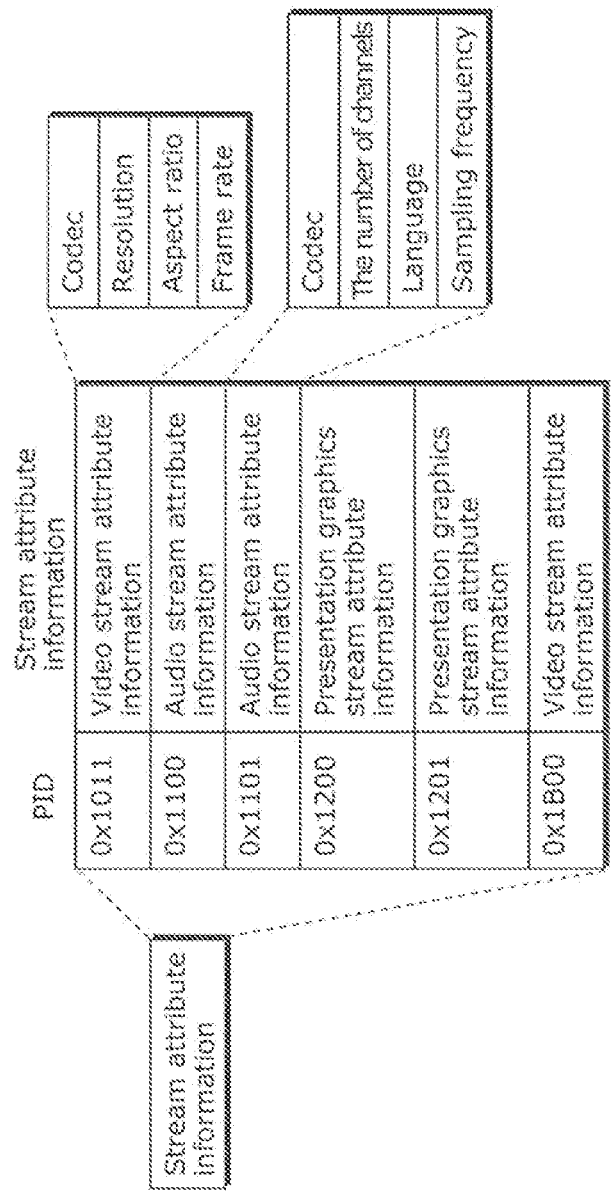

[Fig. 39]
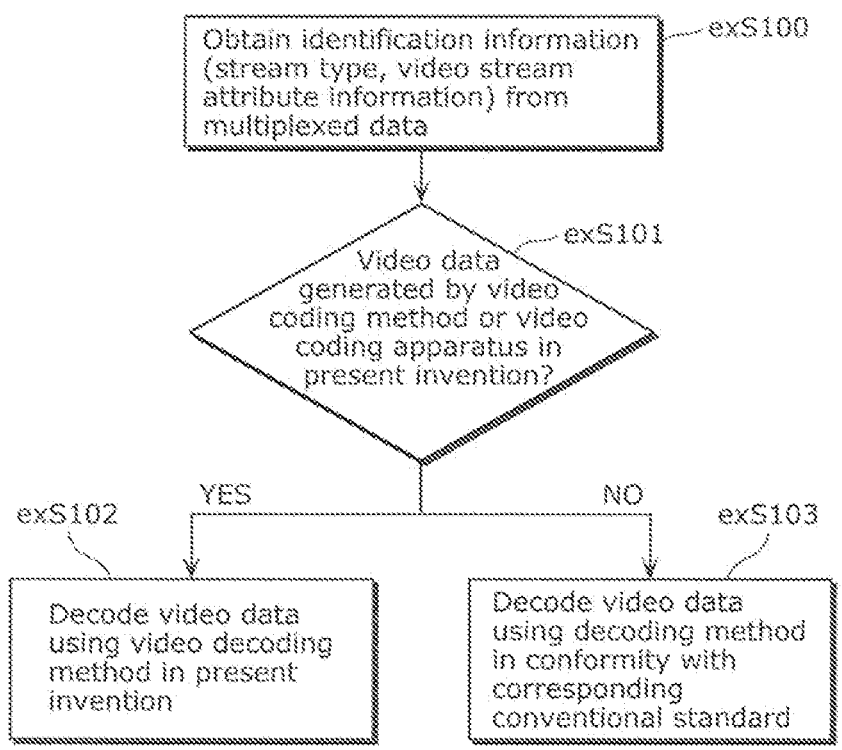

[Fig. 40]
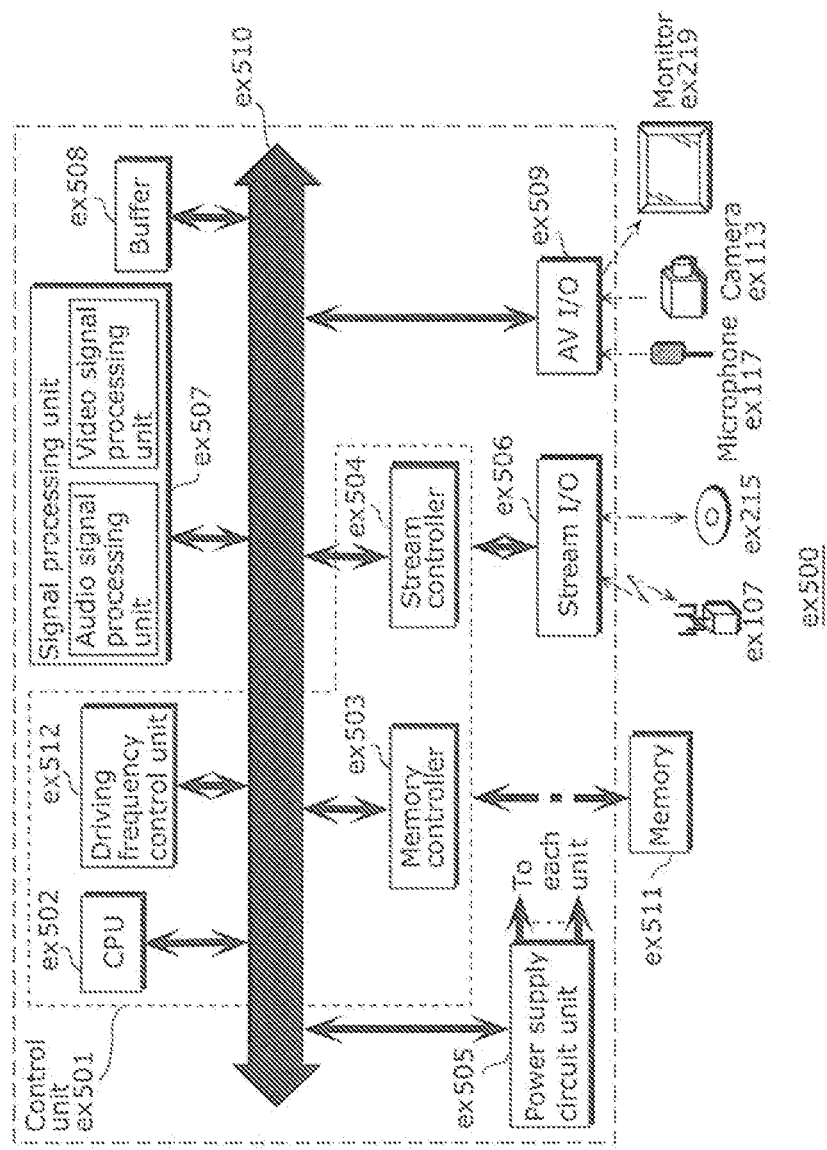

[Fig. 41]
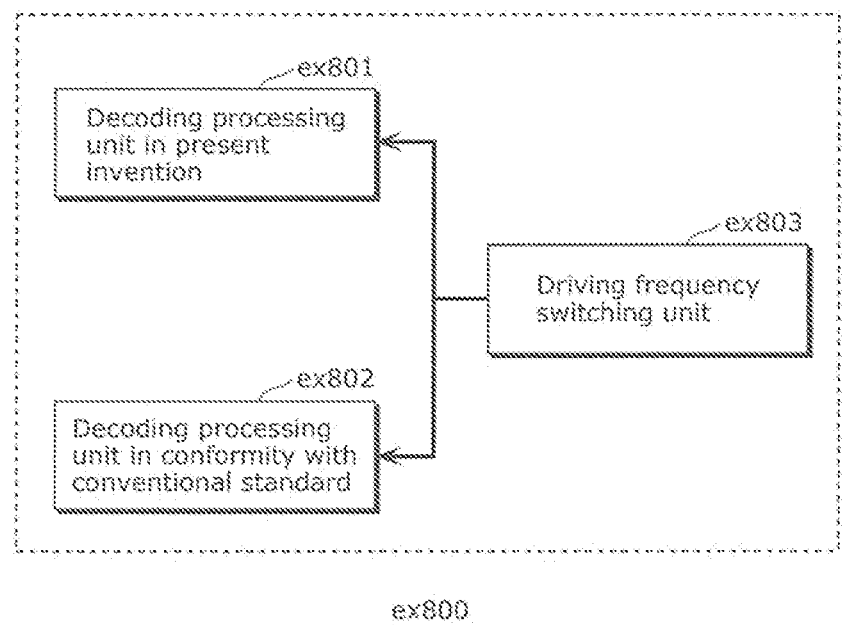
[Fig. 42]
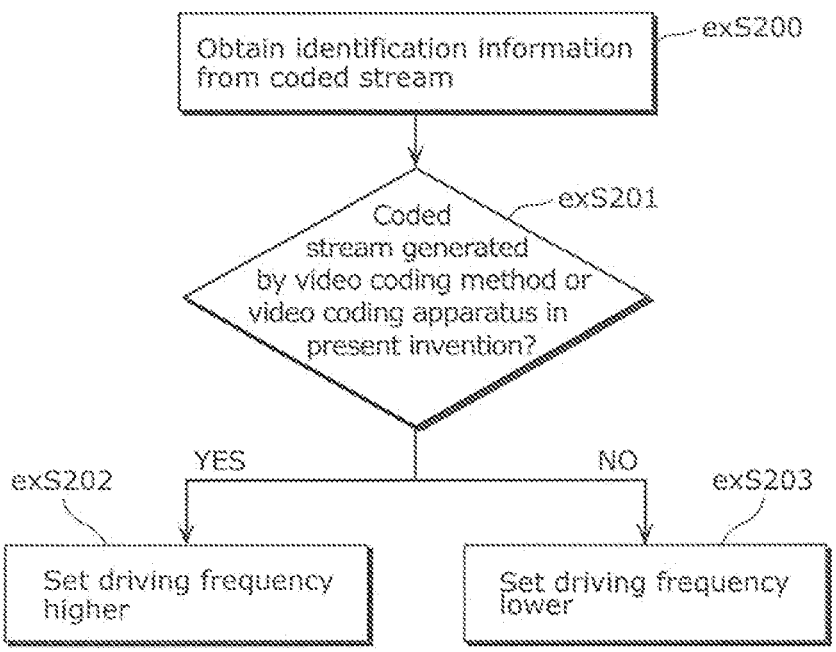

[Fig. 43]
| Corresponding standard | Driving frequency |
|---|---|
| MPEG-4 AVC | 500 MHz |
| MPEG-2 | 350 MHz |
| ⋮ | ⋮ |
[Fig. 44A]
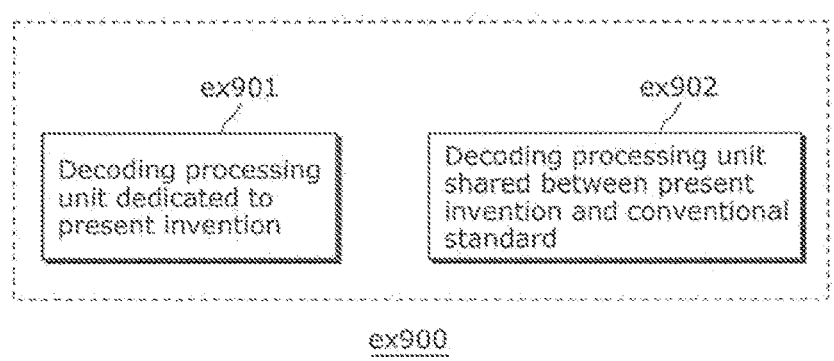
[Fig. 44B]
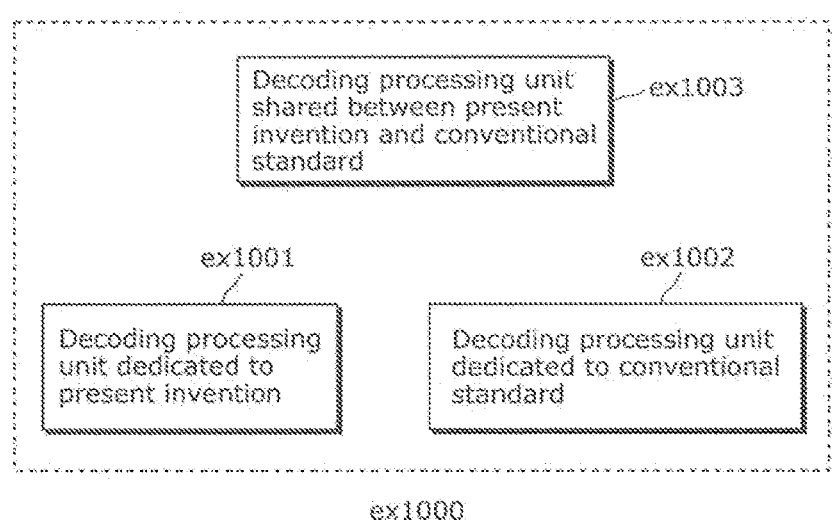

METHODS AND APPARATUSES FOR ENCODING AND DECODING VIDEO USING MULTIPLE REFERENCE PICTURES

TECHNICAL FIELD

The present invention relates to methods of encoding and decoding video using a plurality of reference pictures, and apparatuses thereof, and more particularly, for inter picture prediction.

BACKGROUND ART

State-of-the-art video coding schemes, such as MPEG-4 AVC/H.264, and the upcoming HEVC (High-Efficiency Video Coding), support inter-picture prediction utilizing motion-compensated prediction from more than one reference pictures. These schemes also support a special type of bi-direction inter-picture prediction where both directions are pointing to the same direction in time. FIG. 1 shows an example of such forward bi-predictive inter-picture prediction. In the case where there are more than one reference frames/pictures, two lists of reference pictures are created for bi-predictive inter-picture prediction, and the reference pictures that are temporally closer to the current picture are sorted to the top of the lists by a predefined scheme.

It is against this background that the present invention has been developed.

CITATION LIST

Non Patent Literature

NPL 1: ISO/IEC 14496-10, "MPEG-4 Part 10 Advanced Video Coding"

SUMMARY OF INVENTION

Technical Problem

A problem with the prior art is that reference pictures closest to the current picture are always or typically sorted to the top of the lists. However, the closest reference frames to the current picture may not always be the best reference pictures to be used for forward bi-predictive inter-picture prediction.

Solution to Problem

According to embodiment(s) of the present invention, methods of encoding/decoding video are provided to solve or at least mitigate the problem associated with the prior art described hereinbefore. For example, the methods allow for inter-picture prediction using two reference lists where one of the lists is ordered based on a temporal level or a period of a type of the reference pictures/frames.

By way of example, according to embodiment(s) of the present invention, when forward bi-predictive inter-picture prediction is used, two reference lists are created where one of the reference lists is ordered based on the temporal level of the reference pictures while the other reference list is ordered based on the nearest temporal distance to the current picture. Predefined reference picture lists constructed using embodiment(s) of the present invention allow hierarchical coding structure to be performed efficiently minimizing the bits for reference list reordering signals.

Benefits of hierarchical coding structure include improved coding efficiency and better picture quality. By way of example, in a hierarchical coding structure according to embodiment(s) of the present invention, pictures are arranged into temporal levels where the lowest level represents a lowest frame rate and inclusion of subsequent higher levels represents higher frame rates. Examples of the hierarchical coding structure are shown in FIG. 2. According to embodiment(s) of the present invention, a certain amount of coding gain can be achieved by coding pictures at lower temporal levels with better quality (for example by applying less quantization) than pictures at higher temporal levels. In HEVC, temporal levels are indicated by means of the syntax parameter temporal_id located in the NAL (Network Abstraction Layer) unit header of a coded-slice of a picture.

According to a first aspect of the present invention, there is provided a method of encoding video using a plurality of reference pictures, the method comprising:

writing a parameter indicating a temporal level of a reference picture or a period of a type of a reference picture into the reference picture for each of the plurality of reference pictures;

creating a first list of reference pictures comprising the plurality of reference pictures sorted based on the parameter; and encoding a current picture of the video using at least the first list of reference pictures.

The step of encoding the current picture may comprise performing motion estimation and motion prediction for the current picture using at least the first list of reference pictures.

The step of creating the first list may further comprise sorting the reference pictures having the same temporal level based on their temporal distance to the current picture.

The step of creating the first list may comprise:

selecting a first group of reference pictures including one or more reference pictures of the plurality of reference pictures having a temporal level equal to a predetermined value;

selecting a second group of reference pictures including reference pictures of the plurality of reference pictures having a temporal level not equal to the predetermined value; and positioning the first group of reference pictures above the second group of reference pictures within the first list.

The method may further comprise:

creating a second list of reference pictures sorted based on the temporal distance of the reference pictures to the current picture; and creating a third list of reference pictures sorted based on the temporal distance of the reference pictures to the current picture.

The method may further comprise:

determining whether the second list matches the third list; and if the second list matches the third list, the first list is created by being sorted based on the parameter and the current picture is encoded using at least the first list of reference pictures, and if the second list does not match the third list, the current picture is encoded using the second and third lists of reference pictures.

The method may further comprise:

writing a flag into a header of the current picture; and determining whether the flag is of a predefined value.

if the flag is of the predefined value, the first list is created by being sorted based on the parameter and the current picture is encoded using at least the first list of reference pictures;

if the flag is not of the predefined value, the first list is created by being sorted based on at least a prediction dependency of the reference pictures, and the current picture is encoded using at least the first list of reference pictures.

The first list may be created by modifying either the second list or the third list using the parameter.

According to a second aspect of the present invention, there is provided a method of decoding video using a plurality of reference pictures, the method comprising:

parsing a parameter indicating a temporal level of a reference picture or a period of a type of a reference picture from each of the plurality of reference pictures;

creating a first list of reference pictures comprising the plurality of reference pictures sorted based on the parameter; and decoding a current picture of the video using at least the first list of reference pictures.

The step of decoding the current picture may comprise performing motion prediction for the current picture using at least the first list of reference pictures.

The step of creating the first list may further comprise sorting the reference pictures having the same temporal level based on their temporal distance to the current picture.

The step of creating the first list may comprise:

selecting a first group of reference pictures including one or more reference pictures of the plurality of reference pictures having a temporal level equal to a predetermined value;

selecting a second group of reference pictures including reference pictures of the plurality of reference pictures having a temporal level not equal to the predetermined value; and positioning the first group of reference pictures above the second group of reference pictures within the first list.

The method may further comprise:

creating a second list of reference pictures sorted based on the temporal distance of the reference pictures to the current picture; and creating a third list of reference pictures sorted based on the temporal distance of the reference pictures to the current picture.

The method may further comprise:

determining whether the second list matches the third list; and if the second list matches the third list, the first list is created by being sorted based on the parameter and the current picture is decoded using at least the first list of reference pictures, and if the second list does not match the third list, the current picture is decoded using the second and third lists of reference pictures.

The method may further comprise:

parsing a flag from a header of the current picture; and determining whether the flag is of a predefined value.

if the flag is of the predefined value, the first list is created by being sorted based on the parameter and the current picture is decoded using at least the first list of reference pictures;

if the flag is not of the predefined value, the first list is created by being sorted based on at least a prediction dependency of the reference pictures, and the current picture is decoded using at least the first list of reference pictures.

The first list may be created by modifying either the second list or the third list using the parameter.

According to a third aspect of the present invention, there is provided an apparatus for encoding video using a plurality of reference pictures, the apparatus comprising:

a writing unit configured to write a parameter indicating a temporal level of a reference picture or a period of a type of a reference picture into the reference picture for each of the plurality of reference pictures;

a first list creation unit configured to create a first list of reference pictures comprising the plurality of reference pictures sorted based on the parameter; and an encoding section configured to encode a current picture of the video using at least the first list of reference pictures.

According to a fourth aspect of the present invention, there is provided an apparatus for decoding video using a plurality of reference pictures, the apparatus comprising:

a parsing unit configured for parsing a parameter indicating a temporal level of a reference picture or a period of a type of a reference picture from each of the plurality of reference pictures;

a first list creation unit configured for creating a first list of reference pictures comprising the plurality of reference pictures sorted based on the parameter; and a decoding unit configured for decoding a current picture of the video using at least the first list of reference pictures.

According to a fifth aspect of the present invention, there is provided a method of encoding video using a plurality of reference pictures, the method comprising:

selecting a technique among a plurality of predetermined techniques for constructing a list of reference pictures;

encoding a current picture using the list of reference pictures constructed based on the selected technique; and writing a parameter indicating the selected technique into the current picture.

According to a sixth aspect of the present invention, there is provided a method of decoding video using a plurality of reference pictures, the method comprising:

parsing a parameter indicating a selected technique among a plurality of predetermined techniques for constructing a list of reference pictures; and decoding a current picture using the list of reference pictures constructed based on the selected technique.

Advantageous Effects of Invention

The effect of the current invention is in the form of improvement in coding efficiency as current invention provides the two different reference pictures lists to improve the picture quality with negligible increase in overhead information.

BRIEF DESCRIPTION OF DRAWINGS

Embodiments of the present invention will now be described, by way of example only, with reference to the accompanying drawings, in which:

FIG. 1 depicts a diagram illustrating an example of bi-predictive inter-picture prediction with both predictions in the same direction;

FIG. 2 depicts a diagram illustrating an example of typical correspondence between temporal level and quality of coded pictures;

FIG. 3 depicts a diagram illustrating examples of reference picture lists constructed according to the prior art and an embodiment of the present invention for comparison;

FIG. 4 depicts a flowchart illustrating a method of encoding video according to a first embodiment of the present invention;

FIG. 5 depicts a flowchart illustrating a method of decoding video according to the first embodiment of the present invention;

FIG. 6 depicts a block diagram illustrating an example apparatus for encoding video according to the first embodiment of the present invention;

FIG. 7 depicts a block diagram illustrating an example apparatus for decoding video according to the first embodiment of the present invention;

FIG. 8 depicts a diagram showing exemplary locations of the parameter indicating the selected technique among a plurality of pre-determined technique for reference picture list construction in a header of a coded video bitstream according to embodiments of the present invention;

FIG. 9 depicts a flowchart illustrating a method of encoding video according to a second embodiment of the present invention;

FIG. 10 depicts a flowchart illustrating a method of decoding video according to the second embodiment of the present invention;

FIG. 11A depicts a flowchart illustrating a method of encoding video according to a third embodiment of the present invention;

FIG. 11B depicts a flowchart illustrating a method of encoding video according to another embodiment of the present invention;

FIG. 12A depicts a flowchart illustrating a method of decoding video according to the third embodiment of the present invention;

FIG. 12B depicts a flowchart illustrating a method of decoding video according to another embodiment of the present invention;

FIG. 13 depicts a flowchart illustrating an embodiment of the present invention for sorting the third list of reference pictures;

FIG. 14 depicts a flowchart illustrating another embodiment of the present invention for sorting the third list of reference pictures;

FIG. 15 depicts a block diagram illustrating an example apparatus for encoding video according to the third embodiment of the present invention;

FIG. 16 depicts a block diagram illustrating an example apparatus for decoding video according to the third embodiment of the present invention;

FIG. 17 depicts a diagram showing an example location of the parameter for indicating the temporal level of a picture in a header of a coded slice of a coded picture;

FIG. 18A depicts a flowchart illustrating a method of encoding video according to a fourth embodiment of the present invention;

FIG. 18B depicts a flowchart illustrating a method of encoding video according to another embodiment of the present invention;

FIG. 19A depicts a flowchart illustrating a method of decoding video according to the fourth embodiment of the present invention;

FIG. 19B depicts a flowchart illustrating a method of decoding video according to the fourth embodiment of the present invention;

FIG. 20 depicts a flowchart illustrating yet another embodiment of the present invention for sorting the third list of reference pictures;

FIG. 21 depicts a block diagram illustrating an example apparatus for encoding video according to the fourth embodiment of the present invention;

FIG. 22 depicts a block diagram illustrating an example apparatus for decoding video according to the fourth embodiment of the present invention;

FIG. 23 depicts a diagram showing exemplary locations of the parameter indicating the period of the type of pictures in a header of a coded video bitstream;

FIG. 24A depicts a flowchart illustrating a method of encoding video according to a fifth embodiment of the present invention;

FIG. 24B depicts a flowchart illustrating a method of encoding video according to another embodiment of the present invention;

FIG. 25A depicts a flowchart illustrating a method of decoding video according to the fifth embodiment of the present invention;

FIG. 25B depicts a flowchart illustrating a method of decoding video according to another embodiment of the present invention;

FIG. 26 depicts an overall configuration of a content providing system for implementing content distribution services according to an embodiment of the present invention;

FIG. 27 depicts an overall configuration of a digital broadcasting system according to an embodiment of the present invention;

FIG. 28 depicts a block diagram illustrating an example of a configuration of a television according to an embodiment of the present invention;

FIG. 29 depicts a block diagram illustrating an example of a configuration of an information reproducing/recording unit that reads and writes information from or on a recording medium that is an optical disk according to an embodiment of the present invention;

FIG. 30 depicts a drawing showing an example of a configuration of a recording medium that is an optical disk according to an embodiment of the present invention;

FIG. 31A depicts a drawing illustrating an example of a cellular phone;

FIG. 31B depicts a block diagram showing an example of a configuration of the cellular phone according to an embodiment of the present invention;

FIG. 32 depicts a drawing showing a structure of multiplexed data according to an embodiment of the present invention;

FIG. 33 depicts a drawing schematically illustrating how each of the streams is multiplexed in multiplexed data according to an embodiment of the present invention;

FIG. 34 depicts a drawing illustrating how a video stream is stored in a stream of PES packets in more detail according to an embodiment of the present invention;

FIG. 35 depicts a drawing showing a structure of TS packets and source packets in the multiplexed data according to an embodiment of the present invention;

FIG. 36 depicts a drawing showing a data structure of a PMT according to an embodiment of the present invention;

FIG. 37 depicts a drawing showing an internal structure of multiplexed data information according to an embodiment of the present invention;

FIG. 38 depicts a drawing showing an internal structure of stream attribute information according to an embodiment of the present invention;

FIG. 39 depicts drawing showing steps for identifying video data according to an embodiment of the present invention;

FIG. 40 depicts a block diagram illustrating an example of a configuration of an integrated circuit for implementing the video coding method and the video decoding method according to each of Embodiments;

FIG. 41 depicts a drawing showing a configuration for switching between driving frequencies according to an embodiment of the present invention;

FIG. 42 depicts a drawing showing steps for identifying video data and switching between driving frequencies according to an embodiment of the present invention;

FIG. 43 depicts a drawing showing an example of a look-up table in which the standards of video data are associated with the driving frequencies according to an embodiment of the present invention;

FIG. 44A depicts a drawing showing an example of a configuration for sharing a module of a signal processing unit; and FIG. 44B depicts a drawing showing another example of a configuration for sharing a module of a signal processing unit according to an embodiment of the present invention.

DESCRIPTION OF EMBODIMENTS

According to exemplary embodiments of the present invention, there are provided methods of encoding video using a plurality of reference pictures/frames, methods of decoding video using a plurality of reference pictures, and apparatuses thereof.

FIG. 3 shows two examples (Example #1 and Example #2) of reference list construction according to an embodiment of the present invention in comparison with the reference lists constructed according to the prior art. In the prior art, the reference list construction method is based on the temporal distance to the current picture. Therefore, in the examples illustrated, two identical lists of reference pictures (the first list and second list in FIG. 3) would be created according to the prior art. In contrast, according to an embodiment of the present invention, at least one reference list (e.g., the third list in FIG. 3) is created whereby the reference pictures in the list are ordered/sorted based on the temporal level of the reference pictures. Referring to FIG. 3, in Example #1, the reference pictures are ordered as follow (starting from the top of the reference list): reference picture "0", reference picture "2", reference picture "3", and reference picture "1". In Example #2, the reference pictures are ordered as follow (starting from the top of the reference list): reference picture "8", reference picture "10", reference picture "9", and reference picture "7". The inter-picture predictive coding is then performed using at least the third reference list. For example, the inter-picture predictive coding may be performed using only the third list or the third and second lists, instead of the first and second lists as taught in the prior art.

For consistency and clarity, unless otherwise specified, the temporal level will be described in embodiment(s) of the present invention using a convention where the lowest value of temporal level (e.g., value "0") indicate the primary picture(s) at the lowest frame rate, and subsequent higher values of temporal level (e.g., values "1", "2" and "3") respectively indicate the subsequent sets of pictures producing higher (e.g., two times) frame rates when added on top of the lower temporal levels. The same convention is used in recent video coding schemes such as HEVC, H.264 MVC extension and H.264 SVC extension, in which temporal level is indicated using the syntax parameter temporal_id. However, it will be apparent to those skilled in the art that other convention can be applied without departing from the scope of the present invention. For example, a greater value of temporal level can instead indicate a lower frame rate and still serve the same purpose.

FIG. 4 shows a flowchart describing a process of encoding video using a plurality of reference pictures according to a first exemplary embodiment of the present invention. In step 400, one of a plurality of pre-determined techniques or methods for reference picture list construction is selected. For example, the plurality of pre-determined techniques may include a first technique which constructs a reference picture list based on the temporal distance of the reference pictures to a current picture. In this case, the temporal level of the reference pictures can be used for supporting the feature of temporal scalability in the coded video bitstream. The plurality of pre-determined techniques may further include a second technique which constructs a reference picture list based on the temporal level of the reference pictures. As an example, according to the second technique, a list of reference pictures can be created whereby the reference pictures in the list are sorted by increasing temporal level (i.e., the reference picture(s) having the lowest temporal level are sorted to the top of the list).

In step 402, the current picture is encoded (e.g., motion-compensated inter-prediction encoding) using the selected technique of reference picture list construction. In step 404, a parameter or flag indicating the selected technique of reference picture list construction is written into a header of the picture (coded video bitstream). For example, the parameter values "0" and "1" may indicate that the first and second techniques, respectively.

FIG. 5 shows a flowchart describing a process of decoding video using a plurality of reference pictures according to the first exemplary embodiment of the present invention. In step 500, a header of a current picture (coded video bitstream) is parsed to obtain a parameter or flag indicating the selected technique among the plurality of pre-determined techniques for reference picture list construction. In step 502, using the parameter to determine the selected technique, the current picture is decoded (e.g. motion-compensated inter-prediction decoding) based on the selected technique of reference picture list construction. Preferably, the same plurality of pre-determined techniques for reference picture list construction is present in the encoding process and the decoding process according to the first exemplary embodiment as described hereinbefore.

FIG. 6 shows a block diagram illustrating an apparatus for encoding video according to the first exemplary embodiment of the present invention. It will be apparent to the person skilled in the art that modifications can be made to the example apparatus shown in FIG. 6 to implement any one of the methods of encoding video disclosed herein or other methods without departing from the scope of the present invention. That is, the apparatus for encoding video according to the present invention is not limited to the components/elements, and the interconnections thereof, as shown in FIG. 6 and can be modified accordingly by the person skilled in the art for various purposes.

The exemplary apparatus for encoding video comprises a selecting unit 700, a first switch unit 702, a first creating unit 704, a second creating unit 706, a second switch unit 708, an encoding unit 710, a writing unit 712, and a memory unit 714.

As shown in FIG. 6, the selecting unit 700 is configured to select between two or more pre-determined techniques or methods for reference picture list construction and output a parameter or flag indicating the selection D701. The selection parameter D701 is used by the first switch unit 702 for sending stored reference pictures D703 from the memory unit 714 either to the first creating unit 704 or to the second creating unit 706. The first creating unit 704 or the second creating unit 706 is configured to create reference picture lists according to the selected pre-determined technique of reference picture list construction. Based on selection parameter D701, the second switch unit 708 is configured to send either the reference picture lists D707 produced by the first creating unit 704 or the reference picture lists D711 produced by the second creating unit 706 to the encoding unit 710. The encoding unit 710 is configured to receive the reference picture lists D713, an original uncompressed image D715 and stored reference pictures D703, then perform encoding, for example, using motion-compensated inter-picture prediction, and output a coded picture D717. The writing unit 712 is configured to write the coded picture D717 and the selection parameter D701 into a coded video bitstream D719.

FIG. 7 shows a block diagram illustrating an apparatus for decoding a video according to the first exemplary embodiment of the present invention. It will be apparent to the person skilled in the art that modifications can be made to the example apparatus shown in FIG. 7 to implement any one of the methods of decoding video disclosed herein or other methods without departing from the scope of the present invention. That is, the apparatus for decoding video according to the present invention is not limited to the components/elements, and the interconnections thereof, as shown in FIG. 7 and can be modified accordingly by the person skilled in the art for various purposes.

The apparatus comprises a parsing unit 800, a first switch unit 802, a first creating unit 804, a second creating unit 806, a second switch unit 808, and a decoding unit 810.

As shown in FIG. 7, the parsing unit 800 is configured to parse a header of a current picture (coded video bitstream) D801 to obtain a parameter or flag D803 indicating the selected pre-determined techniques for reference picture list construction. Based on the parsed parameter D803, the switch unit 802 is configured to send the stored reference pictures D801 either to the first creating unit D804 or to the second creating unit D806, which creates reference picture lists according to the selected pre-determined technique of reference picture list construction. Based on the parsed parameter D803, the second switch unit 808 is configured to send either the reference picture lists D807 from the first creating unit D804 or the reference picture lists D811 from the second creating unit 806 to the decoding unit 810. The decoding unit is configured to use the reference picture lists D813, coded video bitstream D801 and stored reference pictures D801, then performs decoding, for example, using motion-compensated inter-picture prediction to produce a reconstructed picture D817.

FIG. 8 shows a diagram illustrating example locations of the parameter or flag for indicating the selected pre-determined technique for reference list construction in a coded video bitstream. For example, the parameter or flag can have a value of "0" for a first pre-determined technique and a value of "1" for a second pre-determined technique. According to embodiments of the present invention, FIG. 8(a) shows a location of the parameter in a sequence header of a compressed video bitstream. FIG. 8(b) shows a location of the parameter in a picture header of a compressed video bitstream, FIG. 8(c) shows a location of the parameter in a slice header of a compressed video bitstream, and FIG. 8(d) shows that the parameter can also be derived from a pre-defined look-up table based on a profile parameter, a level parameter, or both the profile and level parameters located in a sequence header of a compressed video bitstream.

FIG. 9 depicts a flowchart illustrating a method of encoding video using a plurality of reference pictures according to a second exemplary embodiment of the present invention. As a first step 900, the method comprises writing a parameter indicating a temporal level of a reference picture or a period of a type of reference picture into the reference picture for each of the plurality of reference pictures. For example, as illustrated in FIG. 3, the parameter indicating the temporal level may be a value such as "0", "1" or "2", etc., whereby the lowest value of temporal level indicate the reference picture(s) at the lowest frame rate as described hereinbefore. The parameter indicating a period of a type of a reference picture may be a value such as "1" or "2", etc., whereby the value indicates the interval which the particular type of reference pictures (e.g., primary pictures) occurs periodically. By way of example, if the parameter indicating the period of the type of the reference pictures is "4", this indicates that that particular type of reference pictures occur periodically every 4 frames in output order.

The method of encoding video further comprises a step 902 of creating a first list of reference pictures comprising the plurality of reference pictures sorted based on the parameter. For example, in the case of the parameter being indicative of a temporal level of the reference picture, step 902 creates a first list of reference pictures sorted based on the temporal level of the reference pictures such as ordering lower reference pictures having lower temporal level so as to be at the top of the first list.

The method of encoding video further comprises a step 904 of encoding a current picture of the video using at least the first list of reference pictures. For example, encoding the current picture comprises performing motion estimation and motion prediction for the current picture using at least the first list of reference pictures.

FIG. 10 depicts a flowchart illustrating a method of decoding video using a plurality of reference pictures according to the second exemplary embodiment. As a first step 1002, the method comprises parsing a parameter indicating a temporal level of a reference picture or a period of a type of reference picture from each of the plurality of reference picture. As described hereinbefore, by way of example, the parameter indicating the temporal level may be a value such as "0", "1" or "2", etc. whereby the lowest value of temporal level indicate the reference picture(s) at the lowest frame rate as described hereinbefore. The parameter indicating a period of a type of reference picture may be a value such as "1" or "2". etc. whereby the value indicates the reoccurrence period (i.e., interval) of that particular type of the reference picture (e.g. primary pictures).

The method of decoding video further comprises a step 1004 of creating a first list of reference pictures including the plurality of reference pictures sorted based on the parameter, and a step 1006 of decoding the current picture of the video using at least the first list of reference pictures. For example, decoding the current picture comprises performing motion prediction for the current picture using at least the first list of reference pictures.

An apparatus for encoding video using a plurality of reference pictures according to the second exemplary embodiment of the present invention comprises a writing unit, a first list creation unit, and an encoding section. The writing unit is configured to write the parameter into each of the plurality of reference pictures, the first list creation unit is configured to create the first list of reference pictures comprising the plurality of reference pictures sorted based on the parameter, and the encoding section is configured to encode the current picture of the video using at least the first list of reference pictures. For example, the encoding section may comprise a motion estimation unit configured to perform motion estimation for the current picture using at least the first list of reference pictures and a motion prediction unit configured to perform motion prediction for the current picture using at least the first list of reference pictures.

An apparatus for decoding video using a plurality of reference pictures according to the second exemplary embodiment of the present invention comprises a parsing unit, a first list creation unit, and a decoding section. The parsing unit is configured for parsing the parameter from each of the plurality of reference pictures, the first list creation unit is configured to create the first list of reference pictures comprising the plurality of reference pictures sorted based on the parameter, and the decoding section is configured to decode the current picture of the video using at least the first list of reference pictures. For example, the decoding section may comprise a motion prediction unit configured to perform motion prediction for the current picture using at least the first list of reference pictures.

The second exemplary embodiment of the present invention has been found to provide an improvement in encoding/decoding efficiency. As discussed in the background, a problem with the prior art is that reference pictures closest to the current picture are always sorted to the top of the reference lists. In contrast, according to the second exemplary embodiment of the present invention, a parameter indicating a temporal level of a reference picture or a period of a type of the reference picture is written into the reference pictures, and at least one reference list is created with reference pictures sorted based on the parameter. For example, the case where the parameter indicates the temporal level of the reference picture is illustrated in FIG. 3. Referring to FIG. 3, based on prior art teaching, the reference list for Picture/Frame "4" in Example #1 would be created only based on the temporal distance, that is, Picture "3" being closest to Picture "4" would be arranged at the top of the list, followed by Picture "2" and Picture "1", and Picture "0" being at the bottom of the reference list. However, due to the higher temporal level of Picture "3", Picture "3" may not be the best reference picture/frame to use for inter picture prediction in respect of Picture "4" and thus it may not be ideal to arrange such a picture at the top of the list. In contrast, according to the second exemplary embodiment. Picture "0" having been assigned a parameter with the lowest temporal level amongst Pictures "0" to "3" would be arranged at the top of the list, followed by Picture "2". Picture "3" and Picture "1". As a result, more suitable or appropriate reference picture(s) is arranged at the top of the list which is therefore represented with the least bits for use in inter picture prediction. Accordingly, better encoding/decoding of video can be achieved according to the second exemplary embodiment of the present invention.

Further exemplary embodiments of the present invention will now be described hereinafter with reference to Figures, providing more specific examples of the second exemplary embodiments of the present invention. It will be appreciated to the person skilled in the art that the exemplary embodiments described hereinafter are merely provided by way of examples and do not restrict the scope of the present invention.

FIG. 11A shows a flowchart illustrating a process or method of encoding video using multiple reference pictures according to a third exemplary embodiment of the present invention. As shown in FIG. 11A, in step 1100, a parameter for indicating/classifying a temporal level of a reference picture is written into a header of the reference picture (e.g., a coded slice of the reference picture). An example of the parameter classifying the temporal level is the syntax parameter temporal_id in HEVC video coding scheme. In step 1102, a first list of reference pictures sorted based on the temporal distance to a current picture is created. In step 1104, a second list of reference pictures sorted also based on the temporal distance to the current picture is created. Then in step 1106, a comparison is performed to determine or judge whether the first list matches (e.g., is identical to) the second list.

If the first list matches the second list, a third list of reference pictures (e.g., corresponding to the first list of reference pictures described in the second exemplary embodiment) sorted by using at least the temporal level of the reference pictures to the current picture is created. Exemplary embodiments of sorting/ordering the third list of reference pictures by at least the temporal level of the reference pictures will be described later with reference to FIGS. 13 and 14. Next, a motion estimation process is performed for the current picture (e.g., blocks of image samples) using at least the third list of reference pictures in step 1110 and a motion prediction process is performed for the current picture using at least the third list of reference pictures in step 1112. For example, the motion estimation process may be performed using only the third list, using the second and third lists, or using the first and third lists.

In an embodiment of the present invention, the third list is created by reordering the reference pictures from either the first list or the second list using at least the temporal level of the reference pictures to the current picture. In such an embodiment, the third list of reference pictures effectively represents a modified version of either the first list or the second list of reference pictures.

If the first list does not match the second list in step 1106, a motion estimation process is performed for the current picture using the first and second lists of reference pictures in step 1114 and a motion prediction process is performed for the current picture using the first and second lists of reference pictures in step 1116.

In an embodiment, the logic at step 1106 may be switched. In particular, if the first list matches the second list, a motion estimation process is performed for the current picture using the first and second lists of reference pictures in step 1114 and a motion prediction process is performed for the current picture using the first and second lists of reference pictures in step 1116. On the other hand, if the first list does not match the second list in step 1106, a third list of reference pictures (e.g. corresponding to the first list of reference pictures described in the second exemplary embodiment) sorted by at least the temporal level of the reference pictures is created in step 1108. Next, a motion estimation process is performed for the current picture (e.g., a block of image samples) using at least the third list of reference pictures in step 1108 and a motion prediction process is performed for the current picture using at least the third list of reference pictures in step 1112. For example, the motion estimation process and/or the motion prediction process may be performed using only the third list, using the second and third lists, or using the first and third lists.

Yet another embodiment is shown in FIG. 11B. In particular, steps 1106, 1114 and 1116 as shown in FIG. 11A are omitted. Accordingly, after step 1104, a third list of reference pictures (e.g., corresponding to the first list of reference pictures described in the second exemplary embodiment) sorted by using at least the temporal level of the reference pictures to the current picture is created in step 1158. Next, a motion estimation process is performed for the current picture (e.g. blocks of image samples) using at least the third list of reference pictures in step 1160 and a motion prediction process is performed for the current picture using at least the third list of reference pictures in step 1162. For example, the motion estimation process and/or the second and third lists of reference pictures, or using the first and third lists of reference pictures.

FIG. 12A shows a flowchart illustrating a process or method of decoding video using multiple reference pictures according to the third exemplary embodiment of the present invention. As shown in FIG. 12A, in step 1200, a parameter indicating the temporal level of the reference picture is parsed or determined from a header of the reference picture from each of the multiple reference pictures. Next, in step 1202, a first list of reference pictures sorted based on the temporal distance to a current picture is created. In step 1204, a second list of reference pictures sorted also based on the temporal distance to the current picture is created. Then in step 1206, a comparison is performed to determine or judge whether if the first list matches (e.g., is identical to) the second list.

If the first list matches the second list, a third list of reference pictures (e.g., corresponding to the first list of reference pictures described in the second exemplary embodiment) sorted by at least the temporal level of the reference pictures. Similarly, exemplary embodiments of sorting/ordering the third list of reference pictures by at least the temporal level of the reference pictures will be described later with reference to FIGS. 13 and 14. Next, a motion prediction process is performed for the current picture (e.g. blocks of image samples) using at least the third list of reference pictures in step 1210. For example, the motion prediction process may be performed using the second and third lists of reference pictures, or using the first and third lists of reference pictures.

If the first list does not match the second list in step 1206, a motion prediction process is performed for the current picture using the first and second lists of reference pictures in step 1212.

In an embodiment, the logic at step 1206 may be switched. In particular, if the first list matches the second list, a motion prediction process is performed for the current picture using the first and second lists of reference pictures in step 1212. On the other hand, if the first list does not match the second list in step 1206, a third list of reference pictures (e.g., corresponding to the first list of reference pictures described in the second exemplary embodiment) sorted at least based on the temporal level of the reference pictures is created in step 1208. Next, a motion prediction process is performed for the current picture using at least the third list of reference pictures in step 1210. For example, the motion prediction process may be performed using only the third list, using the second and third lists, or using the first and third lists.

Yet another embodiment is shown in FIG. 12B. In particular, steps 1206 and 1212 as shown in FIG. 12A are omitted. Accordingly, after step 1204, a third list of reference pictures (e.g., corresponding to the first list of reference pictures described in the second exemplary embodiment) sorted by at least the temporal level of the reference pictures is created in step 1258. Next, a motion prediction process is performed for the current picture (e.g. blocks of image samples) using at least the third list of reference pictures in step 1260. For example, the motion prediction process may be performed using only the third list, using the second and third lists, or using the first and third lists.

FIG. 13 shows a flowchart illustrating an embodiment of the present invention for sorting/ordering the third list of reference pictures by at least the temporal level of the reference pictures. In step 1300, the reference pictures in the list are sorted in the order of increasing temporal level. In step 1302, if two or more reference pictures have the same temporal level, the two or more reference pictures are in turn sorted according to their respective temporal distance to the current picture. For example, in step 1302, reference pictures having the same temporal level are sorted in the order of increasing temporal distance to the current picture, such that the reference pictures with shorter temporal distance to the current picture are located higher (smaller reference index value) in the third list as compared to the reference pictures with longer temporal distance to the current picture. By way of example, in Example #1 shown in FIG. 3. Pictures "1" and "3" have the same temporal level "2". Accordingly, Pictures "1" and "3" are further sorted based on their respective temporal distance to the current picture "4". As a result, Picture "3" is arranged so as to be above Picture "1" in the list.

FIG. 14 shows a flowchart illustrating another embodiment of the present invention for sorting/ordering the third list of reference pictures by at least the temporal level of the reference pictures. In step 1400, a first group of reference pictures comprising one or more reference pictures having temporal level equal to a pre-determined value is selected. An example of the pre-determined value may be "0" indicating the lowest temporal level (corresponding to the lowest frame rate representation). Next, in step 1402, a second group of reference pictures comprising reference pictures that are not included in the first group of reference pictures is selected. In step 1404, the first group of reference pictures is positioned/sorted at the top of the third list whereby the reference pictures within the first group are sorted according to their respective temporal distance to the current picture. Next, in step 1406, the second group of reference pictures is positioned/sorted after/below the first group of reference pictures in the third list according to their respective temporal distance to the current picture. For example, sorting the reference pictures within the first group and/or the second group are sorted in the order of increasing temporal distance to the current picture.

FIG. 15 shows a block diagram illustrating an example apparatus for encoding video according to the third exemplary embodiment of the present invention. It will be apparent to the person skilled in the art that modifications can be made to the example apparatus shown in FIG. 15 to implement any one of the methods of encoding video disclosed herein (e.g. the method as shown in FIG. 9) or other methods without departing from the scope of the present invention. That is, the apparatus for encoding video according to the present invention is not limited to the components/elements, and the interconnections thereof, as shown in FIG. 15 and can be modified accordingly by the person skilled in the art for various purposes.

The exemplary apparatus for encoding video comprises a motion estimation unit 1500, a motion prediction unit 1502, a first list creation unit 1504, a second list creation unit 1516, a third list creation unit 1510, a first switch unit 1506, a second switch unit 1508, a memory unit 1512, a comparator unit or a determining unit 1514 and a writing unit 1518.

As shown in FIG. 15, the motion estimation unit 1500 is configured or operable to read a current picture (e.g. a block of image samples) D1501, a selected list of reference pictures D1511 and a second list of reference pictures D1519, and output a set of motion vectors D1503. The motion prediction unit 1502 is configured to read the set of motion vectors D1503, the selected list of reference pictures D1511 and the second list of reference pictures D1519, and output a block of predicted samples D1505. The first list creation unit 1504 is configured to read reference pictures D1513 from the memory unit 1512 and output a first list of reference pictures D1515. The second list creation unit 1516 is configured to read reference pictures D1517 from the memory unit 1512 and output a second list of reference pictures D1519. The comparator unit 1514 is configured to read both the first list of reference pictures D1515 and the second list of reference pictures D1519, and output a control signal D1521 to control the first switch unit 1506 and the second switch units 1508. The first switch unit 1504 is configured to send the first list of reference pictures D1515 either to the second switch unit 1508 or to the third list creation unit 1510 based on the control signal D1521. The third list creation unit 1510 is configured to create a third list of reference pictures D1523 based on the first list of reference pictures D1509 and temporal level identifier parameter of the reference pictures D1525 stored in the memory unit 1512. The second switch unit 1508 is configured to select either the first list of reference pictures D1507 or the third list of reference pictures D1523 based on the control signal D1521. The writing unit 1518 is configured to read the temporal level of the current picture D1527 and write a corresponding temporal level identifier parameter into a header of the current picture D1529.

FIG. 16 shows a block diagram illustrating an example apparatus for decoding video according to the third exemplary embodiment of the present invention. Similarly, it will be apparent to the person skilled in the art that modifications can be made to the example apparatus shown in FIG. 16 to implement any one of the methods of decoding video disclosed herein (e.g., the method as shown in FIG. 10) or other methods without departing from the scope of the present invention. That is, the apparatus for decoding video according to the present invention is not limited to the components/elements, and the interconnections thereof, as shown in FIG. 16 and can be modified accordingly for various purposes.

The example apparatus for decoding video comprises a motion prediction unit 1600, a first list creation unit 1602, a second list creation unit 1614, a third list creation unit 1608, a first switch unit 1604, a second switch unit 1606, a memory unit 1610, a comparator unit or a determining unit 1612 and a parsing unit 1616.

As shown in FIG. 16, the motion prediction unit 1600 is configured or operable to read a decoded set of motion vectors D1601, a selected list of reference pictures D1609 and a second list of reference pictures D1617, and output a block of predicted samples D1603. The first list creation unit 1602 is configured to read reference pictures D1611 from the memory unit 1610 and output a first list of reference pictures D1613. The second list creation unit 1614 is configured to read reference pictures D1615 from the memory unit 1610 and output a second list of reference pictures D1617. The comparator unit 1612 is configured to read both the first list of reference pictures D1613 and the second list of reference pictures D1617, and output a control signal D1619 to control the first switch unit 1604 and the second switch units 1606. The first switch unit 1604 is configured to send the first list of reference pictures D1613 either to the second switch unit 1606 or to the third list creation unit 1608 based on the control signal D1619. The third list creation unit 1608 is operable to create a third list of reference pictures D1621 based on the first list of reference pictures D1607 and the temporal level identifier parameter of the reference pictures D1623 stored in the memory unit 1610. The second switch unit 1606 is operable to select either the first list of reference pictures D1605 or the third list of reference pictures D1621 based on the control signal D1619. The parsing unit 1616 is operable to parse a header of a coded picture D1625 and output the parsed temporal level identifier parameter D1627 into the memory unit 1610.

FIG. 17 shows a diagram illustrating an example location of the parameter indicating the temporal level of a picture in a header of the picture. In a coded video bitstream, each picture is represented in one or more slice Network Abstraction Layer Unit ("NALU"). As illustrated in FIG. 12, the parameter for indicating/classifying the temporal level of a picture can be located in the NALU header of slice NALU.

FIG. 18A shows a flowchart illustrating a process or method of encoding video using multiple reference pictures according to a fourth exemplary embodiment of the present invention. As shown in FIG. 18A, in step 1800, a parameter representing or indicating a period of a type of a reference picture is written into a header of the picture (coded video bitstream). The period of a type of a picture refers to the period in which that type of picture will reoccur periodically, which can therefore also be referred to as an interval of a type of a picture. For example, the parameter value may be "4", which indicates that that particular type of pictures (e.g., primary pictures) occurs periodically every 4 frames in output order. Next, in step 1802, a first list of reference pictures sorted based on the temporal distance to a current picture is created. In step 1804, a second list of reference pictures sorted also based on the temporal distance to the current picture is created. In step 1806, a comparison is performed to judge or determine whether the first list matches (e.g., is identical to) the second list.

If the first list matches the second list, in step 1808, a third list of reference pictures sorted at least based on the period of the type of the reference pictures. Sorting/ordering the third list of reference pictures at least based on the period of the type of reference pictures can be similarly performed as described hereinbefore with reference to FIGS. 13 and 14, but with the parameter for indicating the temporal level of the reference pictures substituted with the parameter for indicating a period or interval of a type of picture. Next, a motion estimation process is performed for a current picture (e.g., a block of image samples) using at least the third list of reference pictures in step 1810 and a motion prediction process is performed for the current picture using at least the third list of reference pictures in step 1812. For example, the motion estimation process and/or the motion prediction process may be performed for the current picture using only the third list, using the second and third lists, or using the first and third lists.

In an embodiment of the present invention, the third list is created by reordering the reference pictures from either the first list or the second list using at least a period of a type of the reference pictures for sorting reference pictures. In such an embodiment, the third list of reference pictures effectively represents a modified version of either the first list or the second list of reference pictures.

If the first list does not match the second list in step 1806, a motion estimation process is performed for the current picture using the first and the second lists of reference pictures in step 1814 and a motion prediction process is performed for the current picture using the first and second lists of reference pictures in step 1816.

In an embodiment, the logic at step 1806 may be switched. In particular, if the first list matches the second list, a motion estimation process is performed for the current picture using the first and second lists of reference pictures in step 1814 and a motion prediction process is performed for the current picture using the first and second lists of reference pictures in step 1816. On the other hand, if the first list does not match the second list in step 1806, a third list of reference pictures (e.g., corresponding to the first list of reference pictures described in the second exemplary embodiment) sorted by at least the period of the type of the reference pictures is created in step 1808. Next, a motion estimation process is performed for the current picture using at least the third list of reference pictures in step 1810 and a motion prediction process is performed for the current picture using at least the third list of reference pictures in step 1812. For example, the motion estimation process and/or the motion prediction process may be performed using the second and third lists of reference pictures, or using the first and third lists of reference pictures.

Yet another embodiment is shown in FIG. 18B. In particular, steps 1806, 1814 and 1816 as shown in FIG. 18A are omitted. Accordingly, after step 1804, a third list of reference pictures (e.g., corresponding to the first list of reference pictures described in the second exemplary embodiment) sorted by at least the period of the type of the reference pictures is created in step 1858. Next, a motion estimation process is performed for the current picture (e.g., blocks of image samples) using at least the third list of reference pictures in step 1860 and a motion prediction process is performed for the current picture using at least the third list of reference pictures in step 1862. For example, the motion estimation process may be performed using only the third list, using the second and third lists, or using the first and third lists.

FIG. 19A shows a flowchart illustrating a process or method for decoding video using multiple reference pictures according to the fourth embodiment of the present invention. As shown in FIG. 19A, in step 1900, a parameter indicating a period of a type of pictures (e.g. primary pictures) is parsed from a header of the picture (coded video bitstream). Next, in step 1902, a first list of reference pictures sorted based on the temporal distance to a current picture is created. In step 1904, a second list of reference pictures sorted also based on the temporal distance to the current picture is created. In step 1906, a comparison is performed to judge or determine whether the first list matches the second list.

If the first list matches the second list, in step 1908, a third list of reference pictures sorted at least based on a period of the type of reference pictures. Sorting/ordering the third list of reference pictures at least based on a period of the type of reference pictures can be similarly performed as described hereinbefore with reference to FIGS. 13 and 14, but with the parameter for indicating the temporal level of the reference pictures substituted with the parameter for indicating a period of a type of picture. Next, a motion prediction process is performed for the current picture using at least the third list of reference pictures in step 1910. For example, the motion prediction process may be performed using only the third list, using the second and third lists, or using the first and third lists.

If the first list does not match the second list in step 1906, a motion prediction process is performed for the current picture using the first and second lists of reference pictures in module 1912.

In an embodiment, the logic at step 1906 may be switched. In particular, if the first list matches the second list, a motion prediction process is performed for the current picture using the first and second lists of reference pictures in step 1912. On the other hand, if the first list does not match the second list in step 1206, a third list of reference pictures (e.g., corresponding to the first list of reference pictures described in the second exemplary embodiment) sorted based on at least the period of a type of the reference pictures is created in step 1908. Next, a motion prediction process is performed for the current picture using at least the third list of reference pictures in step 1910. Similarly, the motion prediction process may be performed using only the third list, using the second and third lists, or using the first and third lists.

Yet another embodiment is shown in FIG. 19B. In particular, steps 1906 and 1912 as shown in FIG. 19A are omitted. Accordingly, after step 1904, a third list of reference pictures (e.g., corresponding to the first list of reference pictures described in the second exemplary embodiment) sorted by at least the period of the type of the reference pictures is created in step 1958. Next, a motion prediction process is performed for the current picture (e.g., blocks of image samples) using at least the third list of reference pictures in step 1960. For example, the motion prediction process may be performed using only the third list, using the second and third lists, or using the first and third lists.

FIG. 20 shows a flowchart illustrating another embodiment of the present invention for sorting the third list of reference pictures at least based on a period of the type of reference pictures. In step 2000, a first group of reference pictures is selected comprising one or more key reference pictures having picture numbers equal to integer multiples of a period of a type of pictures (e.g., a period of the primary pictures). For example, if the period is 4, the first group of pictures include one or more reference pictures having picture numbers equal to 0, 4, 8, 12, 16 and so on. The term picture number refers to the output order of coded pictures. Next, in step 2002, a second group of reference pictures comprising reference pictures that are not included in the first group of reference pictures. Then, in step 2004, the first group of reference pictures is positioned/sorted at the top of the third list whereby the reference pictures within the third list are sorted according to temporal distance to the current picture. Next, in step 2006, the second group of reference pictures is positioned/sorted after/below the first group of reference pictures in the third list whereby the reference pictures within the third list are sorted according to temporal distance to the current picture. For example, the reference pictures within the first group and/or the second group are sorted in the order of increasing temporal distance to the current picture.

FIG. 21 shows a block diagram illustrating an example apparatus for encoding video according to the fourth exemplary embodiment of the present invention. It will be apparent to the person skilled in the art that modifications can be made to the example apparatus shown in FIG. 21 to implement any one of the methods of encoding video disclosed herein or other methods without departing from the scope of the present invention. That is, the apparatus for encoding video according to the present invention is not limited to the components/elements, and the interconnections thereof, as shown in FIG. 21 and can be modified accordingly for various purposes.

The exemplary apparatus for encoding video comprises a motion estimation unit 2100, a motion prediction unit 2102, a first list creation unit 2104, a second list creation unit 2116, a third list creation unit 2110, a first switch unit 2106, a second switch unit 2108, a memory unit 2112, a comparator unit 2114 and a writing unit 2118.

As shown FIG. 21, the motion estimation unit 2100 is configure to read a block of image samples D2101, a selected list of reference pictures D2111 and a second list of reference pictures D2119, and output a set of motion vectors D2103. The motion prediction unit 2102 is configured to read the set of motion vectors D2103, the selected list of reference pictures D2111 and the second list of reference pictures D2119, and output a block of predicted samples D2105. The first list creation unit 2104 is configured to read reference pictures D2113 from the memory unit 2112 and output a first list of reference pictures D2115. The second list creation unit 2116 is configured to read reference pictures D2117 from the memory unit 2112 and output a second list of reference pictures D2119. The comparator unit 2114 is configured to read both the first list of reference pictures D2115 and the second list of reference pictures D2119, and output a control signal D2121 to control the first switch unit 2106 and the second switch units 2108. The first switch unit 2104 is configured to send the first list of reference pictures D2115 either to the second switch unit 2108 or to the third list creation unit 2110 based on the control signal D2121. The third list creation unit 2110 is configured to create a third list of reference pictures D2123 based on the first list of reference pictures D2109 and a period of the type of reference pictures D2125 stored in the memory unit 2112. The second switch unit 2108 is configured to select either the first list of reference pictures D2107 or the third list of reference pictures D2123 based on the control signal D2121. The writing unit 2118 is configured to read the period of the type of reference pictures D2125 and write a corresponding parameter representing the period into a header of a coded picture D2127.

FIG. 22 shows a block diagram illustrating an example apparatus for decoding video according to the fourth exemplary embodiment of the present invention. Similarly, it will be apparent to the person skilled in the art that modifications can be made to the example apparatus shown in FIG. 22 to implement any one of the methods of decoding video disclosed herein or other methods without departing from the scope of the present invention. That is, the apparatus for decoding video according to the present invention is not limited to the components/elements, and the interconnections thereof, as shown in FIG. 22 and can be modified accordingly for various purposes The exemplary apparatus for encoding video comprises a motion prediction unit 2200, a first list creation unit 2202, a second list creation unit 2214, a third list creation unit 2208, a first switch unit 2204, a second switch unit 2206, a memory unit 2210, a comparator unit or a determining unit 2212 and a parsing unit 2216.

As shown in the FIG. 22, the motion prediction unit 2200 is configured to read a decoded set of motion vectors D2201, a selected list of reference pictures D2209 and a second list of reference pictures D2217, and output a block of predicted samples D2203. The first list creation unit 2202 is configured to read reference pictures D2211 from the memory unit 2210 and output a first list of reference pictures D2213. The second list creation unit 2214 is configured to read reference pictures D2215 from the memory unit 2210 and output a second list of reference pictures D2217. The comparator unit 2212 is configured to read both the first list of reference pictures D2213 and the second list of reference pictures D2217 and output a control signal D2219 to control the first switch unit 2204 and the second switch units 2206. The first switch unit 2204 is configured to send the first list of reference pictures D2213 either to the second switch unit 2206 or to the third list creation unit 2208 based on the control signal D2219. The third list creation unit 2208 is configured to create a third list of reference pictures D2221 based on the first list of reference pictures D2207 and a parsed period of primary pictures D2225. The second switch unit 2206 is configured to select either the first list of reference pictures D2205 or the third list of reference pictures D2221 based on the control signal D2219. The parsing unit 2216 is configured to parse a header of a coded picture D2223 and output the parsed period of primary pictures D2225.

FIG. 23 shows a diagram illustrating example locations of the parameter representing/indicating the period of the type of reference pictures in a header of the picture (coded video bitstream) in the case where the type of reference pictures is primary reference pictures. The period of primary pictures is used for indicating the periodic occurrence of primary (key) pictures which are typically coded with higher quality as compared to other non-primary pictures. According to embodiments of the present invention, FIG. 23(a) shows an example location of the parameter in a sequence header of a compressed video bitstream, FIG. 23(b) shows an example location of the parameter in a picture header of a compressed video bitstream. FIG. 23(c) shows an example location of said parameter in a slice header of a compressed video bitstream, FIG. 23(d) shows that the parameter can also be derived from a predefined look-up table based on a profile parameter, a level parameter, or both the profile and level parameters located in a sequence header of a compressed video bitstream.

FIG. 24A shows a flowchart illustrating a process or method of encoding video according to a fifth embodiment of the present invention. As shown in FIG. 24A, in step 2400, a flag (e.g., a reordering technique selection flag) is first written or embedded into a header of a current picture. For example, the flag is used to indicate or signal one of the two or more different techniques used for the ordering the reference pictures in a reference picture list.

In step 2402, a first list of reference pictures sorted based on the temporal distance to a current picture is created. Next in step 2404, a second list of reference pictures sorted based on the temporal distance to the current picture is created. And in step 2406, a comparison is performed to determine or judge if the first list matches (e.g., identical to) the second list.

If the first list matches the second list, a comparison is performed to determine if the value of the flag has or is of a predefined value. If the flag is of a predefined value, a third list of reference pictures (e.g., corresponding to the first list of reference pictures described in the second exemplary embodiment), which is sorted based on the temporal level of the reference pictures, is created in step 2414. If the flag is not of a predefined value, a third list of reference pictures, which is sorted by prediction dependency of the reference pictures, is created in step 2420. The prediction dependency of the reference pictures refers to the dependency in inter-picture motion compensated prediction among the reference frames. Next, a motion estimation process is performed for a current picture (e.g., a block of image samples) using at least the third list of reference pictures in step 2416 and a motion prediction process is performed for the block of image samples using at least the third list of reference pictures in step 2418. For example, the motion estimation process and/or the motion prediction process may be performed using the only the third list, using the second and third lists, or using the first and third lists.

If the first list does not match the second list in step 2406, a motion estimation process is performed for a current picture using the first and second lists of reference frames in step 2408 and a motion prediction process is performed for the current picture using the first and second lists of reference frames in step 2410.

In an embodiment, the logic at step 2406 may be switched. In particular, if the first list matches the second list a motion estimation process is performed for a current picture using the first and second lists of reference frames in step 2408 and a motion prediction process is performed for the current picture using the first and second lists of reference frames in step 2410. On the other hand, if the first list does not match the second list in step 2406, a comparison is performed to determine or judge if the value of the flag has or is of a predefined value. If the flag is of a predefined value, a third list of reference pictures (e.g., corresponding to the first list of reference pictures described in the first exemplary embodiment), which is sorted based on the temporal level of the reference pictures, is created in step 2414. If the flag is not of a predefined value, a third list of reference pictures, which is sorted by prediction dependency of the reference pictures, is created in step 2420. The prediction dependency of the reference pictures refers to the dependency in inter-picture motion compensated prediction among the reference frames. Next, a motion estimation process is performed for a current picture (e.g., a block of image samples) using at least the third list of reference pictures in step 2416 and a motion prediction process is performed for the block of image samples using at least the third list of reference pictures in step 1318. For example, the motion estimation process and/or the motion prediction process may be performed using only the third list, using the second and third lists, or using the first and third lists.

Yet another embodiment is shown in FIG. 24B. In particular, steps 2406, 2408 and 2410 shown in FIG. 24A are omitted. Accordingly, after step 2404, a comparison is performed to determine or judge if the value of the flag has or is of a predefined value in step 2462. If the flag is of a predefined value, a third list of reference pictures (e.g., corresponding to the first list of reference pictures described in the second exemplary embodiment), which is sorted based on the temporal level of the reference pictures, is created in step 2464. If the flag is not of a predefined value, a third list of reference pictures, which is sorted by prediction dependency of the reference pictures, is created in step 2470. The prediction dependency of the reference pictures refers to the dependency in inter-picture motion compensated prediction among the reference frames. Next, a motion estimation process is performed for a current picture (e.g. a block of image samples) using at least the third list of reference pictures in step 2466 and a motion prediction process is performed for the block of image samples using at least the first list of reference pictures in step 2468.

FIG. 25A shows a flowchart illustrating a process or method of decoding video according to the fifth exemplary embodiment of the present invention. As shown in FIG. 25A, in step 2500, a flag (e.g., a reordering technique selection flag) is first parsed or retrieved from a header of a current picture. For example, the flag indicates the selected technique for the reordering of the reference pictures.

In step 2502, a first list of reference pictures sorted by a first scheme that uses temporal distance to a current picture is created. Next in step 2504, a second list of reference pictures sorted by a second scheme that also uses temporal distance to a current picture is created. And in step 2506, a comparison is performed to determine or judge if the first list matches (e.g., identical to) the second list.

If the first list matches the second list, a comparison is performed to determine or judge if the value of the flag has or is of a predefined value in step 2508. If the flag is of a predefined value, a third list of reference pictures (e.g., corresponding to the first list of reference pictures described in the second exemplary embodiment), which is sorted based on the temporal level of the reference pictures, is created in step 2512. If the flag is not of a predefined value, a third list of reference pictures, which is sorted by prediction dependency of the reference pictures, is created in step 2516. The prediction dependency of the reference pictures refers to the dependency in inter-picture motion compensated prediction among the reference pictures/frames. Next, a motion prediction process is performed for a current picture (e.g., a block of image samples) using at least the third list of reference pictures in step 2514. For example, the motion prediction process may be performed using only the third list, using only the second and third lists, or using the first and third lists.

If the first list does not match the second list in step 2506, a motion prediction process is performed for the current picture using the first and second lists of reference frames in step 2510.

In an embodiment, the logic at step 2506 may also be switched. In particular, if the first list matches the second list, a motion prediction process is performed for the current picture using the first and second lists of reference frames in step 2510. On the other hand, if the first list does not match the second list in step 2506, a comparison is performed to determine or judge if the value of the flag has or is of a predefined value. If the flag is of a predefined value, a third list of reference pictures (e.g., corresponding to the first list of reference pictures described in the second exemplary embodiment), which is sorted based on the temporal level of the reference pictures, is created in step 2512. If the flag is not of a predefined value, a third list of reference pictures, which is sorted by prediction dependency of the reference pictures, is created in step 2516. The prediction dependency of the reference pictures refers to the dependency in inter-picture motion compensated prediction among the reference frames. Next, a motion prediction process is performed for a current picture (e.g. a block of image samples) using at least the third list of reference pictures in step 2514. For example, the motion prediction process may be performed using only the third list, the second and third lists, or using the first and third lists.

Yet another embodiment is shown in FIG. 25B. In particular, steps 2506 and 2510 shown in FIG. 25A are omitted. Accordingly, after step 2504, a comparison is performed to determine or judge if the value of the flag has or is of a predefined value in step 2558. If the flag is of a predefined value, a third list of reference pictures (e.g., corresponding to the first list of reference pictures described in the second exemplary embodiment), which is sorted based on the temporal level of the reference pictures, is created in step 2562. If the flag is not of a predefined value, a first list of reference pictures, which is sorted by prediction dependency of the reference pictures, is created in step 2566. The prediction dependency of the reference pictures refers to the dependency in inter-picture motion compensated prediction among the reference frames. Next, a motion prediction process is performed for a current picture (e.g. a block of image samples) using at least the third list of reference pictures in step 2564.

Embodiment 6

The processing described in each of Embodiments can be simply implemented in an independent computer system, by recording, in a recording medium, a program for implementing the configurations of the video coding method and the video decoding method described in each of Embodiments. The recording media may be any recording media as long as the program can be recorded, such as a magnetic disk, an optical disk, a magnetic optical disk, an IC card, and a semiconductor memory.

Hereinafter, the applications to the video coding method and the video decoding method described in each of Embodiments and systems using thereof will be described.

FIG. 26 illustrates an overall configuration of a content providing system ex100 for implementing content distribution services. The area for providing communication services is divided into cells of desired size, and base stations ex106, ex107, ex108, ex109, and ex110 which are fixed wireless stations are placed in each of the cells.

The content providing system ex100 is connected to devices, such as a computer ex111, a personal digital assistant (PDA) ex112, a camera ex113, a cellular phone ex114 and a game machine ex115, via the Internet ex101, an Internet service provider ex102, a telephone network ex104, as well as the base stations ex106 to ex110, respectively.

However, the configuration of the content providing system ex100 is not limited to the configuration shown in FIG. 26, and a combination in which any of the elements are connected is acceptable. In addition, each device may be directly connected to the telephone network ex104, rather than via the base stations ex106 to ex110 which are the fixed wireless stations. Furthermore, the devices may be interconnected to each other via a short distance wireless communication and others.

The camera ex113, such as a digital video camera, is capable of capturing video. A camera ex116, such as a digital video camera, is capable of capturing both still images and video. Furthermore, the cellular phone ex114 may be the one that meets any of the standards such as Global System for Mobile Communications (GSM), Code Division Multiple Access (CDMA). Wideband-Code Division Multiple Access (W-CDMA), Long Term Evolution (LTE), and High Speed Packet Access (HSPA). Alternatively, the cellular phone ex114 may be a Personal Handyphone System (PHS).

In the content providing system ex100, a streaming server ex103 is connected to the camera ex113 and others via the telephone network ex104 and the base station ex109, which enables distribution of images of a live show and others. In such a distribution, a content (for example, video of a music live show) captured by the user using the camera ex113 is coded as described above in each of Embodiments, and the coded content is transmitted to the streaming server ex103. On the other hand, the streaming server ex103 carries out stream distribution of the transmitted content data to the clients upon their requests. The clients include the computer ex111, the PDA ex112, the camera ex113, the cellular phone ex114, and the game machine ex115 that are capable of decoding the above-mentioned coded data. Each of the devices that have received the distributed data decodes and reproduces the coded data.

The captured data may be coded by the camera ex113 or the streaming server ex103 that transmits the data, or the coding processes may be shared between the camera ex113 and the streaming server ex103. Similarly, the distributed data may be decoded by the clients or the streaming server ex103, or the decoding processes may be shared between the clients and the streaming server ex103. Furthermore, the data of the still images and video captured by not only the camera ex113 but also the camera ex116 may be transmitted to the streaming server ex103 through the computer ex111. The coding processes may be performed by the camera ex116, the computer ex111, or the streaming server ex103, or shared among them.

Furthermore, the coding and decoding processes may be performed by an LSI ex500 generally included in each of the computer ex111 and the devices. The LSI ex500 may be configured of a single chip or a plurality of chips. Software for coding and decoding video may be integrated into some type of a recording medium (such as a CD-ROM, a flexible disk, and a hard disk) that is readable by the computer ex111 and others, and the coding and decoding processes may be performed using the software. Furthermore, when the cellular phone ex114 is equipped with a camera, the image data obtained by the camera may be transmitted. The video data is data coded by the LSI ex500 included in the cellular phone ex114.

Furthermore, the streaming server ex103 may be composed of servers and computers, and may decentralize data and process the decentralized data, record, or distribute data.

As described above, the clients may receive and reproduce the coded data in the content providing system ex100. In other words, the clients can receive and decode information transmitted by the user, and reproduce the decoded data in real time in the content providing system ex100, so that the user who does not have any particular right and equipment can implement personal broadcasting.

Aside from the example of the content providing system ex100, at least one of the video coding apparatus and the video decoding apparatus described in each of Embodiments may be implemented in a digital broadcasting system ex200 illustrated in FIG. 27. More specifically, a broadcast station ex201 communicates or transmits, via radio waves to a broadcast satellite ex202, multiplexed data obtained by multiplexing audio data and others onto video data. The video data is data coded by the video coding method described in each of Embodiments. Upon receipt of the multiplexed data, the broadcast satellite ex202 transmits radio waves for broadcasting. Then, a home-use antenna ex204 with a satellite broadcast reception function receives the radio waves.

Next, a device such as a television (receiver) ex300 and a set top box (STB) ex217 decodes the received multiplexed data, and reproduces the decoded data.

Furthermore, a reader/recorder ex218 (i) reads and decodes the multiplexed data recorded on a recording media ex215, such as a DVD and a BD, or (i) codes video signals in the recording medium ex215, and in some cases, writes data obtained by multiplexing an audio signal on the coded data. The reader/recorder ex218 can include the video decoding apparatus or the video coding apparatus as shown in each of Embodiments. In this case, the reproduced video signals are displayed on the monitor ex219, and can be reproduced by another device or system using the recording medium ex215 on which the multiplexed data is recorded. It is also possible to implement the video decoding apparatus in the set top box ex217 connected to the cable ex203 for a cable television or to the antenna ex204 for satellite and/or terrestrial broadcasting, so as to display the video signals on the monitor ex219 of the television ex300. The video decoding apparatus may be implemented not in the set top box but in the television ex300.

FIG. 28 illustrates the television (receiver) ex300 that uses the video coding method and the video decoding method described in each of Embodiments. The television ex300 includes: a tuner ex301 that obtains or provides multiplexed data obtained by multiplexing audio data onto video data, through the antenna ex204 or the cable ex203, etc. that receives a broadcast; a modulation/demodulation unit ex302 that demodulates the received multiplexed data or modulates data into multiplexed data to be supplied outside; and a multiplexing/demultiplexing unit ex303 that demultiplexes the modulated multiplexed data into video data and audio data, or multiplexes video data and audio data coded by a signal processing unit ex306 into data.

The television ex300 further includes: a signal processing unit ex306 including an audio signal processing unit ex304 and a video signal processing unit ex305 that decode audio data and video data and code audio data and video data, respectively; and an output unit ex309 including a speaker ex307 that provides the decoded audio signal, and a display unit ex308 that displays the decoded video signal, such as a display. Furthermore, the television ex300 includes an interface unit ex317 including an operation input unit ex312 that receives an input of a user operation. Furthermore, the television ex300 includes a control unit ex310 that controls overall each constituent element of the television ex300, and a power supply circuit unit ex311 that supplies power to each of the elements. Other than the operation input unit ex312, the interface unit ex317 may include: a bridge ex313 that is connected to an external device, such as the reader/recorder ex218; a slot unit ex314 for enabling attachment of the recording medium ex216, such as an SD card; a driver ex315 to be connected to an external recording medium, such as a hard disk; and a modem ex316 to be connected to a telephone network. Here, the recording medium ex216 can electrically record information using a non-volatile/volatile semiconductor memory element for storage. The constituent elements of the television ex300 are connected to each other through a synchronous bus.

First, the configuration in which the television ex300 decodes multiplexed data obtained from outside through the antenna ex204 and others and reproduces the decoded data will be described. In the television ex300, upon a user operation through a remote controller ex220 and others, the multiplexing/demultiplexing unit ex303 demultiplexes the multiplexed data demodulated by the modulation/demodulation unit ex302, under control of the control unit ex310 including a CPU. Furthermore, the audio signal processing unit ex304 decodes the demultiplexed audio data, and the video signal processing unit ex305 decodes the demultiplexed video data, using the decoding method described in each of Embodiments, in the television ex300. The output unit ex309 provides the decoded video signal and audio signal outside, respectively. When the output unit ex309 provides the video signal and the audio signal, the signals may be temporarily stored in buffers ex318 and ex319, and others so that the signals are reproduced in synchronization with each other. Furthermore, the television ex300 may read multiplexed data not through a broadcast and others but from the recording media ex215 and ex216, such as a magnetic disk, an optical disk, and a SD card. Next, a configuration in which the television ex300 codes an audio signal and a video signal, and transmits the data outside or writes the data on a recording medium will be described. In the television ex300, upon a user operation through the remote controller ex220 and others, the audio signal processing unit ex304 codes an audio signal, and the video signal processing unit ex305 codes a video signal, under control of the control unit ex310 using the coding method described in each of Embodiments. The multiplexing/demultiplexing unit ex303 multiplexes the coded video signal and audio signal, and provides the resulting signal outside. When the multiplexing/demultiplexing unit ex303 multiplexes the video signal and the audio signal, the signals may be temporarily stored in the buffers ex320 and ex321, and others so that the signals are reproduced in synchronization with each other. Here, the buffers ex318, ex319, ex320, and ex321 may be plural as illustrated, or at least one buffer may be shared in the television ex300. Furthermore, data may be stored in a buffer so that the system overflow and underflow may be avoided between the modulation/demodulation unit ex302 and the multiplexing/demultiplexing unit ex303, for example.

Furthermore, the television ex300 may include a configuration for receiving an AV input from a microphone or a camera other than the configuration for obtaining audio and video data from a broadcast or a recording medium, and may code the obtained data. Although the television ex300 can code, multiplex, and provide outside data in the description, it may be capable of only receiving, decoding, and providing outside data but not the coding, multiplexing, and providing outside data.

Furthermore, when the reader/recorder ex218 reads or writes multiplexed data from or on a recording medium, one of the television ex300 and the reader/recorder ex218 may decode or code the multiplexed data, and the television ex300 and the reader/recorder ex218 may share the decoding or coding.

As an example, FIG. 29 illustrates a configuration of an information reproducing/recording unit ex400 when data is read or written from or on an optical disk. The information reproducing/recording unit ex400 includes constituent elements ex401, ex402, ex403, ex404, ex405, ex406, and ex407 to be described hereinafter. The optical head ex401 irradiates a laser spot in a recording surface of the recording medium ex215 that is an optical disk to write information, and detects reflected light from the recording surface of the recording medium ex215 to read the information. The modulation recording unit ex402 electrically drives a semiconductor laser included in the optical head ex401, and modulates the laser light according to recorded data. The reproduction demodulating unit ex403 amplifies a reproduction signal obtained by electrically detecting the reflected light from the recording surface using a photo detector included in the optical head ex401, and demodulates the reproduction signal by separating a signal component recorded on the recording medium ex215 to reproduce the necessary information. The buffer ex404 temporarily holds the information to be recorded on the recording medium ex215 and the information reproduced from the recording medium ex215. The disk motor ex405 rotates the recording medium ex215. The servo control unit ex406 moves the optical head ex401 to a predetermined information track while controlling the rotation drive of the disk motor ex405 so as to follow the laser spot. The system control unit ex407 controls overall the information reproducing/recording unit ex400. The reading and writing processes can be implemented by the system control unit ex407 using various information stored in the buffer ex404 and generating and adding new information as necessary, and by the modulation recording unit ex402, the reproduction demodulating unit ex403, and the servo control unit ex406 that record and reproduce information through the optical head ex401 while being operated in a coordinated manner. The system control unit ex407 includes, for example, a microprocessor, and executes processing by causing a computer to execute a program for read and write.

Although the optical head ex401 irradiates a laser spot in the description, it may perform high-density recording using near field light.

FIG. 30 illustrates the recording medium ex215 that is the optical disk. On the recording surface of the recording medium ex215, guide grooves are spirally formed, and an information track ex230 records, in advance, address information indicating an absolute position on the disk according to change in a shape of the guide grooves. The address information includes information for determining positions of recording blocks ex231 that are a unit for recording data. Reproducing the information track ex230 and reading the address information in an apparatus that records and reproduces data can lead to determination of the positions of the recording blocks. Furthermore, the recording medium ex215 includes a data recording area ex233, an inner circumference area ex232, and an outer circumference area ex234. The data recording area ex233 is an area for use in recording the user data. The inner circumference area ex232 and the outer circumference area ex234 that are inside and outside of the data recording area ex233, respectively are for specific use except for recording the user data. The information reproducing/recording unit 400 reads and writes coded audio, coded video data, or multiplexed data obtained by multiplexing the coded audio and video data, from and on the data recording area ex233 of the recording medium ex215.

Although an optical disk having a layer, such as a DVD and a BD is described as an example in the description, the optical disk is not limited to such, and may be an optical disk having a multilayer structure and capable of being recorded on a part other than the surface. Furthermore, the optical disk may have a structure for multidi-mensional recording/reproduction, such as recording of information using light of colors with different wavelengths in the same portion of the optical disk and for recording information having different layers from various angles.

Furthermore, a car ex210 having an antenna ex205 can receive data from the satellite ex202 and others, and reproduce video on a display device such as a car navigation system ex211 set in the car ex210, in the digital broadcasting system ex200. Here, a configuration of the car navigation system ex211 will be a configuration, for example, including a GPS receiving unit from the configuration illustrated in FIG. 28. The same will be true for the configuration of the computer ex111, the cellular phone ex114, and others.

FIG. 31A illustrates the cellular phone ex114 that uses the video coding method and the video decoding method described in Embodiments. The cellular phone ex114 includes: an antenna ex350 for transmitting and receiving radio waves through the base station ex110; a camera unit ex365 capable of capturing moving and still images; and a display unit ex358 such as a liquid crystal display for displaying the data such as decoded video captured by the camera unit ex365 or received by the antenna ex350. The cellular phone ex114 further includes: a main body unit including an operation key unit ex366; an audio output unit ex357 such as a speaker for output of audio; an audio input unit ex356 such as a microphone for input of audio; a memory unit ex367 for storing captured video or still pictures, recorded audio, coded or decoded data of the received video, the still pictures, e-mails, or others; and a slot unit ex364 that is an interface unit for a recording medium that stores data in the same manner as the memory unit ex367.

Next, an example of a configuration of the cellular phone ex114 will be described with reference to FIG. 31B. In the cellular phone ex114, a main control unit ex360 designed to control overall each unit of the main body including the display unit ex358 as well as the operation key unit ex366 is connected mutually, via a synchronous bus ex370, to a power supply circuit unit ex361, an operation input control unit ex362, a video signal processing unit ex355, a camera interface unit ex363, a liquid crystal display (LCD) control unit ex359, a modulation/demodulation unit ex352, a multiplexing/demultiplexing unit ex353, an audio signal processing unit ex354, the slot unit ex364, and the memory unit ex367.

When a call-end key or a power key is turned ON by a user's operation, the power supply circuit unit ex361 supplies the respective units with power from a battery pack so as to activate the cell phone ex114.

In the cellular phone ex114, the audio signal processing unit ex354 converts the audio signals collected by the audio input unit ex356 in voice conversation mode into digital audio signals under the control of the main control unit ex360 including a CPU, ROM, and RAM. Then, the modulation/demodulation unit ex352 performs spread spectrum processing on the digital audio signals, and the transmitting and receiving unit ex351 performs digital-to-analog conversion and frequency conversion on the data, so as to transmit the resulting data via the antenna ex350.

Also, in the cellular phone ex114, the transmitting and receiving unit ex351 amplifies the data received by the antenna ex350 in voice conversation mode and performs frequency conversion and the analog-to-digital conversion on the data. Then, the modulation/demodulation unit ex352 performs inverse spread spectrum processing on the data, and the audio signal processing unit ex354 converts it into analog audio signals, so as to output them via the audio output unit ex356.

Furthermore, when an e-mail in data communication mode is transmitted, text data of the e-mail inputted by operating the operation key unit ex366 and others of the main body is sent out to the main control unit ex360 via the operation input control unit ex362. The main control unit ex360 causes the modulation/demodulation unit ex352 to perform spread spectrum processing on the text data, and the transmitting and receiving unit ex351 performs the digital-to-analog conversion and the frequency conversion on the resulting data to transmit the data to the base station ex110 via the antenna ex350. When an e-mail is received, processing that is approximately inverse to the processing for transmitting an e-mail is performed on the received data, and the resulting data is provided to the display unit ex358.

When video, still images, or video and audio in data communication mode is or are transmitted, the video signal processing unit ex355 compresses and codes video signals supplied from the camera unit ex365 using the video coding method shown in each of Embodiments, and transmits the coded video data to the multiplexing/demultiplexing unit ex353. In contrast, during when the camera unit ex365 captures video, still images, and others, the audio signal processing unit ex354 codes audio signals collected by the audio input unit ex356, and transmits the coded audio data to the mul-tiplexing/demultiplexing unit ex353.

The multiplexing/demultiplexing unit ex353 multiplexes the coded video data supplied from the video signal processing unit ex355 and the coded audio data supplied from the audio signal processing unit ex354, using a predetermined method.

Then, the modulation/demodulation unit ex352 performs spread spectrum processing on the multiplexed data, and the transmitting and receiving unit ex351 performs digital-toanalog conversion and frequency conversion on the data so as to transmit the resulting data via the antenna ex350.

When receiving data of a video file which is linked to a Web page and others in data communication mode or when receiving an e-mail with video and/or audio attached, in order to decode the multiplexed data received via the antenna ex350, the multiplexing/demultiplexing unit ex353 demultiplexes the multiplexed data into a video data bit stream and an audio data bit stream, and supplies the video signal processing unit ex355 with the coded video data and the audio signal processing unit ex354 with the coded audio data, through the synchronous bus ex370. The video signal processing unit ex355 decodes the video signal using a video decoding method corresponding to the coding method shown in each of Embodiments, and then the display unit ex358 displays, for instance, the video and still images included in the video file linked to the Web page via the LCD control unit ex359. Furthermore, the audio signal processing unit ex354 decodes the audio signal, and the audio output unit ex357 provides the audio.

Furthermore, similarly to the television ex300, a terminal such as the cellular phone ex114 probably have 3 types of implementation configurations including not only (i) a transmitting and receiving terminal including both a coding apparatus and a decoding apparatus, but also (ii) a transmitting terminal including only a coding apparatus and (iii) a receiving terminal including only a decoding apparatus. Although the digital broadcasting system ex200 receives and transmits the multiplexed data obtained by multiplexing audio data onto video data in the description, the multiplexed data may be data obtained by multiplexing not audio data but character data related to video onto video data, and may be not multiplexed data but video data itself.

As such, the video coding method and the video decoding method in each of Embodiments can be used in any of the devices and systems described. Thus, the ad-vantages described in each of Embodiments can be obtained.

Furthermore, the present invention is not limited to Embodiments, and various modifications and revisions are possible without departing from the scope of the present invention.

Embodiment 7

Video data can be generated by switching, as necessary, between (i) the video coding method or the video coding apparatus shown in each of Embodiments and (ii) a video coding method or a video coding apparatus in conformity with a different standard, such as MPEG-2, MPEG4-AVC, and VC-1.

Here, when a plurality of video data that conforms to the different standards is generated and is then decoded, the decoding methods need to be selected to conform to the different standards. However, since to which standard each of the plurality of the video data to be decoded conform cannot be detected, there is a problem that an appropriate decoding method cannot be selected.

In order to solve the problem, multiplexed data obtained by multiplexing audio data and others onto video data has a structure including identification information indicating to which standard the video data conforms. The specific structure of the multiplexed data including the video data generated in the video coding method and by the video coding apparatus shown in each of Embodiments will be hereinafter described. The multiplexed data is a digital stream in the MPEG2-Transport Stream format.

FIG. 32 illustrates a structure of the multiplexed data. As illustrated in FIG. 32, the multiplexed data can be obtained by multiplexing at least one of a video stream, an audio stream, a presentation graphics stream (PG), and an interactive graphics stream. The video stream represents primary video and secondary video of a movie, the audio stream (IG) represents a primary audio part and a secondary audio part to be mixed with the primary audio part, and the presentation graphics stream represents subtitles of the movie. Here, the primary video is normal video to be displayed on a screen, and the secondary video is video to be displayed on a smaller window in the primary video. Furthermore, the interactive graphics stream represents an interactive screen to be generated by arranging the GUI components on a screen. The video stream is coded in the video coding method or by the video coding apparatus shown in each of Embodiments, or in a video coding method or by a video coding apparatus in conformity with a conventional standard, such as MPEG-2, MPEG4-AVC, and VC-1. The audio stream is coded in accordance with a standard, such as Dolby-AC-3, Dolby Digital Plus, MLP, DTS, DTS-HD, and linear PCM.

Each stream included in the multiplexed data is identified by PID. For example, 0x1011 is allocated to the video stream to be used for video of a movie, 0x1100 to 0x111F are allocated to the audio streams, 0x1200 to 0x121F are allocated to the presentation graphics streams, 0x1400 to 0x141F are allocated to the interactive graphics streams, 0x1B00 to 0x1B1F are allocated to the video streams to be used for secondary video of the movie, and 0x1A00 to 0x1A1F are allocated to the audio streams to be used for the secondary video to be mixed with the primary audio.

FIG. 33 schematically illustrates how data is multiplexed. First, a video stream ex235 composed of video frames and an audio stream ex238 composed of audio frames are transformed into a stream of PES packets ex236 and a stream of PES packets ex239, and further into TS packets ex237 and TS packets ex240, respectively. Similarly, data of a presentation graphics stream ex241 and data of an interactive graphics stream ex244 are transformed into a stream of PES packets ex242 and a stream of PES packets ex245, and further into TS packets ex243 and TS packets ex246, respectively. These TS packets are multiplexed into a stream to obtain multiplexed data ex247.

FIG. 34 illustrates how a video stream is stored in a stream of PES packets in more detail. The first bar in FIG. 34 shows a video frame stream in a video stream. The second bar shows the stream of PES packets. As indicated by arrows denoted as yy1, yy2, yy3, and yy4 in FIG. 34, the video stream is divided into pictures as I pictures, B pictures, and P pictures each of which is a video presentation unit, and the pictures are stored in a payload of each of the PES packets. Each of the PES packets has a PES header, and the PES header stores a Presentation Time-Stamp (PTS) indicating a display time of the picture, and a Decoding Time-Stamp (DTS) indicating a decoding time of the picture.

FIG. 35 illustrates a format of TS packets to be finally written on the multiplexed data. Each of the TS packets is a 188-byte fixed length packet including a 4-byte TS header having information, such as a PID for identifying a stream and a 184-byte TS payload for storing data. The PES packets are divided, and stored in the TS payloads, respectively. When a BD ROM is used, each of the TS packets is given a 4-byte TP_Extra_Header, thus resulting in 192-byte source packets. The source packets are written on the multiplexed data. The TP_Extra_Header stores information such as an Arrival_Time_Stamp (ATS). The ATS shows a transfer start time at which each of the TS packets is to be transferred to a PID filter. The source packets are arranged in the multiplexed data as shown at the bottom of FIG. 35. The numbers incrementing from the head of the multiplexed data are called source packet numbers (SPNs).

Each of the TS packets included in the multiplexed data includes not only streams of audio, video, subtitles and others, but also a Program Association Table (PAT), a Program Map Table (PMT), and a Program Clock Reference (PCR). The PAT shows what a PID in a PMT used in the multiplexed data indicates, and a PID of the PAT itself is registered as zero. The PMT stores PIDs of the streams of video, audio, subtitles and others included in the multiplexed data, and attribute information of the streams corresponding to the PIDs. The PMT also has various descriptors relating to the multiplexed data. The descriptors have information such as copy control information showing whether copying of the multiplexed data is permitted or not. The PCR stores STC time information corresponding to an ATS showing when the PCR packet is transferred to a decoder, in order to achieve synchronization between an Arrival Time Clock (ATC) that is a time axis of ATSs, and an System Time Clock (STC) that is a time axis of PTSs and DTSs.

FIG. 36 illustrates the data structure of the PMT in detail. A PMT header is disposed at the top of the PMT. The PMT header describes the length of data included in the PMT and others. A plurality of descriptors relating to the multiplexed data is disposed after the PMT header. Information such as the copy control information is described in the descriptors. After the descriptors, a plurality of pieces of stream information relating to the streams included in the multiplexed data is disposed. Each piece of stream information includes stream descriptors each describing information, such as a stream type for identifying a compression codec of a stream, a stream PID, and stream attribute information (such as a frame rate or an aspect ratio). The stream descriptors are equal in number to the number of streams in the multiplexed data.

When the multiplexed data is recorded on a recording medium and others, it is recorded together with multiplexed data information files.

Each of the multiplexed data information files is management information of the multiplexed data as shown in FIG. 37. The multiplexed data information files are in one to one correspondence with the multiplexed data, and each of the files includes multiplexed data information, stream attribute information, and an entry map.

As illustrated in FIG. 37, the multiplexed data includes a system rate, a reproduction start time, and a reproduction end time. The system rate indicates the maximum transfer rate at which a system target decoder to be described later transfers the multiplexed data to a PID filter. The intervals of the ATSs included in the multiplexed data are set to not higher than a system rate. The reproduction start time indicates a PTS in a video frame at the head of the multiplexed data. An interval of one frame is added to a PTS in a video frame at the end of the multiplexed data, and the PTS is set to the reproduction end time.

As shown in FIG. 38, a piece of attribute information is registered in the stream attribute information, for each PID of each stream included in the multiplexed data. Each piece of attribute information has different information depending on whether the corresponding stream is a video stream, an audio stream, a presentation graphics stream, or an interactive graphics stream. Each piece of video stream attribute information carries information including what kind of compression codec is used for compressing the video stream, and the resolution, aspect ratio and frame rate of the pieces of picture data that is included in the video stream. Each piece of audio stream attribute information carries information including what kind of compression codec is used for compressing the audio stream, how many channels are included in the audio stream, which language the audio stream supports, and how high the sampling frequency is. The video stream attribute information and the audio stream attribute information are used for initialization of a decoder before the player plays back the information.

In Embodiment 7, the multiplexed data to be used is of a stream type included in the PMT. Furthermore, when the multiplexed data is recorded on a recording medium, the video stream attribute information included in the multiplexed data information is used. More specifically, the video coding method or the video coding apparatus described in each of Embodiments includes a step or a unit for allocating unique information indicating video data generated by the video coding method or the video coding apparatus in each of Embodiments, to the stream type included in the PMT or the video stream attribute information. With the configuration, the video data generated by the video coding method or the video coding apparatus described in each of Embodiments can be distinguished from video data that conforms to another standard.

Furthermore, FIG. 39 illustrates steps of the video decoding method according to Embodiment 7. In Step exS100, the stream type included in the PMT or the video stream attribute information is obtained from the multiplexed data. Next, in Step exS101, it is determined whether or not the stream type or the video stream attribute information indicates that the multiplexed data is generated by the video coding method or the video coding apparatus in each of Embodiments. When it is determined that the stream type or the video stream attribute information indicates that the multiplexed data is generated by the video coding method or the video coding apparatus in each of Embodiments, in Step exS102, decoding is performed by the video decoding method in each of Embodiments. Furthermore, when the stream type or the video stream attribute information indicates conformance to the conventional standards, such as MPEG-2, MPEG4-AVC, and VC-1, in Step exS103, decoding is performed by a video decoding method in conformity with the conventional standards.

As such, allocating a new unique value to the stream type or the video stream attribute information enables determination whether or not the video decoding method or the video decoding apparatus that is described in each of Embodiments can perform decoding. Even when multiplexed data that conforms to a different standard, an appropriate decoding method or apparatus can be selected. Thus, it becomes possible to decode information without any error. Furthermore, the video coding method or apparatus, or the video decoding method or apparatus in Embodiment 7 can be used in the devices and systems described above.

Embodiment 8

Each of the video coding method, the video coding apparatus, the video decoding method, and the video decoding apparatus in each of Embodiments is typically achieved in the form of an integrated circuit or a Large Scale Integrated (LSI) circuit. As an example of the LSI, FIG. 40 illustrates a configuration of the LSI ex500 that is made into one chip. The LSI ex500 includes elements ex501, ex502, ex503, ex504, ex505, ex506, ex507, ex508, and ex509 to be described below, and the elements are connected to each other through a bus ex510. The power supply circuit unit ex505 is activated by supplying each of the elements with power when the power supply circuit unit ex505 is turned on.

For example, when coding is performed, the LSI ex500 receives an AV signal from a microphone ex117, a camera ex113, and others through an AV IO ex509 under control of a control unit ex501 including a CPU ex502, a memory controller ex503, a stream controller ex504, and a driving frequency control unit ex512. The received AV signal is temporarily stored in an external memory ex511, such as an SDRAM. Under control of the control unit ex501, the stored data is segmented into data portions according to the processing amount and speed to be transmitted to a signal processing unit ex507. Then, the signal processing unit ex507 codes an audio signal and/or a video signal. Here, the coding of the video signal is the coding described in each of Embodiments. Furthermore, the signal processing unit ex507 sometimes multiplexes the coded audio data and the coded video data, and a stream IO ex506 provides the multiplexed data outside. The provided multiplexed data is transmitted to the base station ex107, or written on the recording media ex215. When data sets are multiplexed, the data should be temporarily stored in the buffer ex508 so that the data sets are synchronized with each other.

Although the memory ex511 is an element outside the LSI ex500, it may be included in the LSI ex500. The buffer ex508 is not limited to one buffer, but may be composed of buffers. Furthermore, the LSI ex500 may be made into one chip or a plurality of chips.

Furthermore, although the control unit ex510 includes the CPU ex502, the memory controller ex503, the stream controller ex504, the driving frequency control unit ex512, the configuration of the control unit ex510 is not limited to such. For example, the signal processing unit ex507 may further include a CPU. Inclusion of another CPU in the signal processing unit ex507 can improve the processing speed. Furthermore, as another example, the CPU ex502 may serve as or be a part of the signal processing unit ex507, and, for example, may include an audio signal processing unit. In such a case, the control unit ex501 includes the signal processing unit ex507 or the CPU ex502 including a part of the signal processing unit ex507.

The name used here is LSI, but it may also be called IC, system LSI, super LSI, or ultra LSI depending on the degree of integration.

Moreover, ways to achieve integration are not limited to the LSI, and a special circuit or a general purpose processor and so forth can also achieve the integration. Field Programmable Gate Array (FPGA) that can be programmed after manufacturing LSIs or a reconfigurable processor that allows re-configuration of the connection or configuration of an LSI can be used for the same purpose.

In the future, with advancement in semiconductor technology, a brand-new technology may replace LSI. The functional blocks can be integrated using such a technology. The possibility is that the present invention is applied to biotechnology.

Embodiment 9

When video data generated in the video coding method or by the video coding apparatus described in each of Embodiments is decoded, compared to when video data that conforms to a conventional standard, such as MPEG-2, MPEG4-AVC, and VC-1 is decoded, the processing amount probably increases. Thus, the LSI ex500 needs to be set to a driving frequency higher than that of the CPU ex502 to be used when video data in conformity with the conventional standard is decoded. However, when the driving frequency is set higher, there is a problem that the power consumption increases.

In order to solve the problem, the video decoding apparatus, such as the television ex300 and the LSI ex500 is configured to determine to which standard the video data conforms, and switch between the driving frequencies according to the determined standard. FIG. 41 illustrates a configuration ex800 in Embodiment 9. A driving frequency switching unit ex803 sets a driving frequency to a higher driving frequency when video data is generated by the video coding method or the video coding apparatus described in each of Embodiments. Then, the driving frequency switching unit ex803 instructs a decoding processing unit ex801 that executes the video decoding method described in each of Embodiments to decode the video data. When the video data conforms to the conventional standard, the driving frequency switching unit ex803 sets a driving frequency to a lower driving frequency than that of the video data generated by the video coding method or the video coding apparatus described in each of Embodiments. Then, the driving frequency switching unit ex803 instructs the decoding processing unit ex802 that conforms to the conventional standard to decode the video data.

More specifically, the driving frequency switching unit ex803 includes the CPU ex502 and the driving frequency control unit ex512 in FIG. 40. Here, each of the decoding processing unit ex801 that executes the video decoding method described in each of Embodiments and the decoding processing unit ex802 that conforms to the conventional standard corresponds to the signal processing unit ex507 in FIG. 38. The CPU ex502 determines to which standard the video data conforms. Then, the driving frequency control unit ex512 determines a driving frequency based on a signal from the CPU ex502. Furthermore, the signal processing unit ex507 decodes the video data based on the signal from the CPU ex502. For example, the identification information described in Embodiment 7 is probably used for identifying the video data. The identification information is not limited to the one described in Embodiment 7 but may be any information as long as the information indicates to which standard the video data conforms. For example, when which standard video data conforms to can be determined based on an external signal for determining that the video data is used for a television or a disk, etc. the determination may be made based on such an external signal. Furthermore, the CPU ex502 selects a driving frequency based on, for example, a look-up table in which the standards of the video data are associated with the driving frequencies as shown in FIG. 43. The driving frequency can be selected by storing the look-up table in the buffer ex508 and in an internal memory of an LSI, and with reference to the look-up table by the CPU ex502.

FIG. 42 illustrates steps for executing a method in Embodiment 9. First, in Step exS200, the signal processing unit ex507 obtains identification information from the multiplexed data. Next, in Step exS201, the CPU ex502 determines whether or not the video data is generated by the coding method and the coding apparatus described in each of Embodiments, based on the identification information. When the video data is generated by the video coding method and the video coding apparatus described in each of Embodiments, in Step exS202, the CPU ex502 transmits a signal for setting the driving frequency to a higher driving frequency to the driving frequency control unit ex512. Then, the driving frequency control unit ex512 sets the driving frequency to the higher driving frequency. On the other hand, when the identification information indicates that the video data conforms to the conventional standard, such as MPEG-2, MPEG4-AVC, and VC-1, in Step exS203, the CPU ex502 transmits a signal for setting the driving frequency to a lower driving frequency to the driving frequency control unit ex512. Then, the driving frequency control unit ex512 sets the driving frequency to the lower driving frequency than that in the case where the video data is generated by the video coding method and the video coding apparatus described in each of Embodiment.

Furthermore, along with the switching of the driving frequencies, the power conservation effect can be improved by changing the voltage to be applied to the LSI ex500 or an apparatus including the LSI ex500. For example, when the driving frequency is set lower, the voltage to be applied to the LSI ex500 or the apparatus including the LSI ex500 is probably set to a voltage lower than that in the case where the driving frequency is set higher.

Furthermore, when the processing amount for decoding is larger, the driving frequency may be set higher, and when the processing amount for decoding is smaller, the driving frequency may be set lower as the method for setting the driving frequency. Thus, the setting method is not limited to the ones described above. For example, when the processing amount for decoding video data in conformity with MPEG4-AVC is larger than the processing amount for decoding video data generated by the video coding method and the video coding apparatus described in each of Embodiments, the driving frequency is probably set in reverse order to the setting described above.

Furthermore, the method for setting the driving frequency is not limited to the method for setting the driving frequency lower. For example, when the identification information indicates that the video data is generated by the video coding method and the video coding apparatus described in each of Embodiments, the voltage to be applied to the LSI ex500 or the apparatus including the LSI ex500 is probably set higher. When the identification information indicates that the video data conforms to the conventional standard, such as MPEG-2, MPEG4-AVC, and VC-1, the voltage to be applied to the LSI ex500 or the apparatus including the LSI ex500 is probably set lower. As another example, when the identification information indicates that the video data is generated by the video coding method and the video coding apparatus described in each of Embodiments, the driving of the CPU ex502 does not probably have to be suspended. When the identification information indicates that the video data conforms to the conventional standard, such as MPEG-2. MPEG4-AVC, and VC-1, the driving of the CPU ex502 is probably suspended at a given time because the CPU ex502 has extra processing capacity. Even when the identification information indicates that the video data is generated by the video coding method and the video coding apparatus described in each of Embodiments, in the case where the CPU ex502 has extra processing capacity, the driving of the CPU ex502 is probably suspended at a given time. In such a case, the suspending time is probably set shorter than that in the case where when the identification information indicates that the video data conforms to the conventional standard, such as MPEG-2, MPEG4-AVC, and VC-1.

Accordingly, the power conservation effect can be improved by switching between the driving frequencies in accordance with the standard to which the video data conforms. Furthermore, when the LSI ex500 or the apparatus including the LSI ex500 is driven using a battery, the battery life can be extended with the power conservation effect.

Embodiment 10

There are cases where a plurality of video data that conforms to different standards, is provided to the devices and systems, such as a television and a mobile phone. In order to enable decoding the plurality of video data that conforms to the different standards, the signal processing unit ex507 of the LSI ex500 needs to conform to the different standards. However, the problems of increase in the scale of the circuit of the LSI ex500 and increase in the cost arise with the individual use of the signal processing units ex507 that conform to the respective standards.

In order to solve the problem, what is conceived is a configuration in which the decoding processing unit for implementing the video decoding method described in each of Embodiments and the decoding processing unit that conforms to the conventional standard, such as MPEG-2, MPEG4-AVC, and VC-1 are partly shared. Ex900 in FIG. 44A shows an example of the configuration. For example, the video decoding method described in each of Embodiments and the video decoding method that conforms to MPEG4-AVC have, partly in common, the details of processing, such as entropy coding, inverse quantization, deblocking filtering, and motion compensated prediction. The details of processing to be shared probably includes use of a decoding processing unit ex902 that conforms to MPEG4-AVC. In contrast, a dedicated decoding processing unit ex901 is probably used for other processing unique to the present invention. Since the present invention is characterized by a transformation unit in particular, for example, the dedicated decoding processing unit ex901 is used for inverse transform. Otherwise, the decoding processing unit is probably shared for one of the entropy coding, inverse quantization, deblocking filtering, and motion compensated prediction, or all of the processing. The decoding processing unit for implementing the video decoding method described in each of Embodiments may be shared for the processing to be shared, and a dedicated decoding processing unit may be used for processing unique to that of MPEG4-AVC.

Furthermore, ex1000 in FIG. 44B shows another example in that processing is partly shared. This example uses a configuration including a dedicated decoding processing unit ex1001 that supports the processing unique to the present invention, a dedicated decoding processing unit ex1002 that supports the processing unique to another conventional standard, and a decoding processing unit ex1003 that supports processing to be shared between the video decoding method in the present invention and the conventional video decoding method. Here, the dedicated decoding processing units ex1001 and ex1002 are not necessarily specialized for the processing of the present invention and the processing of the conventional standard, respectively, and may be the ones capable of implementing general processing. Furthermore, the configuration of Embodiment 10 can be implemented by the LSI ex500.

As such, reducing the scale of the circuit of an LSI and reducing the cost are possible by sharing the decoding processing unit for the processing to be shared between the video decoding method in the present invention and the video decoding method in conformity with the conventional standard.

INDUSTRIAL APPLICABILITY

The present invention is applicable to a coding apparatus which codes audio, still images, and video and to a decoding apparatus which decodes data coded by the coding apparatus. For example, the present invention is applicable to various audio-visual devices such as audio devices, cellular phones, digital cameras, BD recorders, and digital televisions.

The invention claimed is:

1. A method of encoding video using a plurality of reference pictures respectively associated with a plurality of indexes, the method comprising:
creating a list including the plurality of reference pictures, the plurality of reference pictures including (i) a reference picture of a particular type of reference picture, the reference picture of the particular type being included in a first group of reference pictures and (ii) a reference picture that is not of the particular type of reference picture; and
encoding a current picture of the video using the list,
wherein the creating the list includes:
selecting, from among the plurality of reference pictures, the first group of reference pictures based on a parameter indicating a temporal level of the reference picture of the particular type of reference picture, the first group of reference pictures including the reference picture of the particular type of reference picture, a frame rate corresponding to the temporal level of each of the reference pictures included in the first group of reference pictures indicating a lowest frame rate from among frame rates of the plurality of reference pictures;
selecting, from among the plurality of reference pictures, a second group of reference pictures, the second group of reference pictures including the reference picture that is not of the particular type of reference picture;
selecting, from among the plurality of reference pictures, a third group of reference pictures, the third group of reference pictures including the reference picture that is not of the particular type of reference picture;
placing the first group of reference pictures at a predetermined position in the list, the first group of reference pictures being selected based on the parameter indicating the temporal level of the reference picture of the particular type of reference picture, the temporal level of each of the references pictures included in the first group of reference pictures being lower than the temporal level of each of the reference pictures included in the second group of reference pictures, the temporal level of each of the references pictures included in the second group of reference pictures being lower than the temporal level of each of the reference pictures included in the third group of reference pictures, a frame rate of the first group of reference pictures being lower than the frame rate of the second group of reference pictures; and
placing the second group of reference pictures after the first group of reference pictures in the list, and placing the third group of reference pictures after the second group of reference pictures in the list, each of the reference pictures included in the first group of reference pictures preceding each of the reference pictures in the second reference pictures in the list, each of the reference pictures included in the second group of reference pictures preceding each of the reference pictures in the third reference pictures in the list.

2. The method according to claim 1,
wherein the reference picture that is not of the particular type of reference picture is located closest to the current picture.

3. A method of decoding video using a plurality of reference pictures respectively associated with a plurality of indexes, the method comprising:
creating a list including the plurality of reference pictures, the plurality of reference pictures including (i) a reference picture of a particular type of reference picture, the reference picture of the particular type being included in a first group of reference pictures and (ii) a reference picture that is not of the particular type of reference picture; and
decoding a current picture of the video using the list,
wherein the creating the list includes:
selecting, from among the plurality of reference pictures, the first group of reference pictures based on a parameter indicating a temporal level of the reference picture of the particular type of reference picture, the first group of reference pictures including the reference picture of the particular type of reference picture, a frame rate corresponding to the temporal level of each of the reference pictures included in the first group of reference pictures indicating a lowest frame rate from among frame rates of the plurality of reference pictures;
selecting, from among the plurality of reference pictures, a second group of reference pictures, the second group of reference pictures including the reference picture that is not of the particular type of reference picture;
selecting, from among the plurality of reference pictures, a third group of reference pictures, the third group of reference pictures including the reference picture that is not of the particular type of reference picture;
placing the first group of reference pictures at a predetermined position in the list, the first group of reference pictures being selected based on the parameter indicating the temporal level of the reference picture of the particular type of reference picture, the temporal level of each of the references pictures included in the first group of reference pictures being lower than the temporal level of each of the reference pictures included in the second group of reference pictures, the temporal level of each of the references pictures included in the second group of reference pictures being lower than the temporal level of each of the reference pictures included in the third group of reference pictures, a frame rate of the first group of reference pictures being lower than the frame rate of the second group of reference pictures; and
placing the second group of reference pictures after the first group of reference pictures in the list, and placing the third group of reference pictures after the second group of reference pictures in the list, each of the reference pictures included in the first group of reference pictures preceding each of the reference pictures in the second reference pictures in the list, each of the reference pictures included in the second group of reference pictures preceding each of the reference pictures in the third reference pictures in the list.

4. The method according to claim 3,
wherein the reference picture that is not of the particular type of reference picture is located closest to the current picture.

5. An apparatus for encoding video using a plurality of reference pictures respectively associated with a plurality of indexes, the apparatus comprising:
a non-transitory memory; and
a processor coupled to the non-transitory memory, the processor performing:
creating a list including the plurality of reference pictures, the plurality of reference pictures including (i) a reference picture of a particular type of reference picture, the reference picture of the particular type being included in a first group of reference pictures and (ii) a reference picture that is not of the particular type of reference picture; and
encoding a current picture of the video using the list, wherein the creating the list includes:
selecting, from among the plurality of reference pictures, the first group of reference pictures based on a parameter indicating a temporal level of the reference picture of the particular type of reference picture, the first group of reference pictures including the reference picture of the particular type of reference picture, a frame rate corresponding to the temporal level of each of the reference pictures included in the first group of reference pictures indicating a lowest frame rate from among frame rates of the plurality of reference pictures;
selecting, from among the plurality of reference pictures, a second group of reference pictures, the second group of reference pictures including the reference picture that is not of the particular type of reference picture;
selecting, from among the plurality of reference pictures, a third group of reference pictures, the third group of reference pictures including the reference picture that is not of the particular type of reference picture;
placing the first group of reference pictures at a predetermined position in the list, the first group of reference pictures being selected based on the parameter indicating the temporal level of the reference picture of the particular type of reference picture, the temporal level of each of the references pictures included in the first group of reference pictures being lower than the temporal level of each of the reference pictures included in the second group of reference pictures, the temporal level of each of the references pictures included in the second group of reference pictures being lower than the temporal level of each of the reference pictures included in the third group of reference pictures, a frame rate of the first group of reference pictures being lower than the frame rate of the second group of reference pictures; and
placing the second group of reference pictures after the first group of reference pictures in the list, and placing the third group of reference pictures after the second group of reference pictures in the list, each of the reference pictures included in the first group of reference pictures preceding each of the reference pictures in the second reference pictures in the list, each of the reference pictures included in the second group of reference pictures preceding each of the reference pictures in the third reference pictures in the list.

6. The apparatus according to claim 5,
wherein the reference picture that is not of the particular type of reference picture is located closest to the current picture.

7. An apparatus for decoding video using a plurality of reference pictures respectively associated with a plurality of indexes, the apparatus comprising:
a non-transitory memory; and
a processor coupled to the non-transitory memory, the processor performing:
creating a list including the plurality of reference pictures, the plurality of reference pictures including (i) a reference picture of a particular type of reference picture, the reference picture of the particular type being included in a first group of reference pictures and (ii) a reference picture that is not of the particular type of reference picture; and
decoding a current picture of the video using the list, wherein the creating the list includes:
selecting, from among the plurality of reference pictures, the first group of reference pictures based on a parameter indicating a temporal level of the reference picture of the particular type of reference picture, the first group of reference pictures including the reference picture of the particular type of reference picture, a frame rate corresponding to the temporal level of each of the reference pictures included in the first group of reference pictures indicating a lowest frame rate from among frame rates of the plurality of reference pictures;
selecting, from among the plurality of reference pictures, a second group of reference pictures, the second group of reference pictures including the reference picture that is not of the particular type of reference picture;
selecting, from among the plurality of reference pictures, a third group of reference pictures, the third group of reference pictures including the reference picture that is not of the particular type of reference picture;
placing the first group of reference pictures at a predetermined position in the list, the first group of reference pictures being selected based on the parameter indicating the temporal level of the reference picture of the particular type of reference picture, the temporal level of each of the references pictures included in the first group of reference pictures being lower than the temporal level of each of the reference pictures included in the second group of reference pictures, the temporal level of each of the references pictures included in the second group of reference pictures being lower than the temporal level of each of the reference pictures included in the third group of reference pictures, a frame rate of the first group of reference pictures being lower than the frame rate of the second group of reference pictures; and
placing the second group of reference pictures after the first group of reference pictures in the list, and placing the third group of reference pictures after the second group of reference pictures in the list, each of the reference pictures included in the first group of reference pictures preceding each of the reference pictures in the second reference pictures in the list, each of the reference pictures included in the second group of reference pictures preceding each of the reference pictures in the third reference pictures in the list.

8. The apparatus according to claim 7, wherein the reference picture that is not of the particular type of reference picture is located closest to the current picture.

\* \* \* \* \*

UNITED STATES PATENT AND TRADEMARK OFFICE
CERTIFICATE OF CORRECTION

PATENT NO. : 10,841,573 B2
APPLICATION NO. : 13/983581
DATED : November 17, 2020
INVENTOR(S) : Viktor Wahadaniah It is certified that error appears in the above-identified patent and that said Letters Patent is hereby corrected as shown below:

On the Title Page

Item (56), insert the following:
--Hideaki KIMATA et al., "Temporal Scalable Video Coding with Hierarchical Reference Picture Selection Method", the IEICE Transactions on Fundamentals of Electronics, Communications and Computer Sciences (JAPANESE), 2005.03, Vol. J88-A, No. 3, p. 397-410, with partial English translation.

Hideaki Kimata et al., "Hierarchical Reference Picture Selection Method for Temporal Scalability beyond H.264", 2004 IEEE International Conference on Multimedia and Expo, 2004. ICME '04, 2004.06.27, Vol. 1, p. 181-184.

Hideaki Kimata et al., "Reference Picture Selection Prediction for Temporal Scalability, The Proceedings of the 18$^{th}$ Picture Coding Symposium of Japan, 2003.11.14, p. 55-56.

Heiki Schwarz et al., "Hierarchical B pictures", Joint Video Team (JVT) of ISO/IEC MPEG & ITU-T VCEG (ISO/IEC JTC1/SC29/WG11 and ITU-T SG16 Q.6) 16$^{th}$ Meeting: Poznan, PL, Document: JVT-P014, ITU-T, 2005.07.

Heiko Schwarz et al., "Overview of the Scalable Video Coding Extension of the H.264/AVC Standard, IEEE Transactions on Circuits and Systems for Video Technology, 2007.09, Vol. 17, No. 9, p. 1103-1120.

Jill Boyce and Danny Hong, "High layer syntax to improve support for temporal scalability", Joint Collaborative Team on Video Coding (JCT-VC) of ITU-T SG16 WP3 and ISO/IEC JTC1/SC29/WG11 4$^{th}$ Meeting: Daegu, KR, Document: JCTVC-D200, ITU-T, 2011.01.

Toshiyasu Sugio and Takahiro Nishi, "Modified usage of predicted motion vectors in forward directional bi-predictive coding frame", Joint Collaborative Team on Video Coding Signed and Sealed this
Twentieth Day of April, 2021

Drew Hirshfeld
*Performing the Functions and Duties of the*
*Under Secretary of Commerce for Intellectual Property and*
*Director of the United States Patent and Trademark Office*

(JCT-VC) of ITU-T SG16 WP3 and ISO/IEC JTC1/SC29/WG11 4th Meeting: Daegu, KR, Document: JCTVC-D274, ITU-T, 2011.01.--